US006289299B1

(12) United States Patent
Daniel, Jr. et al.

(10) Patent No.: US 6,289,299 B1
(45) Date of Patent: Sep. 11, 2001

(54) SYSTEMS AND METHODS FOR INTERACTIVE VIRTUAL REALITY PROCESS CONTROL AND SIMULATION

(75) Inventors: William E. Daniel, Jr., North Augusta, SC (US); Michael A. Whitney, Augusta, GA (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/250,850

(22) Filed: Feb. 17, 1999

(51) Int. Cl.[7] .............................. G06G 7/48; G06F 7/60; G06F 9/44; G06F 13/10; G06T 15/00

(52) U.S. Cl. ............................... 703/21; 703/2; 703/6; 345/419

(58) Field of Search ....................... 703/21, 6, 2; 345/419

(56) References Cited

U.S. PATENT DOCUMENTS

| | | |
|---|---|---|
| 5,021,976 | 6/1991 | Wexelblat et al. . |
| 5,168,441 | 12/1992 | Onarheim et al. . |
| 5,347,466 | 9/1994 | Nichols et al. . |
| 5,428,740 | 6/1995 | Wood et al. . |
| 5,432,894 | 7/1995 | Funaki . |
| 5,438,526 * | 8/1995 | Itoh et al. ............................ 716/20 |
| 5,524,187 | 6/1996 | Feiner et al. . |
| 5,559,995 | 9/1996 | Browning et al. . |
| 5,561,745 | 10/1996 | Jackson et al. . |
| 5,568,404 * | 10/1996 | Strumolo .............................. 702/140 |
| 5,576,946 * | 11/1996 | Bender et al. ........................ 700/17 |
| 5,642,467 * | 6/1997 | Stover et al. ........................ 700/250 |
| 5,666,297 * | 9/1997 | Britt et al. ............................ 703/18 |
| 5,675,746 | 10/1997 | Marshall . |
| 5,754,189 * | 5/1998 | Doi et al. ............................ 345/473 |
| 5,812,134 * | 9/1998 | Pooser et al. ........................ 345/356 |
| 5,859,964 * | 1/1999 | Wang et al. .......................... 714/48 |
| 5,882,206 * | 3/1999 | Gillio .................................. 434/262 |
| 5,980,096 * | 11/1999 | Thalhammer-Reyero ........... 707/100 |
| 6,023,270 * | 2/2000 | Brush et al. ......................... 345/333 |
| 6,032,084 * | 2/2000 | Anderson et al. ................... 700/241 |

OTHER PUBLICATIONS

"Graphic Interfaces for Simulation", Hollan et al., Advances in Man–Machine Systems Research, vol. 3, pp. 129 to 163 (JAI Press, Inc., 1987).

Barker; "Use of a virtual laboratory for teaching instrument design"; IEE Coll. Computer–based learning in Engir.; pp. 5/1–5/5, 1994.*

Honda et al; "A virtual office environment for home office worker based on 3D virtual space"; IEEE VSMM '97; pp. 38–47, Sep. 1997.*

(List continued on next page.)

*Primary Examiner*—Kevin J. Teska
*Assistant Examiner*—Hugh Jones
(74) *Attorney, Agent, or Firm*—Oscar A. Towler, III; Hardaway/Mann IP Group

(57) ABSTRACT

A system for visualizing, controlling and managing information includes a data analysis unit for interpreting and classifying raw data using analytical techniques. A data flow coordination unit routes data from its source to other components within the system. A data preparation unit handles the graphical preparation of the data and a data rendering unit presents the data in a three-dimensional interactive environment where the user can observe, interact with, and interpret the data. A user can view the information on various levels, from a high overall process level view, to a view illustrating linkage between variables, to view the hard data itself, or to view results of an analysis of the data. The system allows a user to monitor a physical process in real-time and further allows the user to manage and control the information in a manner not previously possible.

67 Claims, 29 Drawing Sheets

(27 of 29 Drawing Sheet(s) Filed in Color)

3-D Process Overview Interactive IVR-3D world Example showing back right of bushing melter process

OTHER PUBLICATIONS

Stragapede; "Desig review of complex mechanical systems using advanced virtual reality tools"; IEEE Proc. IEEE Int. Symp. Indust. Elect.; pp. ss223–ss227, Jul. 1997.*

Veh et al.; "Design and operation of a virtual reality operator–training system"; IEEE Trans Power Systems; pp. 1585–1591, Aug. 1996.*

Grant et al; "Simulation modelling with artificial reality technology (SMART): an integration of virtual reality and simulation modelling"; IEEE Winter Sim. Conf.; pp. 437–441, Dec. 1998.*

Zheng et al.; "Virtual Reality"; IEEE Potentials; pp. 20–23, Apr. 1998.*

Daponte et al.; "Virtual laboratory: an object oriented framework"; IEEE IMTC/94; pp. 11–16, May 1994.*

Jaswal; "CAVEvis: distributed real–time visualization of time varying scalar and vector fields using the CAVE virtual reality theater"; ACM: Proc. Conf. Visualization; pp. 301–308, Oct. 1997.*

Auinger et al.; "Interface driven domain–independent modelling architecture for soft–commissioning and reality-in–the–loop"; Proc. 1999 Winter Sim. Conf.; pp. 798–805.*

Rekimoto et al.; "The world through the computer: computer augmented interaction with real world environments"; ACM: Proc. 8th ACM Symp. User Interface and Software Tech.; pp. 29–36, Nov. 1995.*

Bryson; "Virtual environments in scientific visualization"; IEEE Compcon Spring '92; pp. 460–461, Feb. 1992.*

Podesta et al.; "Virtual instrumentation for the management, simulation and control of an in house power plant"; IEEE IMTC–96; pp. 1104–1106, Jun. 1996.*

Capraro et al.; "Intelligent visualization of radar data"; IEEE Radar 97; pp. 692–696, Oct. 1997.*

Aouad et al.; "Developing a virtual reality interface for an integrated project database environment"; IEEE 1997 Conf. Info. Visualization; pp. 192–197, Aug. 1997.*

Risch et al.; "Interactive information visualization for exploratory intelligence data analysis"; IEEE Proc. 1996 Virtual Reality Ann. Int. Symp.; pp. 230–238, Apr. 1996.*

Johnson et al.; "The SANDBOX: a virtual reality interface to scientific databases"; IEEE 1994 Int. Proc. Sci. and Stat. Database Managemnent; pp. 12–21, Sep. 1994.*

Schafer et al.; "A new approach to human–computer interaction—synchronous modelling in real and virtual spaces"; ACM 0–89791–863–0/97/0008; pp. 335–344, 1997.*

* cited by examiner

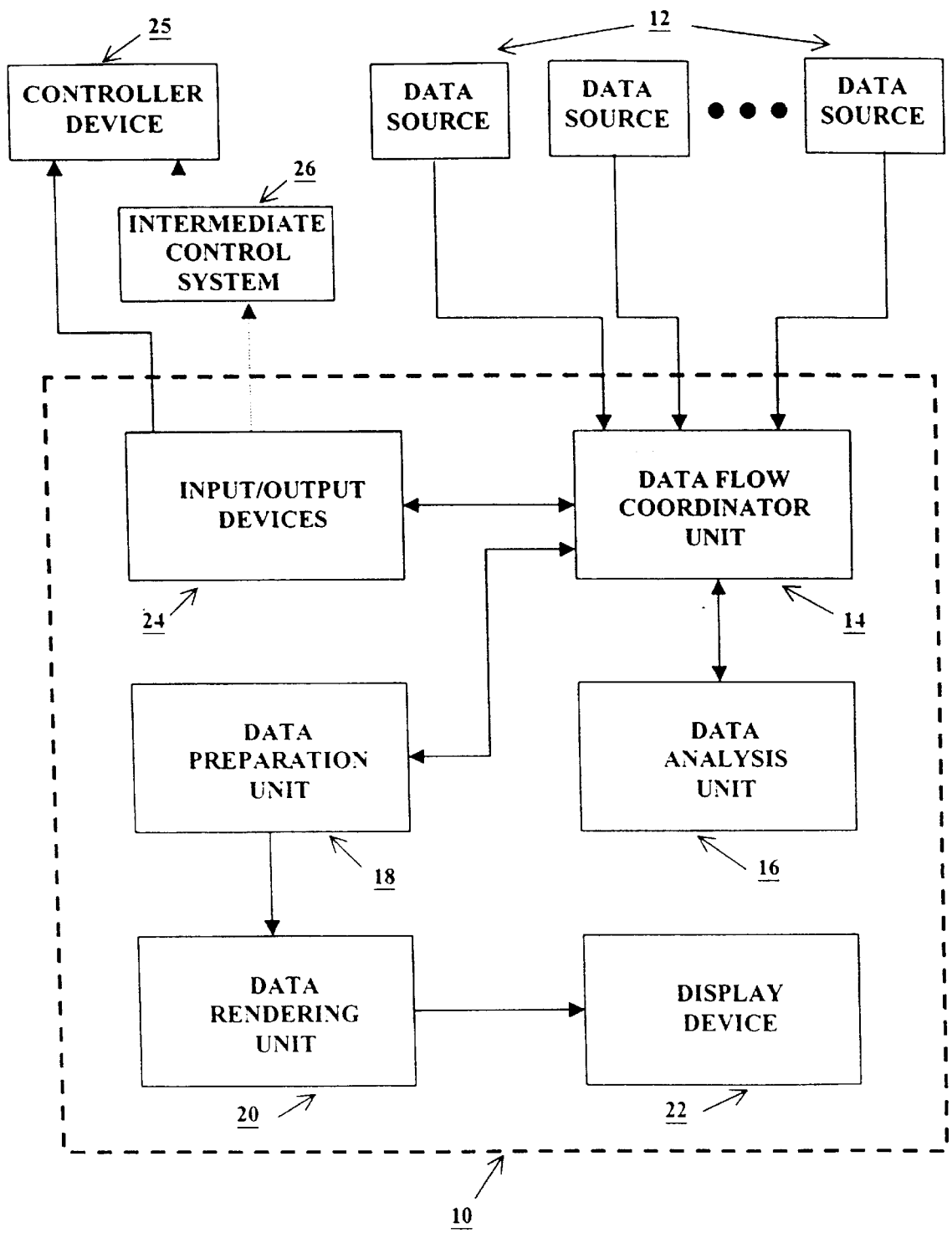
Figure 1. Block Diagram of Interactive Virtual Reality Process Control

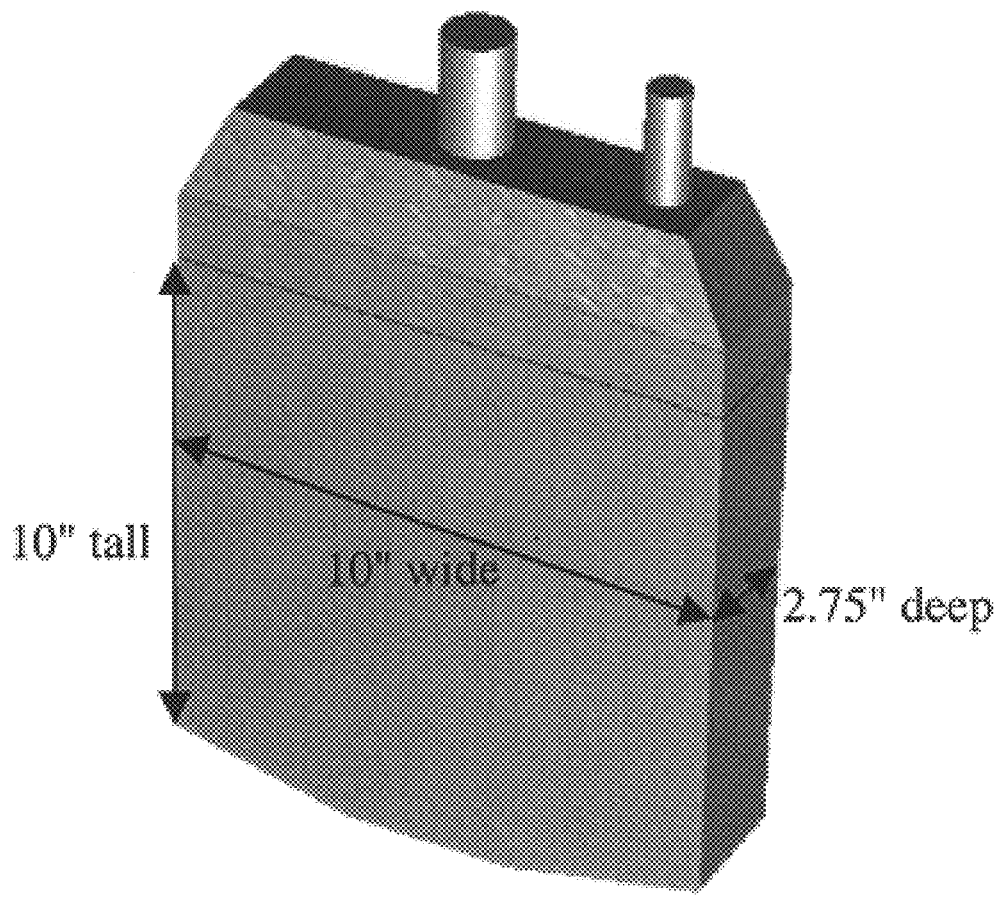
Figure 2. Bushing Melter Example

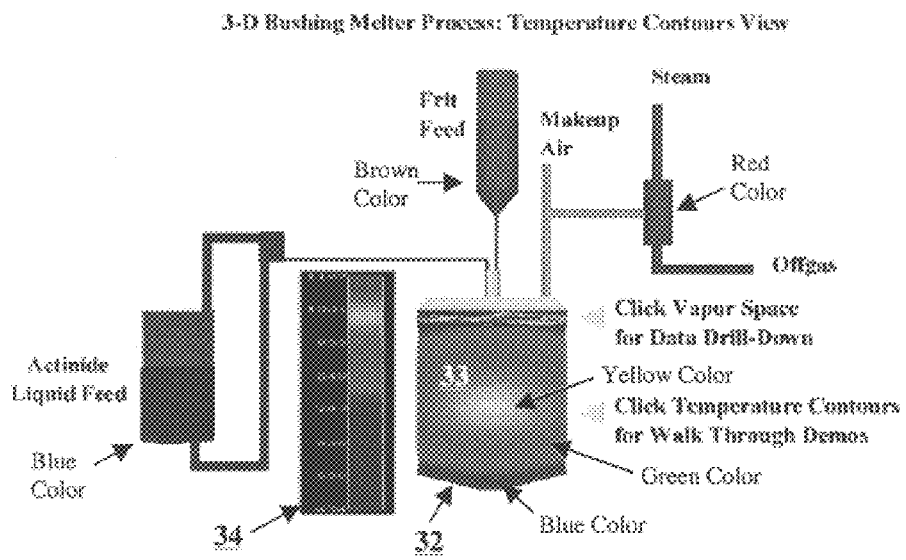
Figure 3. 3-D Process Overview Interactive IVR-3D world Example showing front of bushing melter process
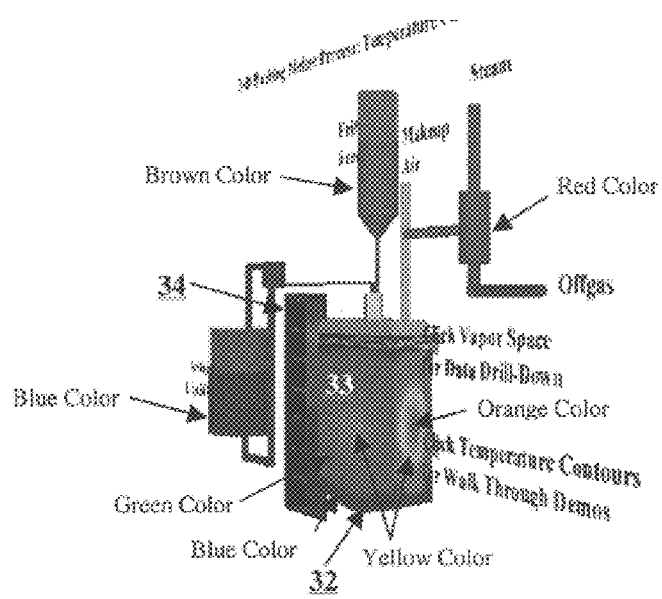
Figure 4. 3-D Process Overview Interactive IVR-3D world Example showing right front of bushing melter process

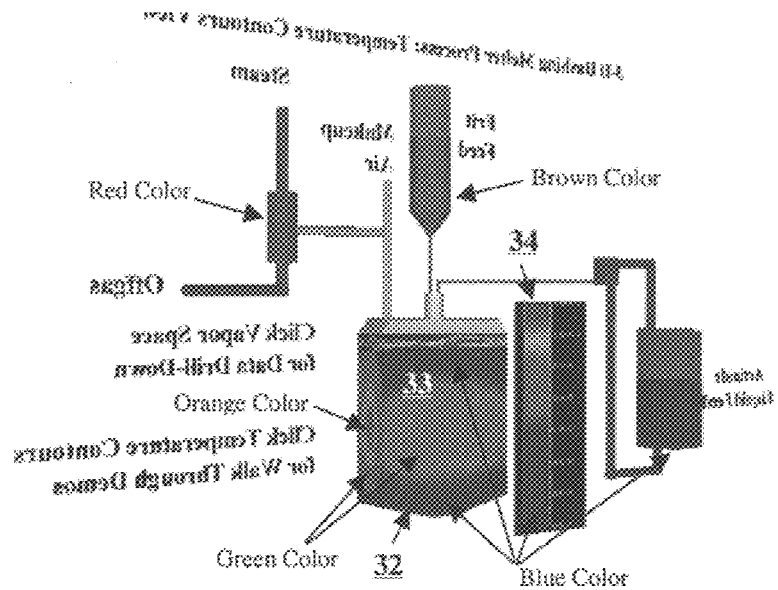
Figure 5. 3-D Process Overview Interactive IVR-3D world Example showing back left of bushing melter process
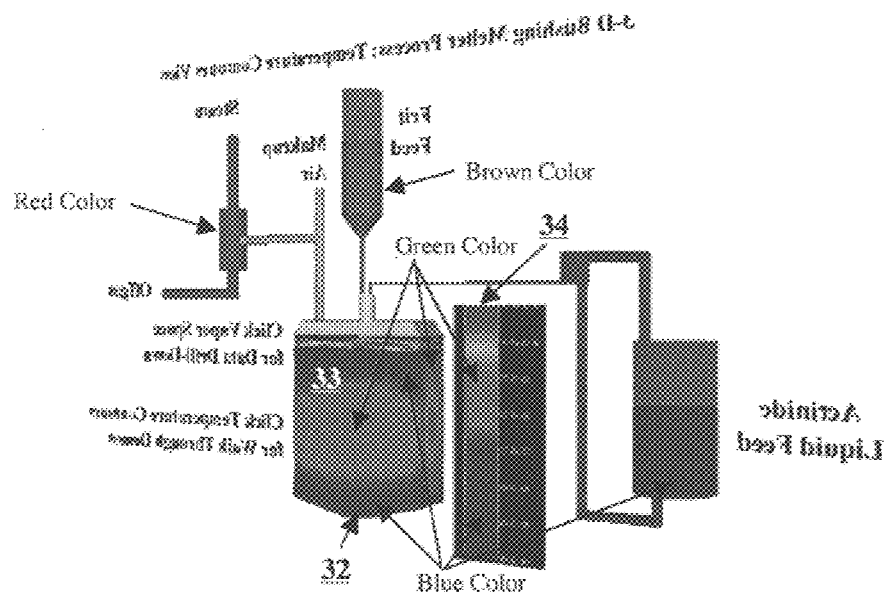
Figure 6. 3-D Process Overview Interactive IVR-3D world Example showing back right of bushing melter process

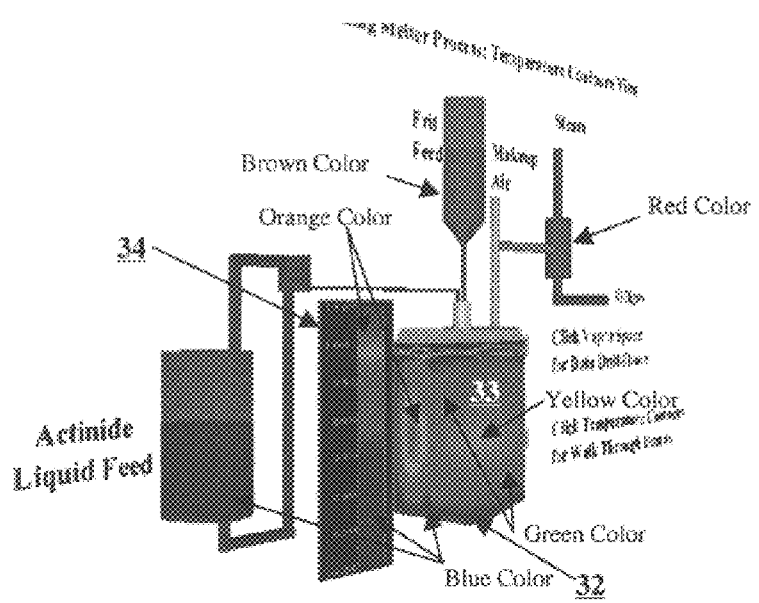
Figure 7. 3-D Process Overview Interactive IVR-3D world Example showing Left Front of bushing melter process

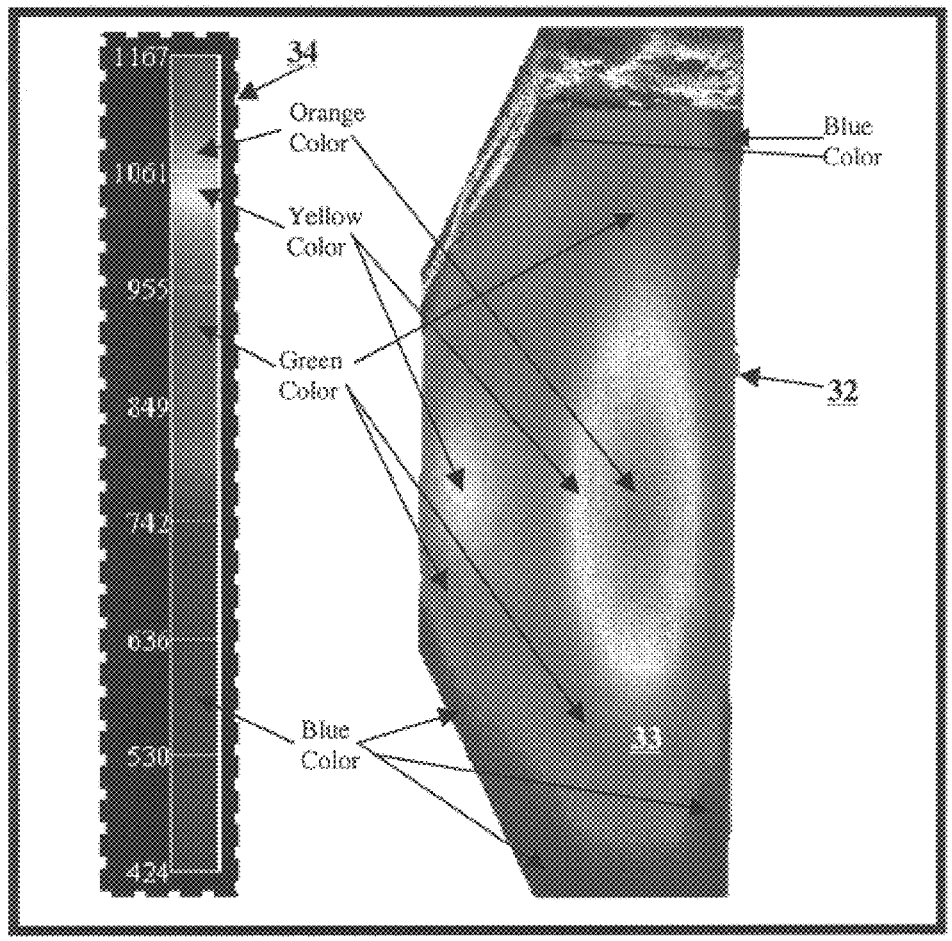
Figure 8. Right Side of Bushing Melter showing front with Temperature Legend as floating palette

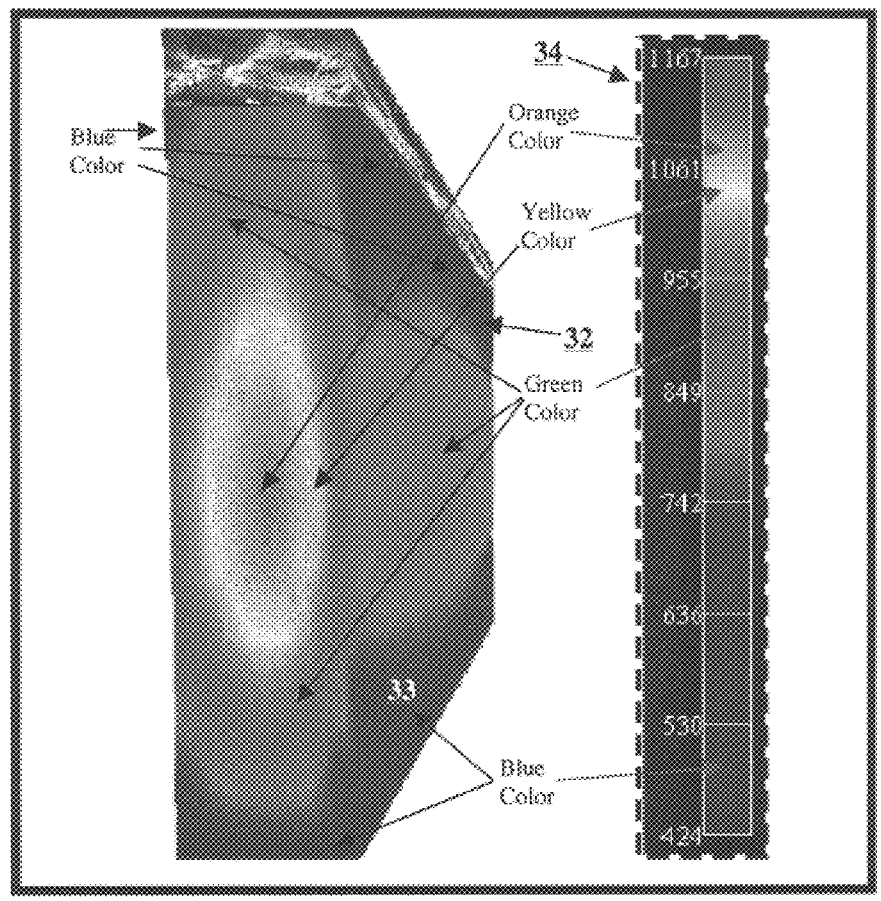
Figure 9. Right Side of Bushing Melter showing back with Temperature Legend as floating palette

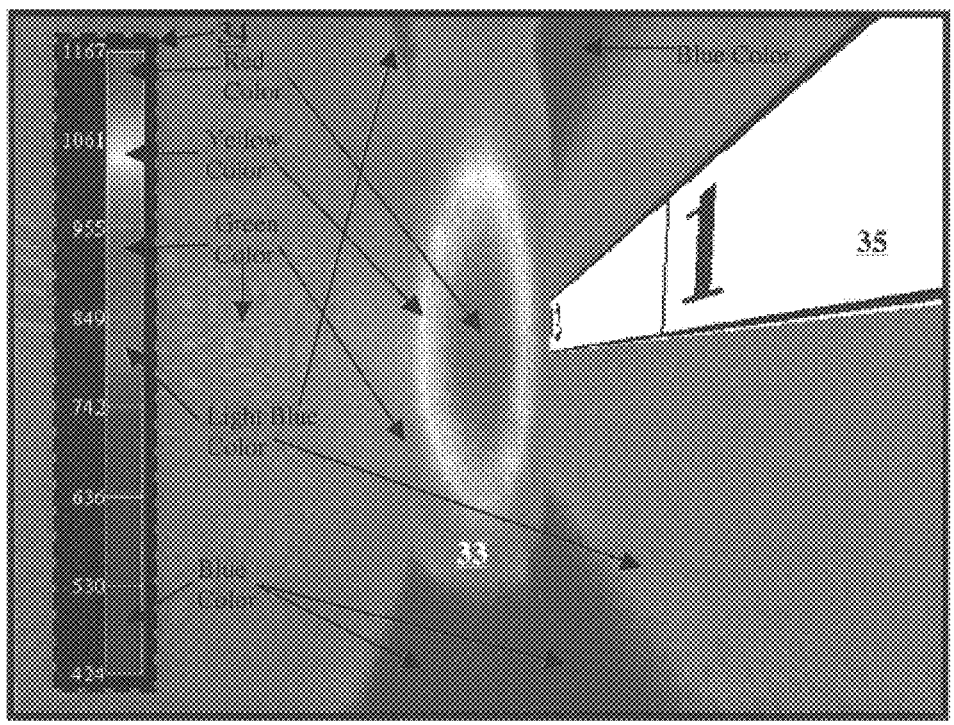
Figure 10. Inside Right Side of Melter by 2 inches with floating Temperature Legend
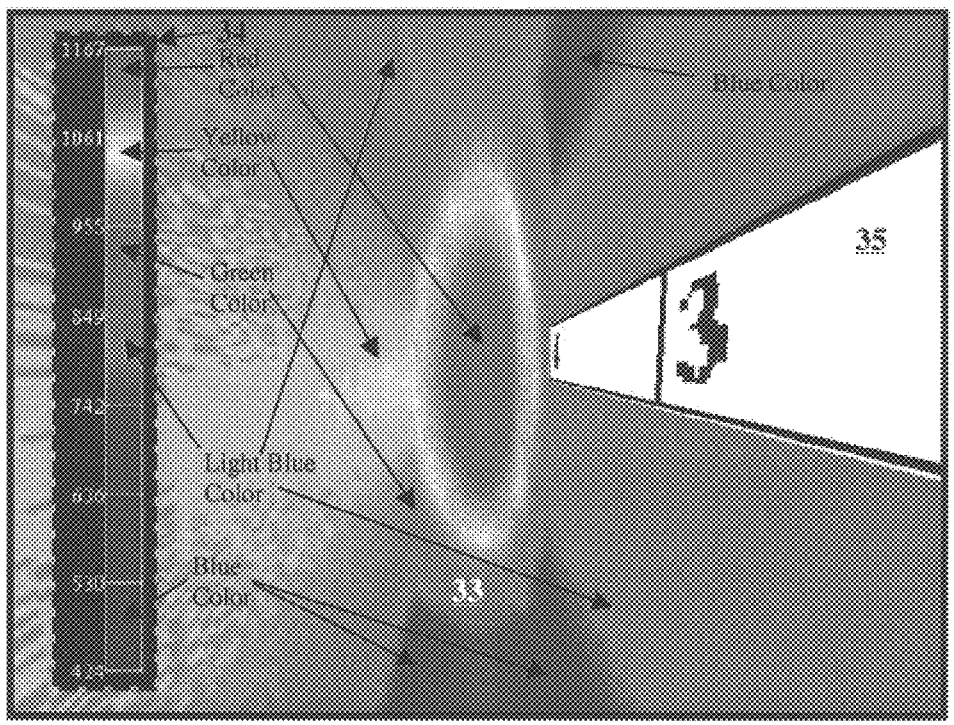
Figure 11. Inside Right Side of Melter by 4 inches with floating Temperature Legend

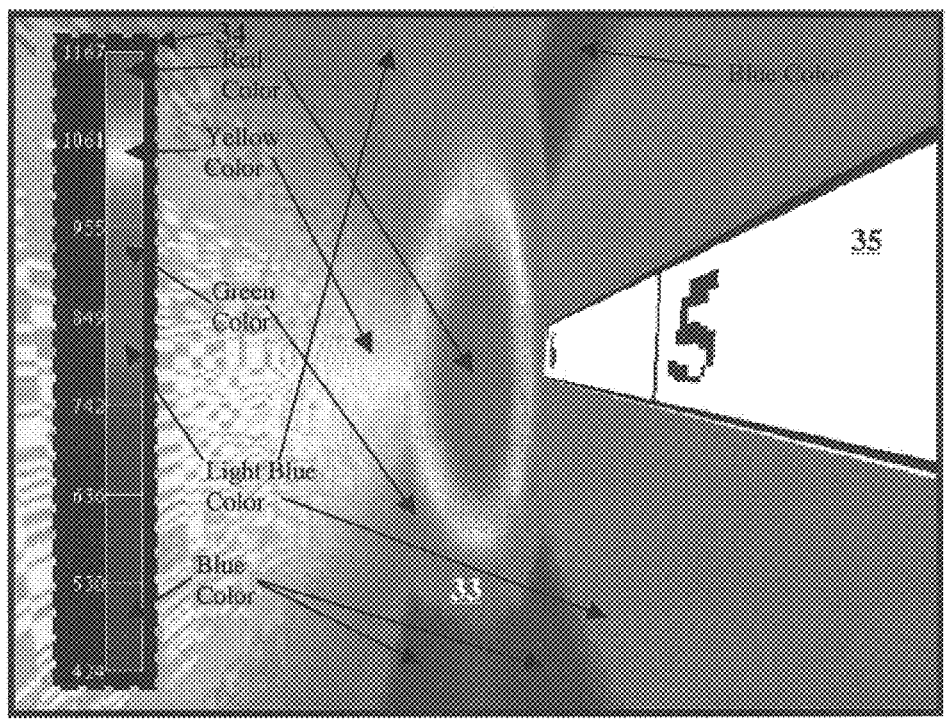
Figure 12. Inside Right Side of Melter by 6 inches with floating Temperature Legend
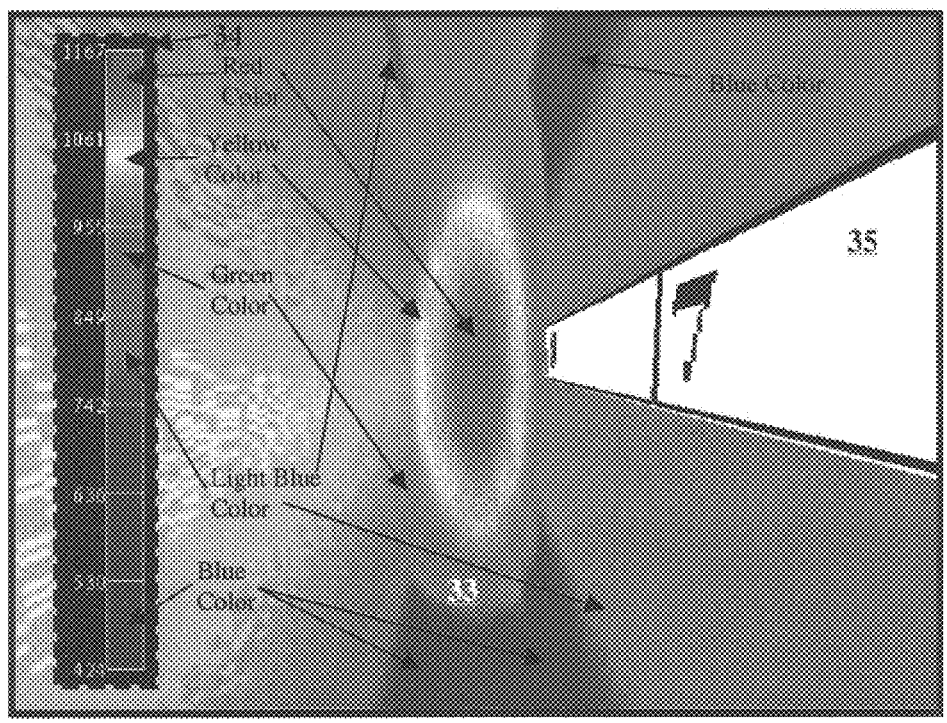
Figure 13. Inside Right Side of Melter by 8 inches with floating Temperature Legend

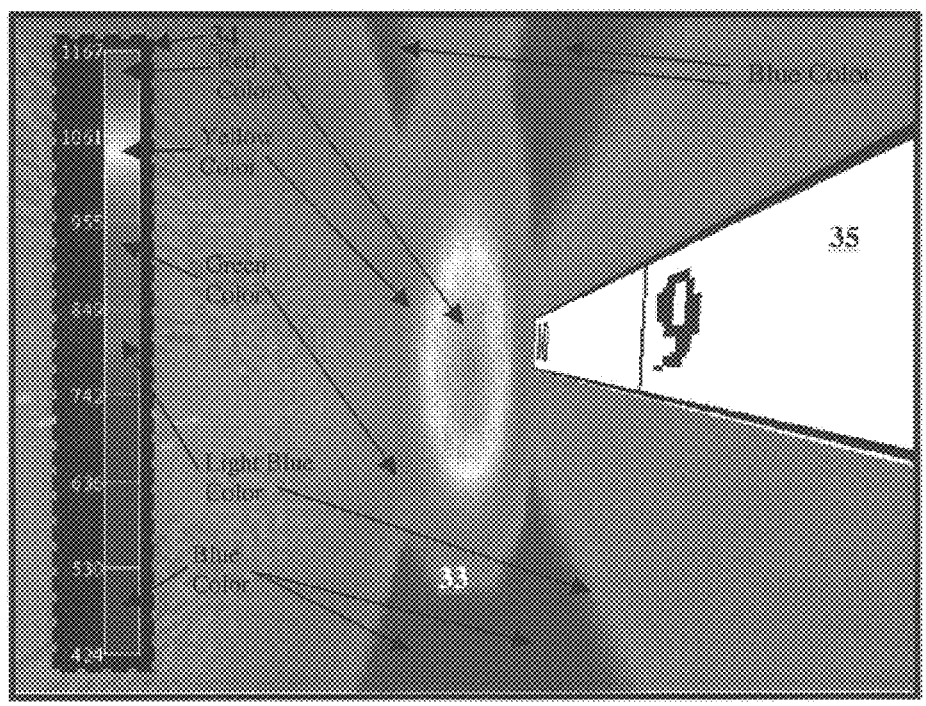
Figure 14. Inside Right Side of Melter by 10 inches with floating Temperature Legend

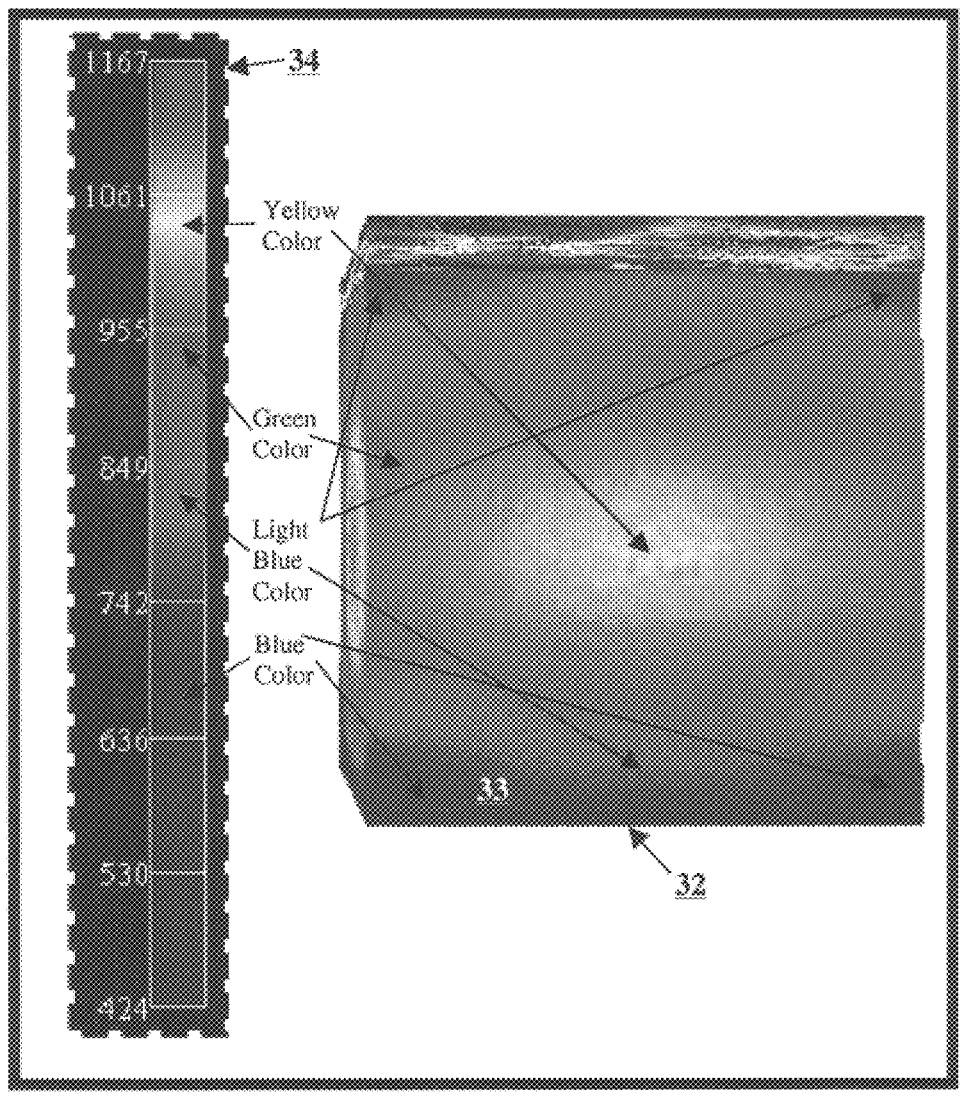
Figure 15. Front of Bushing Melter showing Left Side with Temperature Legend as floating palette

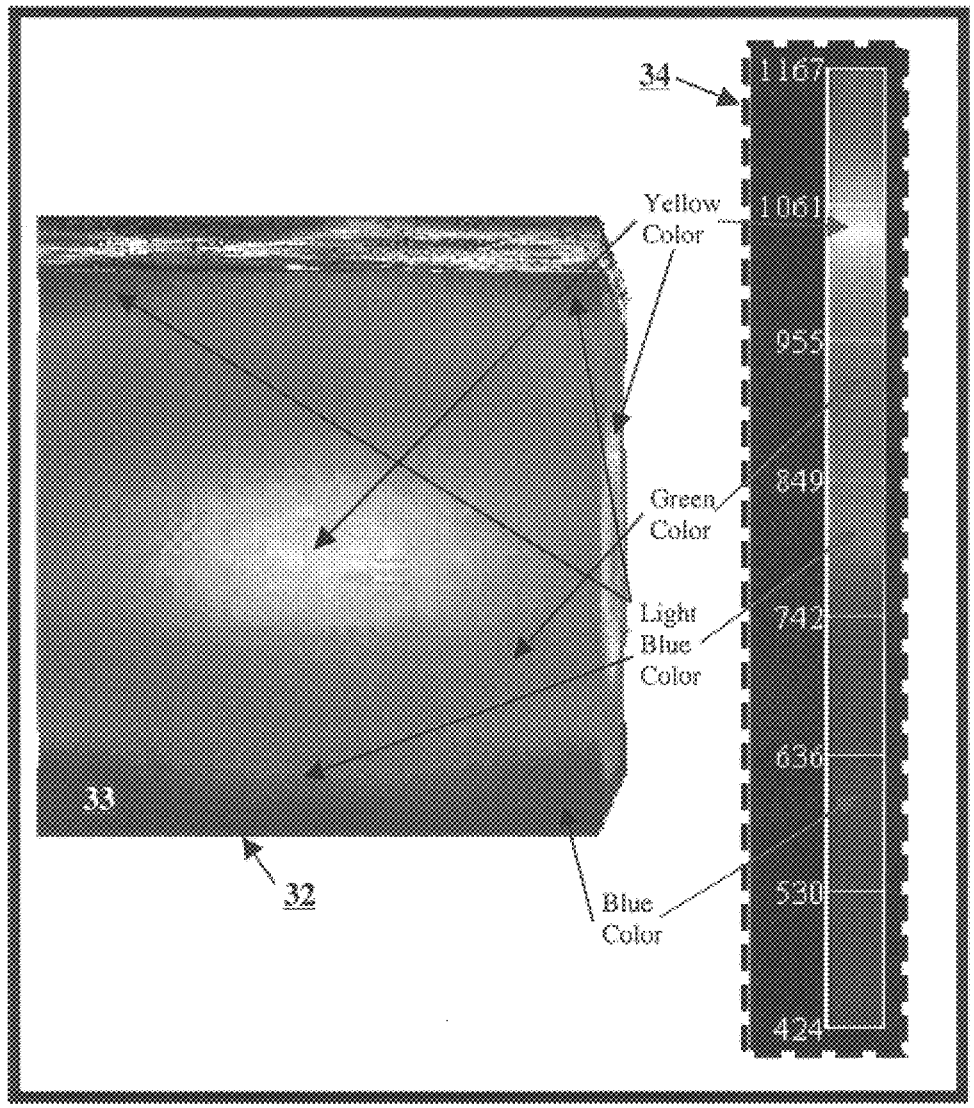
Figure 16. Front of Bushing Melter showing Right Side with Temperature Legend as floating palette

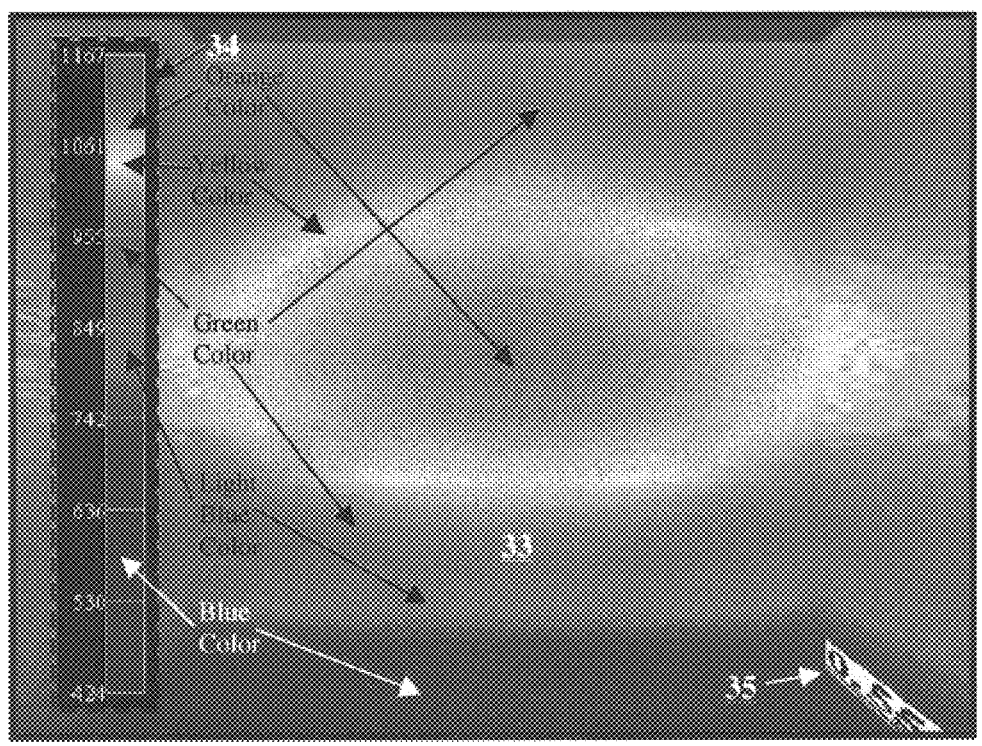
Figure 17. Inside Front of Melter by 0.55 inches with floating Temperature Legend
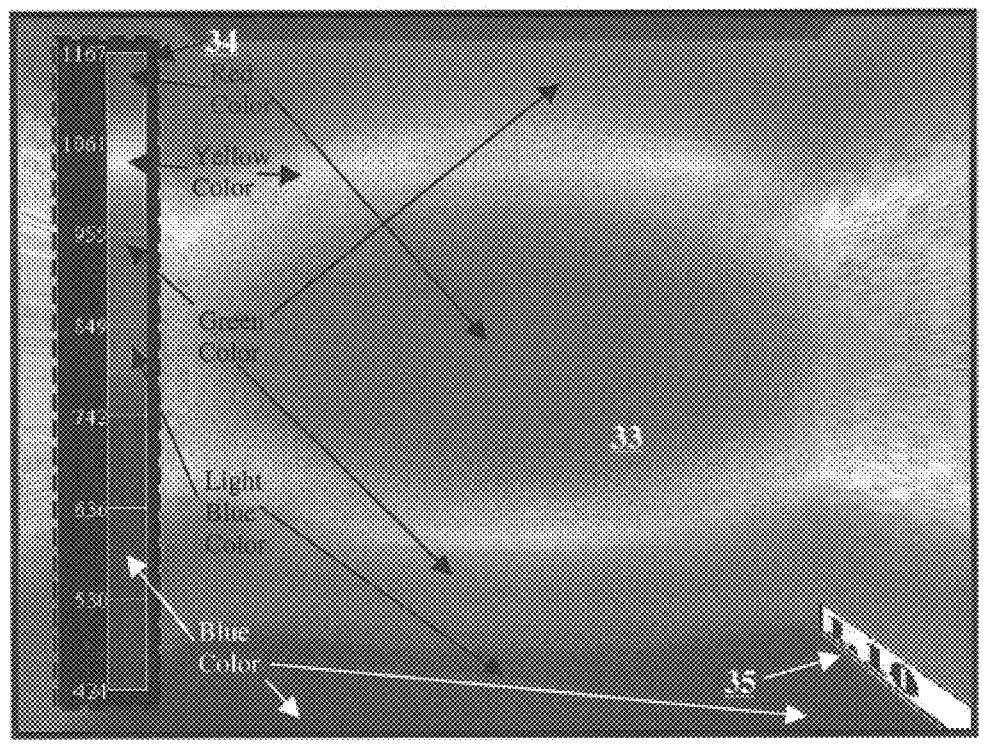
Figure 18. Inside Front of Melter by 1.10 inches with floating Temperature Legend

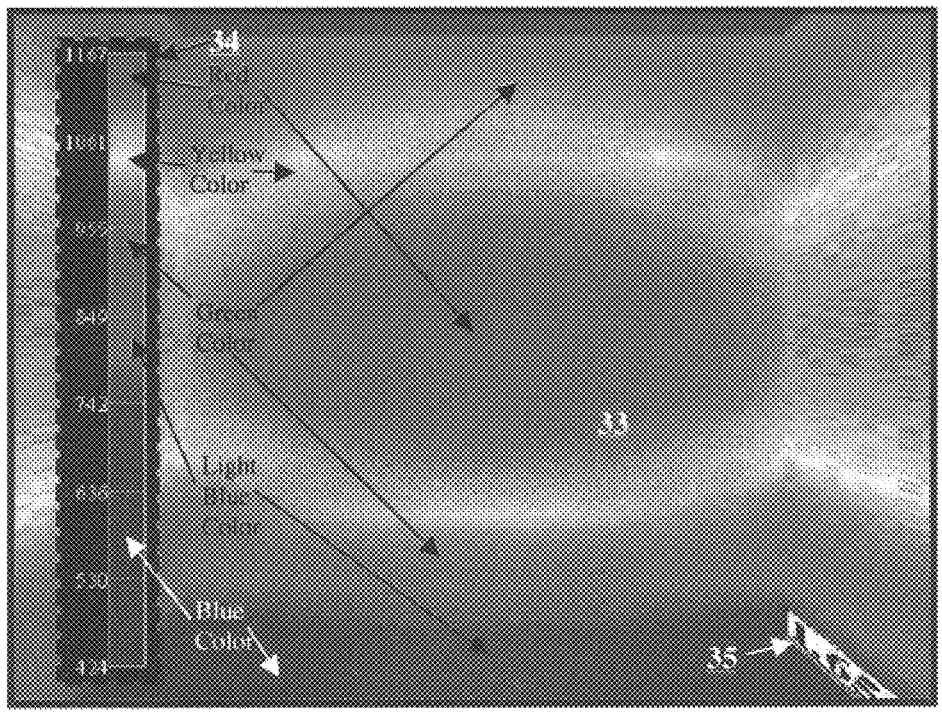
Figure 19. Inside Front of Melter by 1.65 inches with floating Temperature Legend
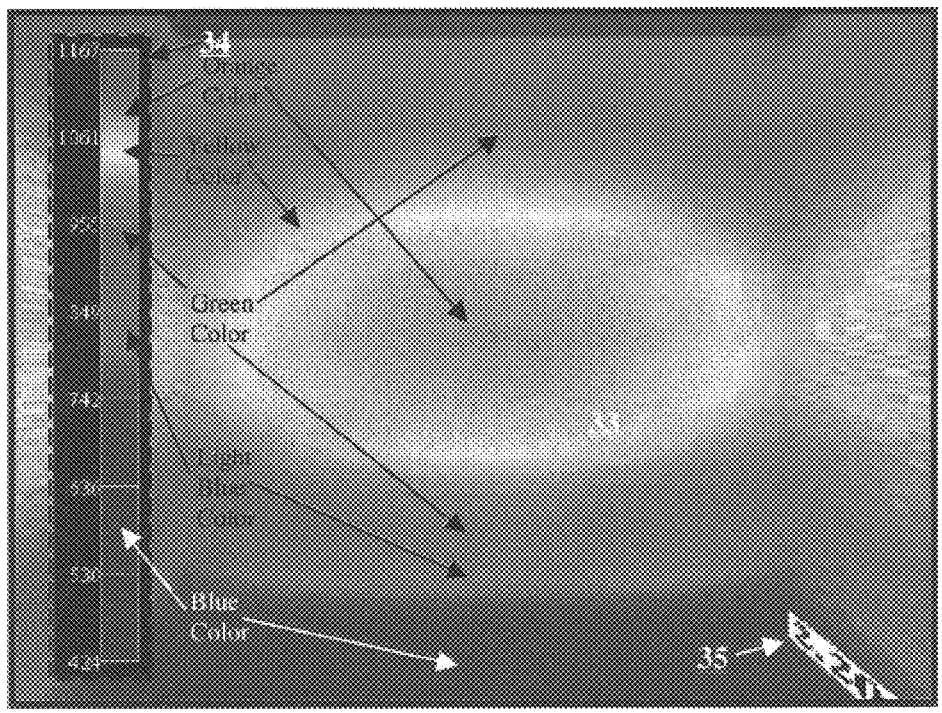
Figure 20. Inside Front of Melter by 2.20 inches with floating Temperature Legend

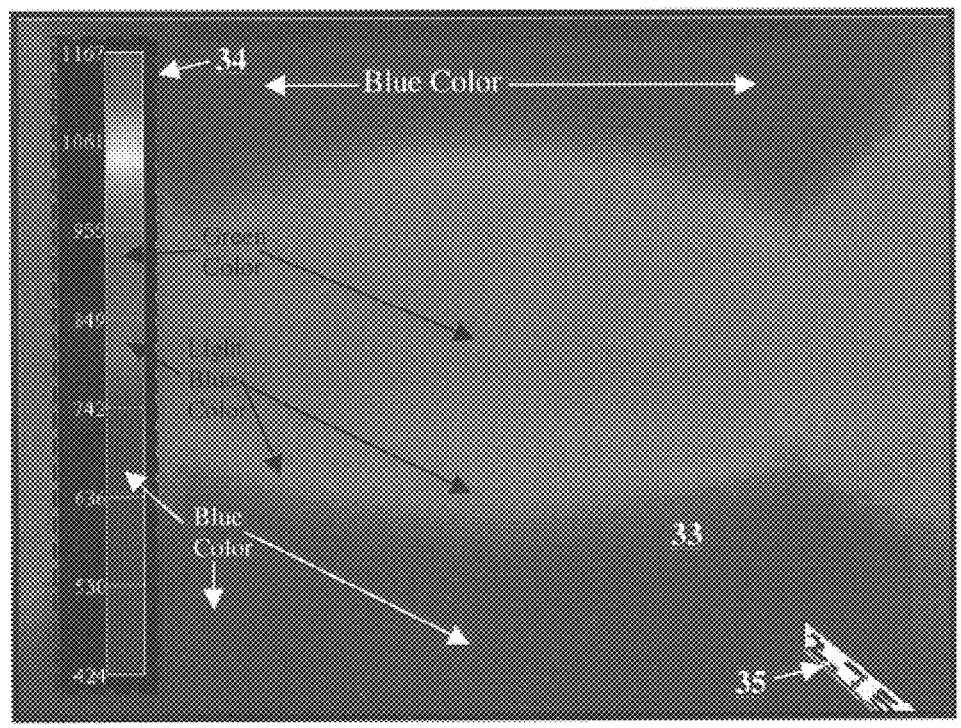
Figure 21. Inside Front of Melter by 2.75 inches with floating Temperature Legend
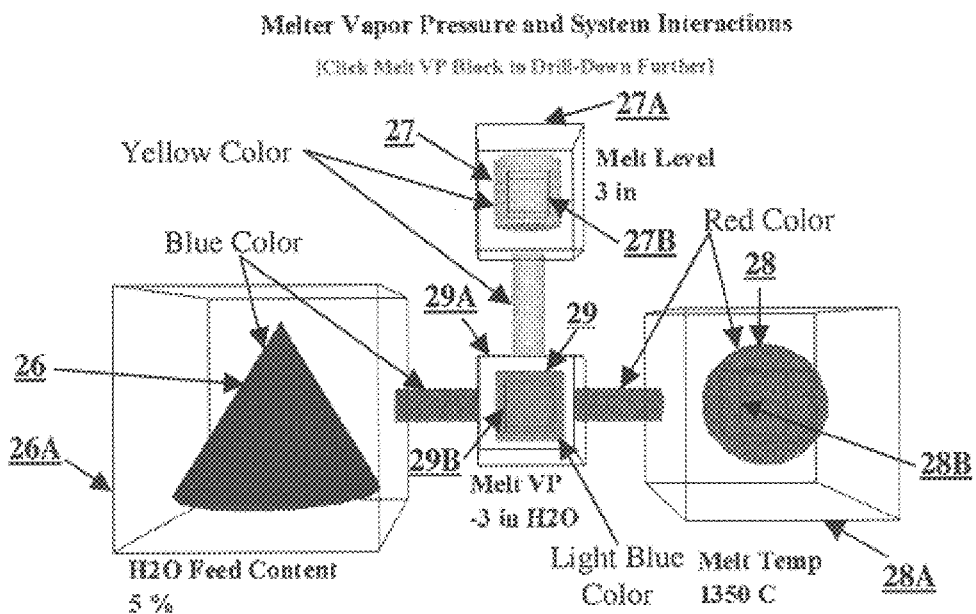
Figure 22. Front View of Variable Interaction IVR-3D world at Time Step 0

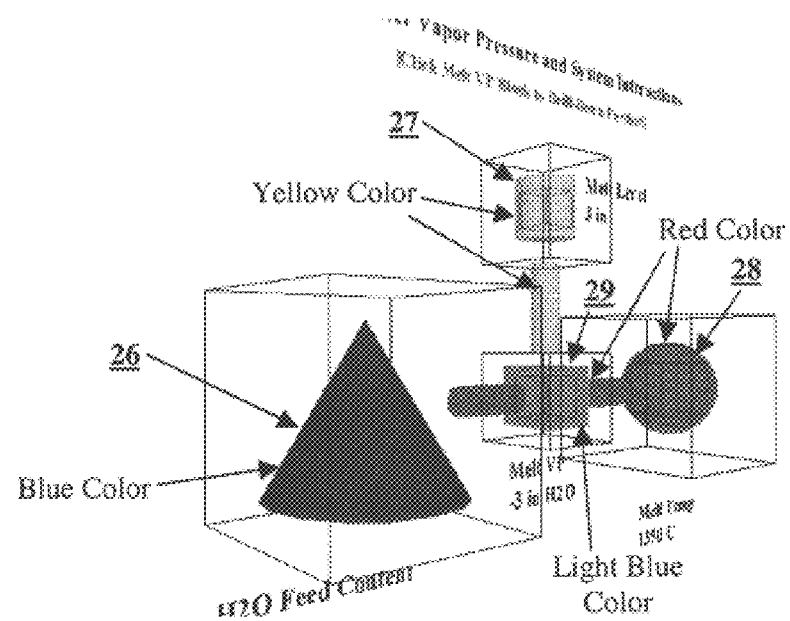
Figure 23. Front Left View of Variable Interaction IVR-3D world at Time Step 0
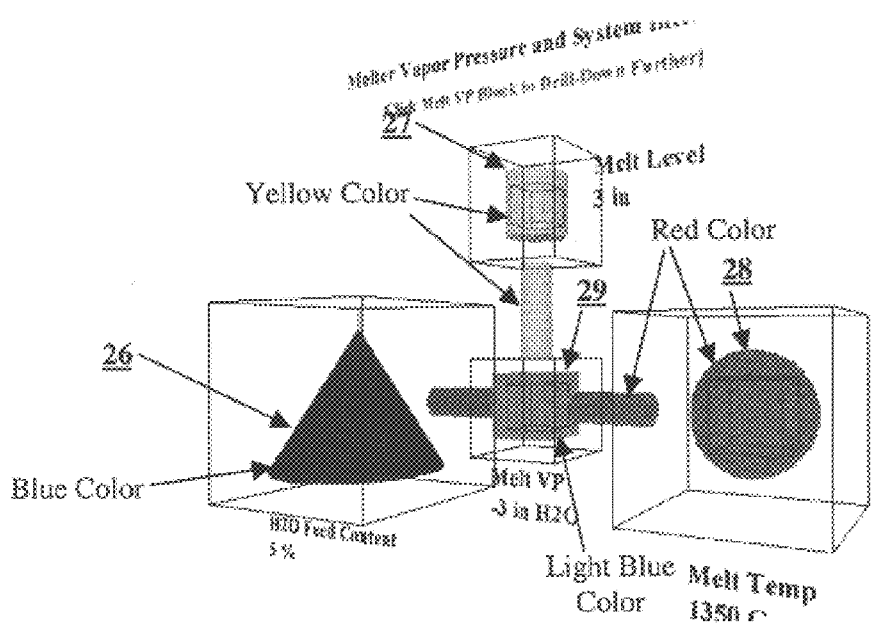
Figure 24. Front Right View of Variable Interaction IVR-3D world at Time Step 0

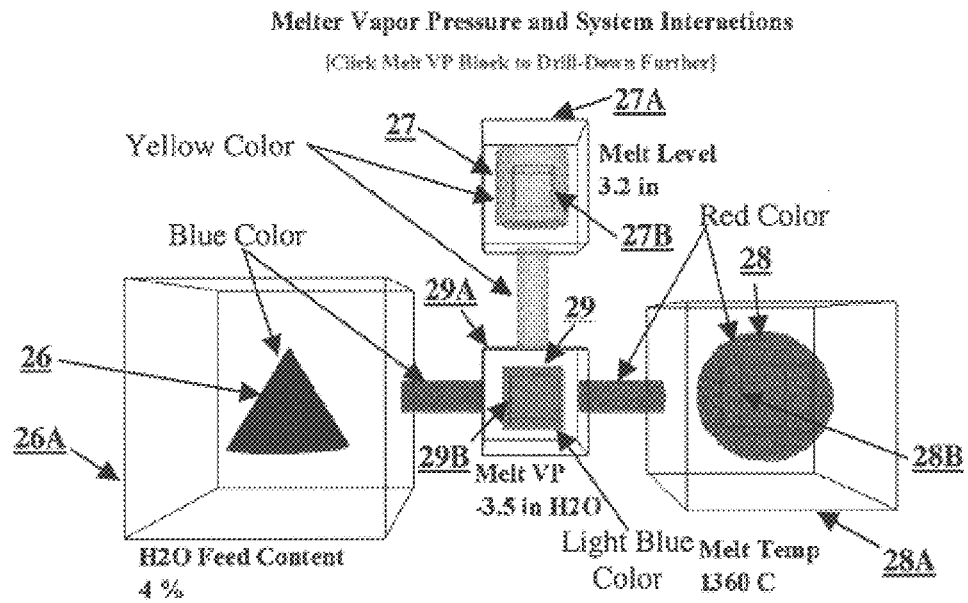
Figure 25. Front View of Variable Interaction IVR-3D world at Time Step 1
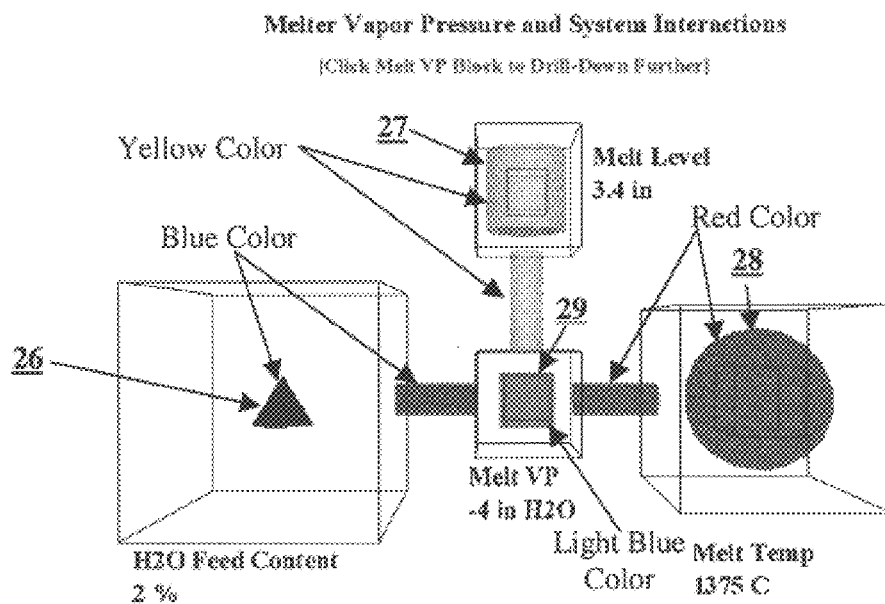
Figure 26. Front View of Variable Interaction IVR-3D world at Time Step 2

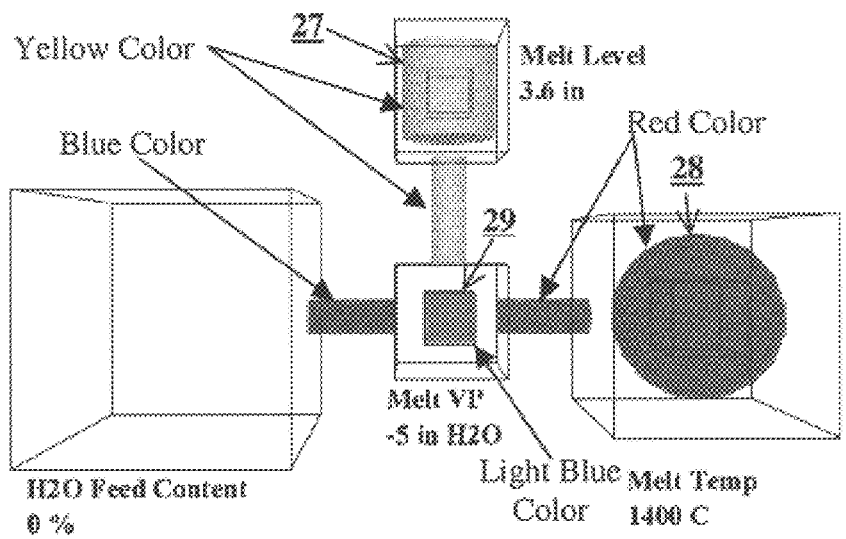
Figure 27. Front View of Variable Interaction IVR-3D world at Time Step 3
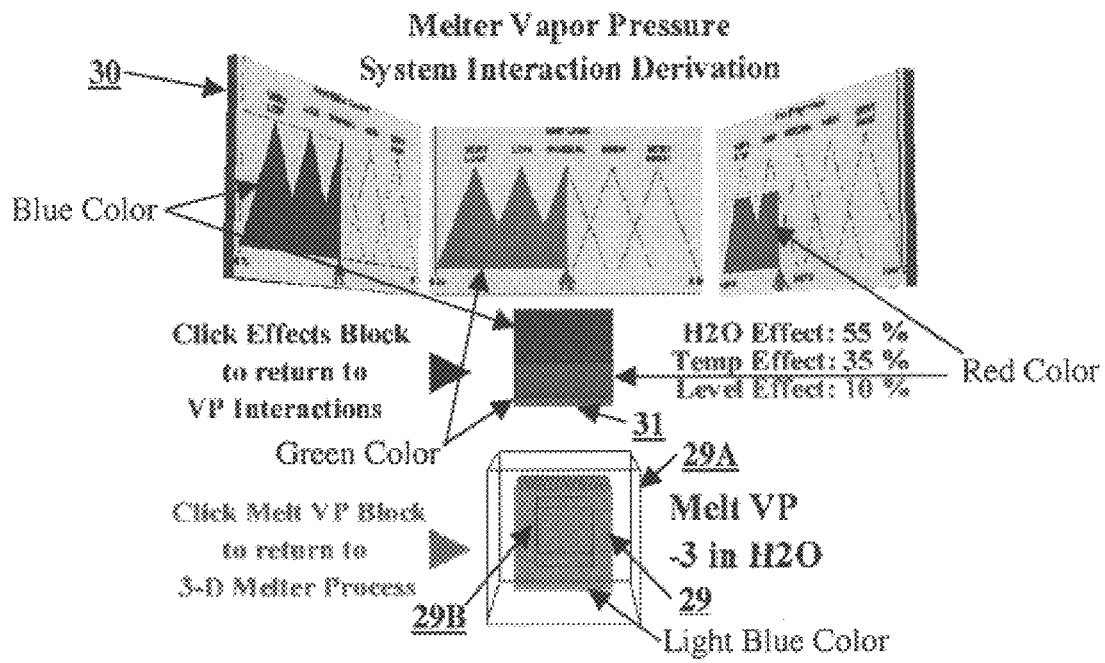
Figure 28. Front View of Detailed Derivation IVR-3D world at Time Step 0

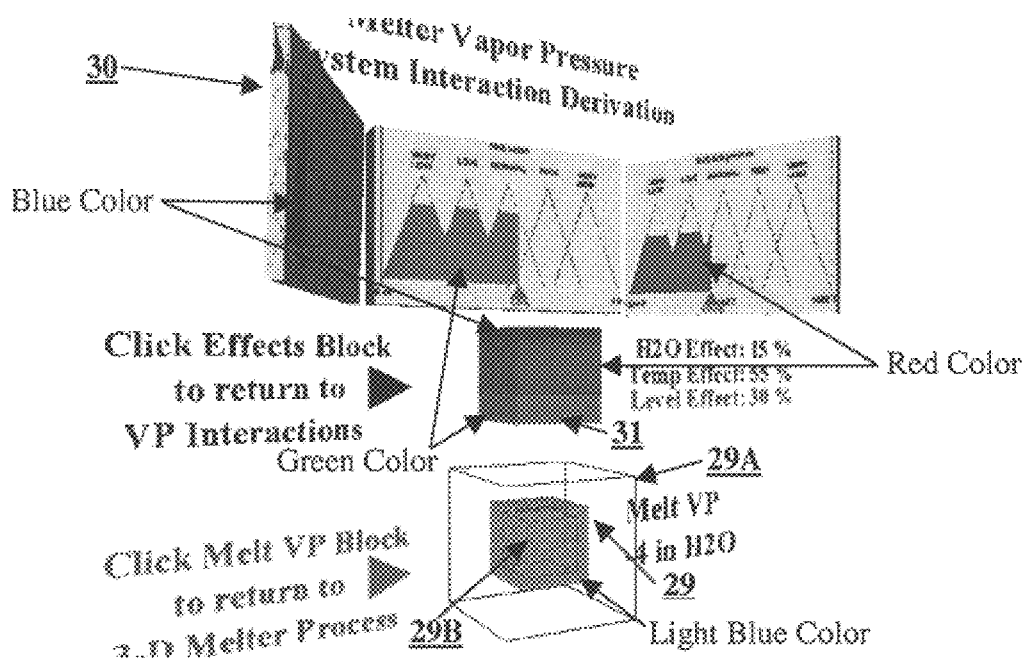
Figure 29. Front Left View of Detailed Derivation IVR-3D world at Time Step 0
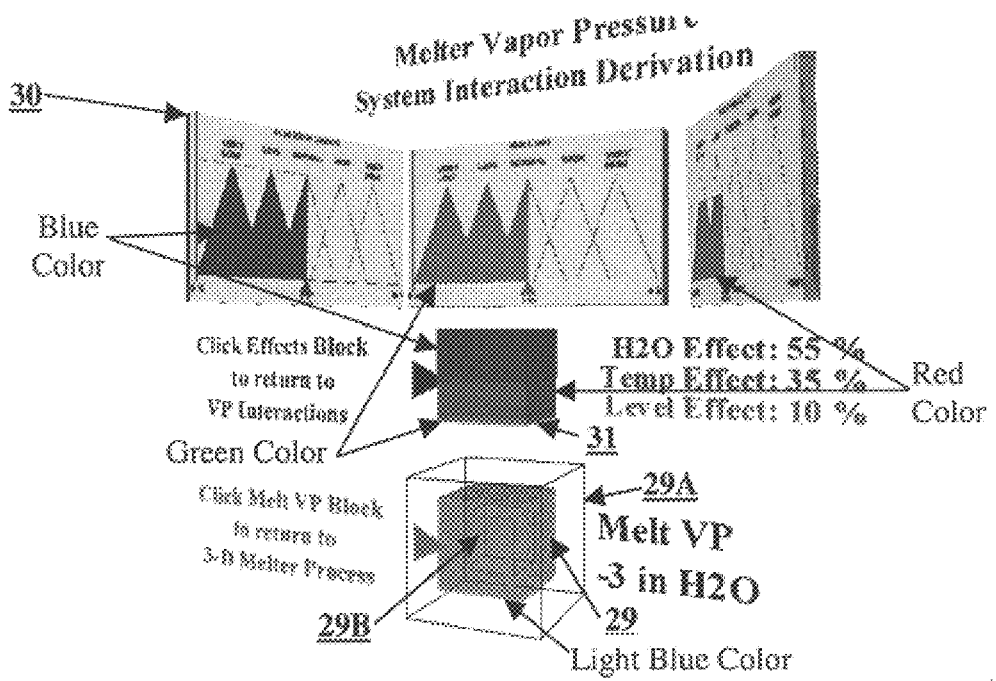
Figure 30. Front Right View of Detailed Derivation IVR-3D world at Time Step 0

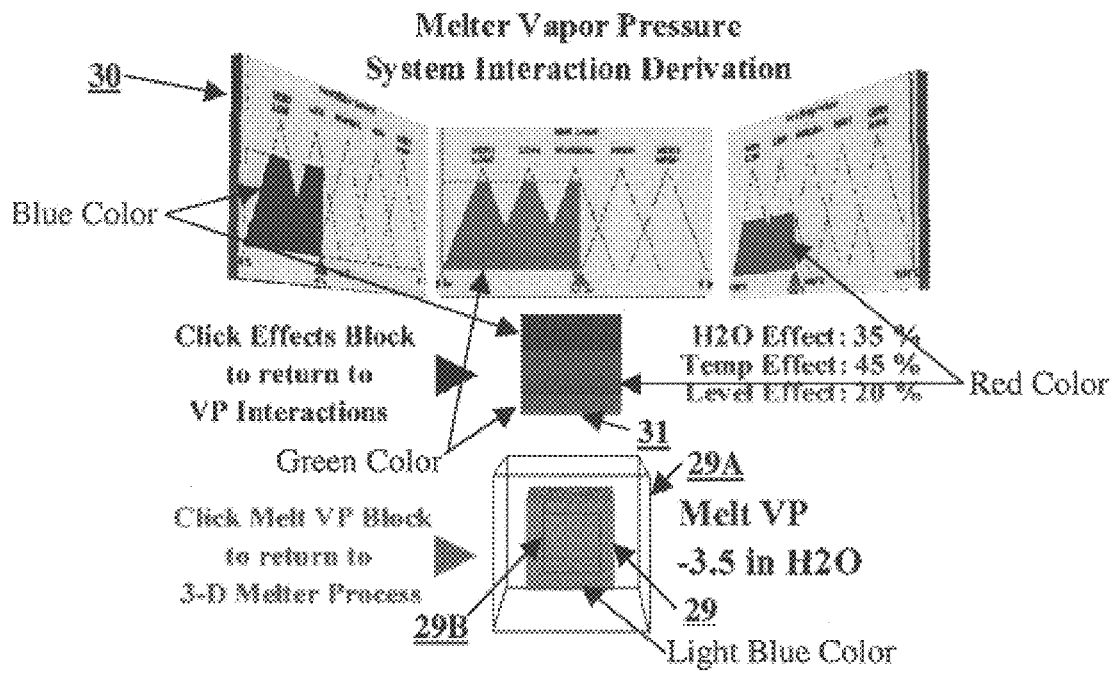
Figure 31. Front View of Detailed Derivation IVR-3D world at Time Step 1
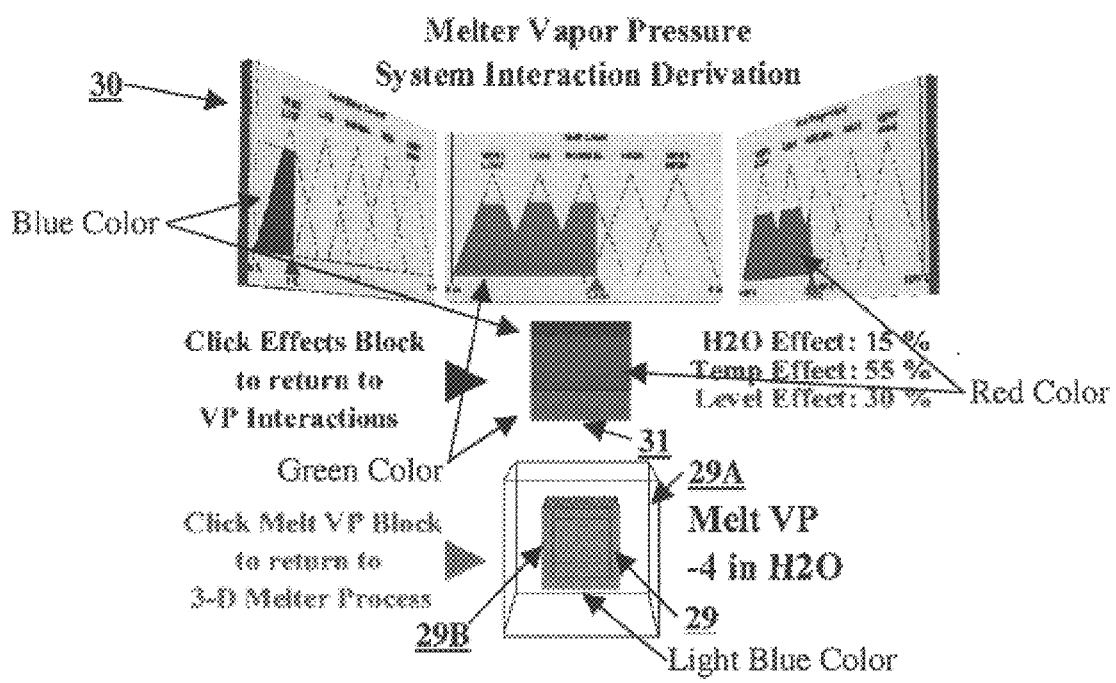
Figure 32. Front View of Detailed Derivation IVR-3D world at Time Step 2

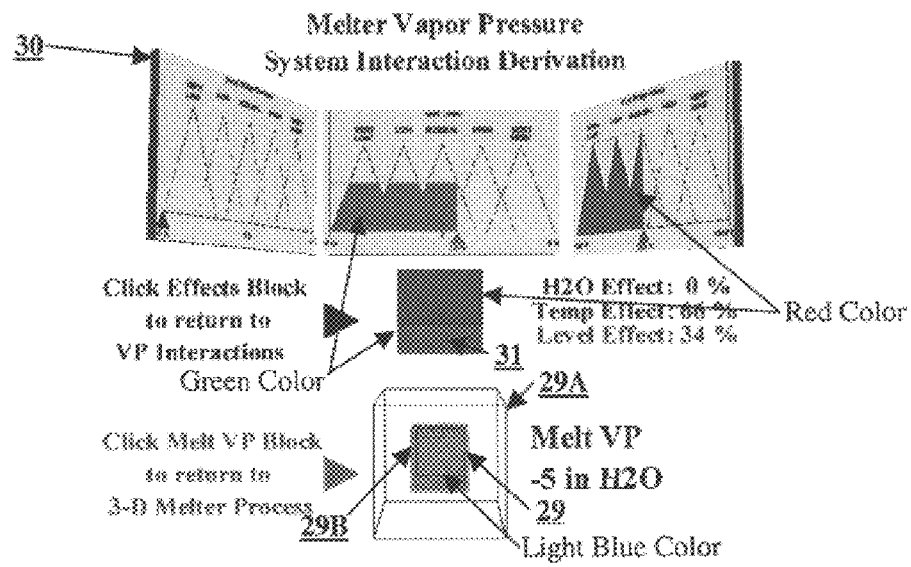
Figure 33. Front View of Detailed Derivation IVR-3D world at Time Step 3
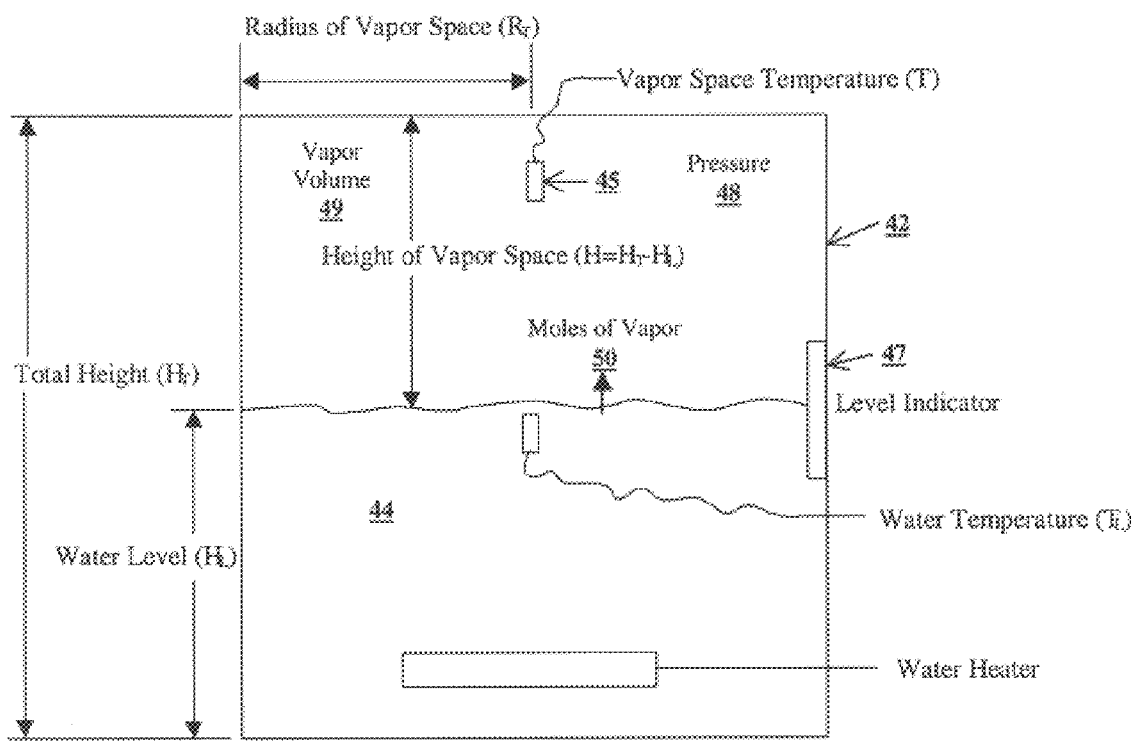
Figure 34. Understanding Vapor Space Pressure Overview

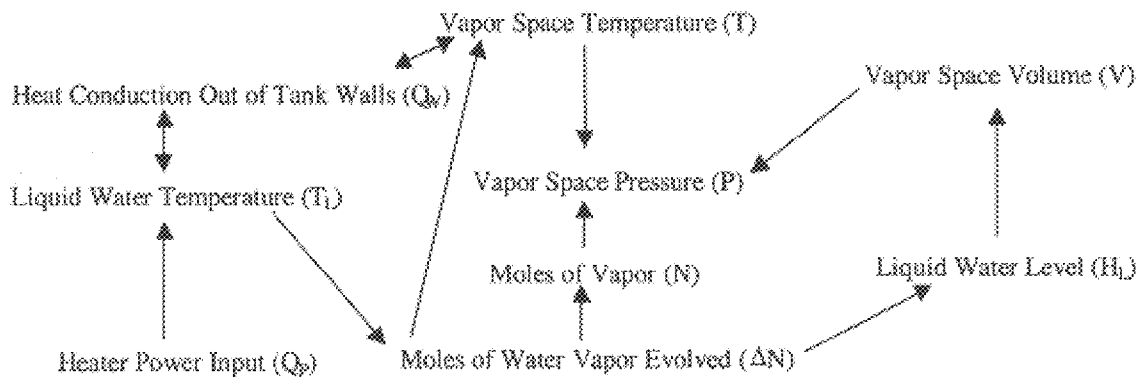
Figure 35. Inter-linked Variable Description for System
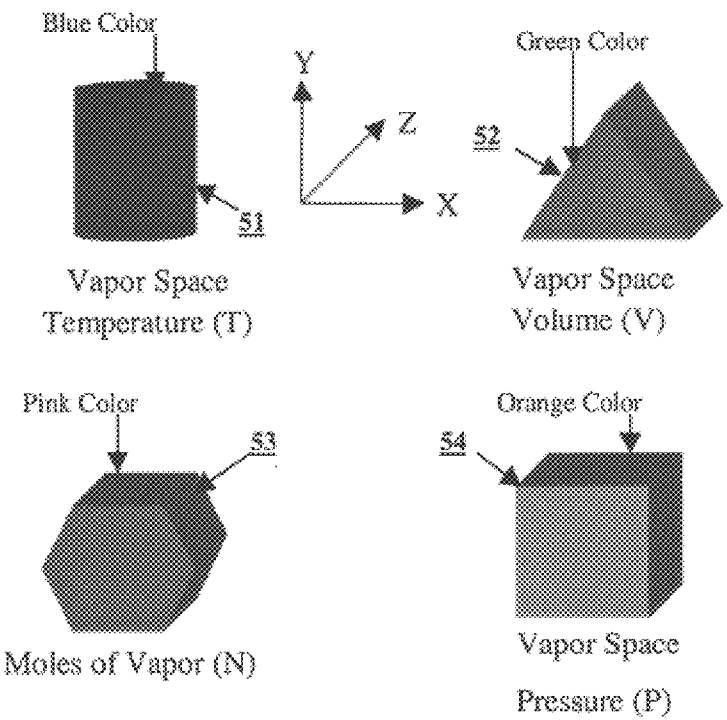
Figure 36. Identify Unique Shapes and Colors for System Variables

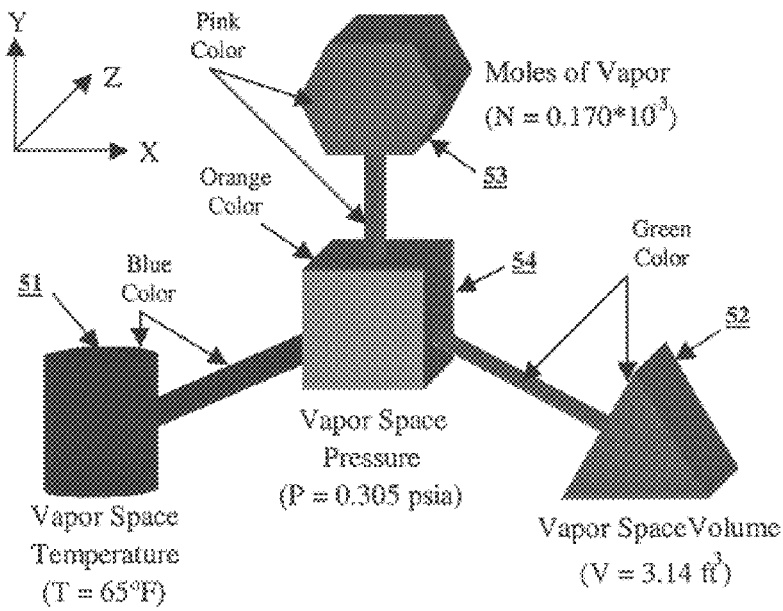
Figure 37. Virtual Reality 3-Dimensional World of Dependent and Independent Variables
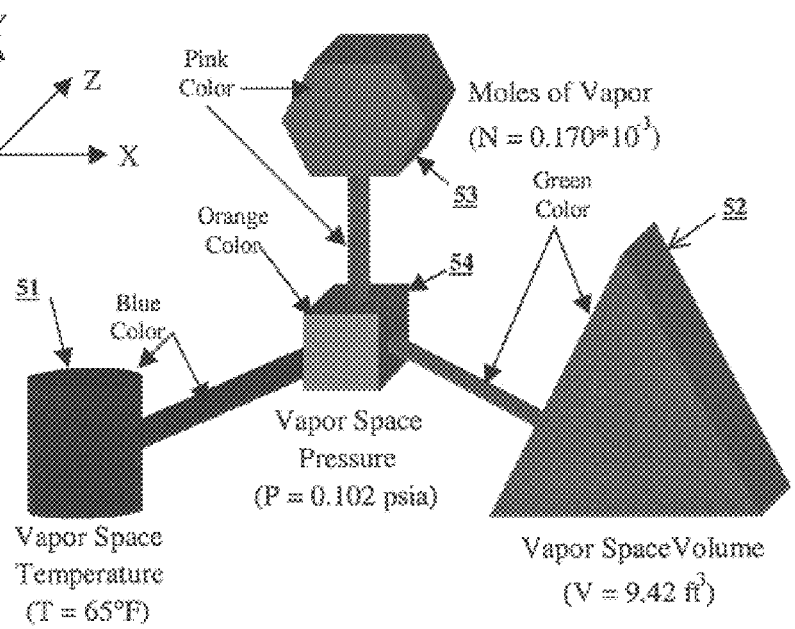
Figure 38. Increased Vapor Space Volume Effect

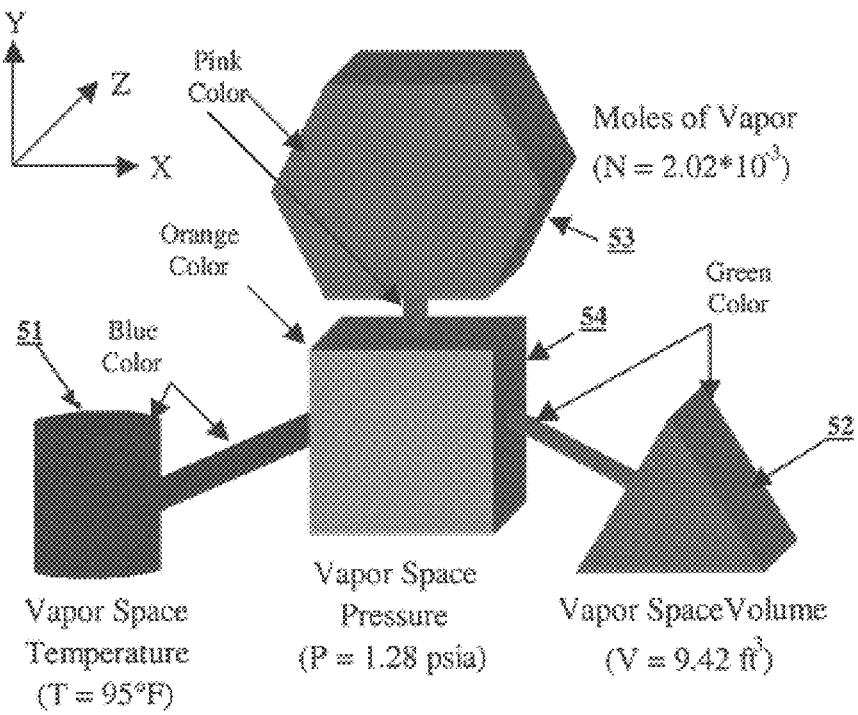
Figure 39. Increased Moles of Vapor and Vapor Space Temperature Effect
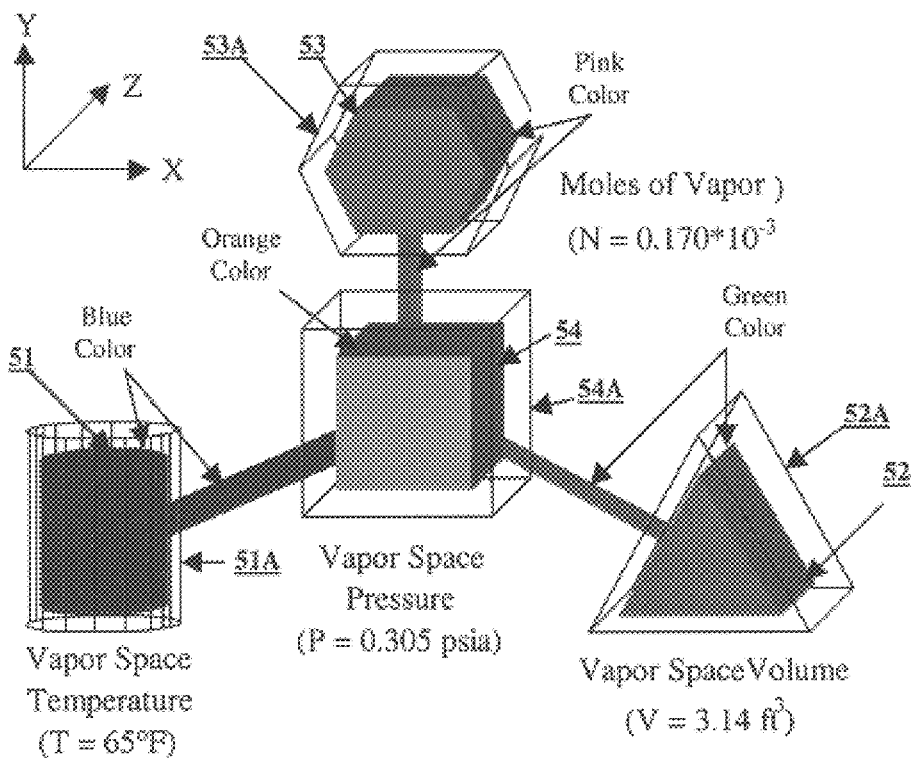
Figure 40. Upper Limits of System Variables

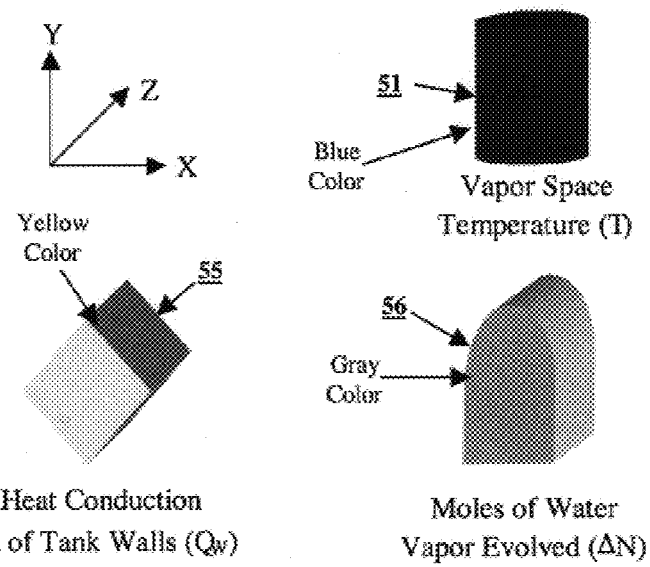
Figure 41. Identify Unique Shapes and Colors for Vapor Space Temperature Example
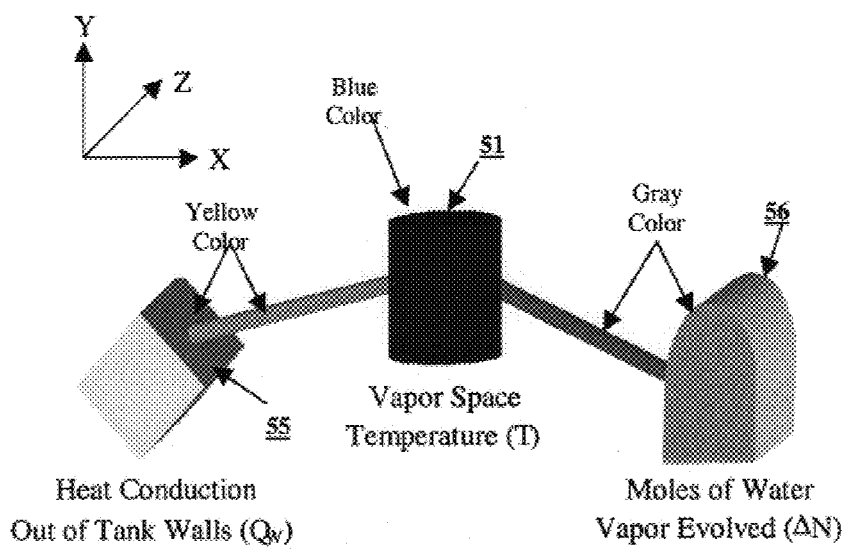
Figure 42. Vapor Space Temperature Virtual Reality World of Dependent and Independent Variables

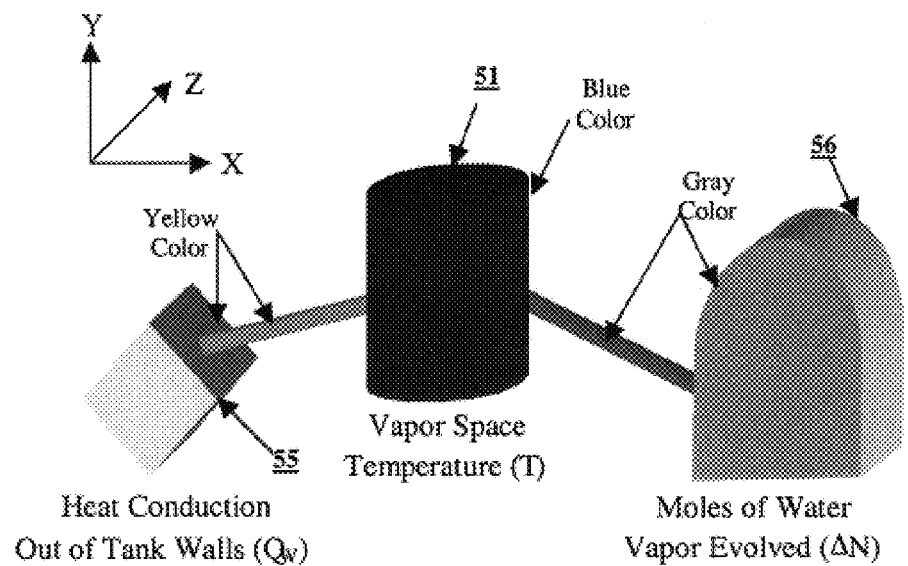
Figure 43. Increased Water Evolution Effect
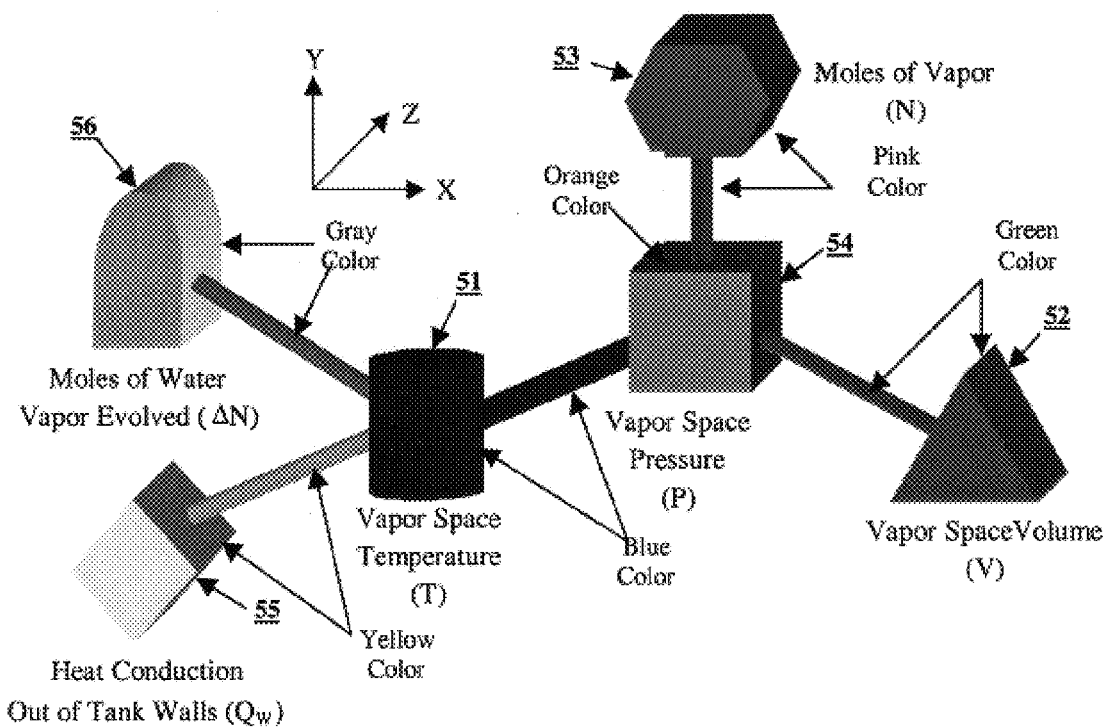
Figure 44. Virtual Reality Universe of Inter-linked System variables

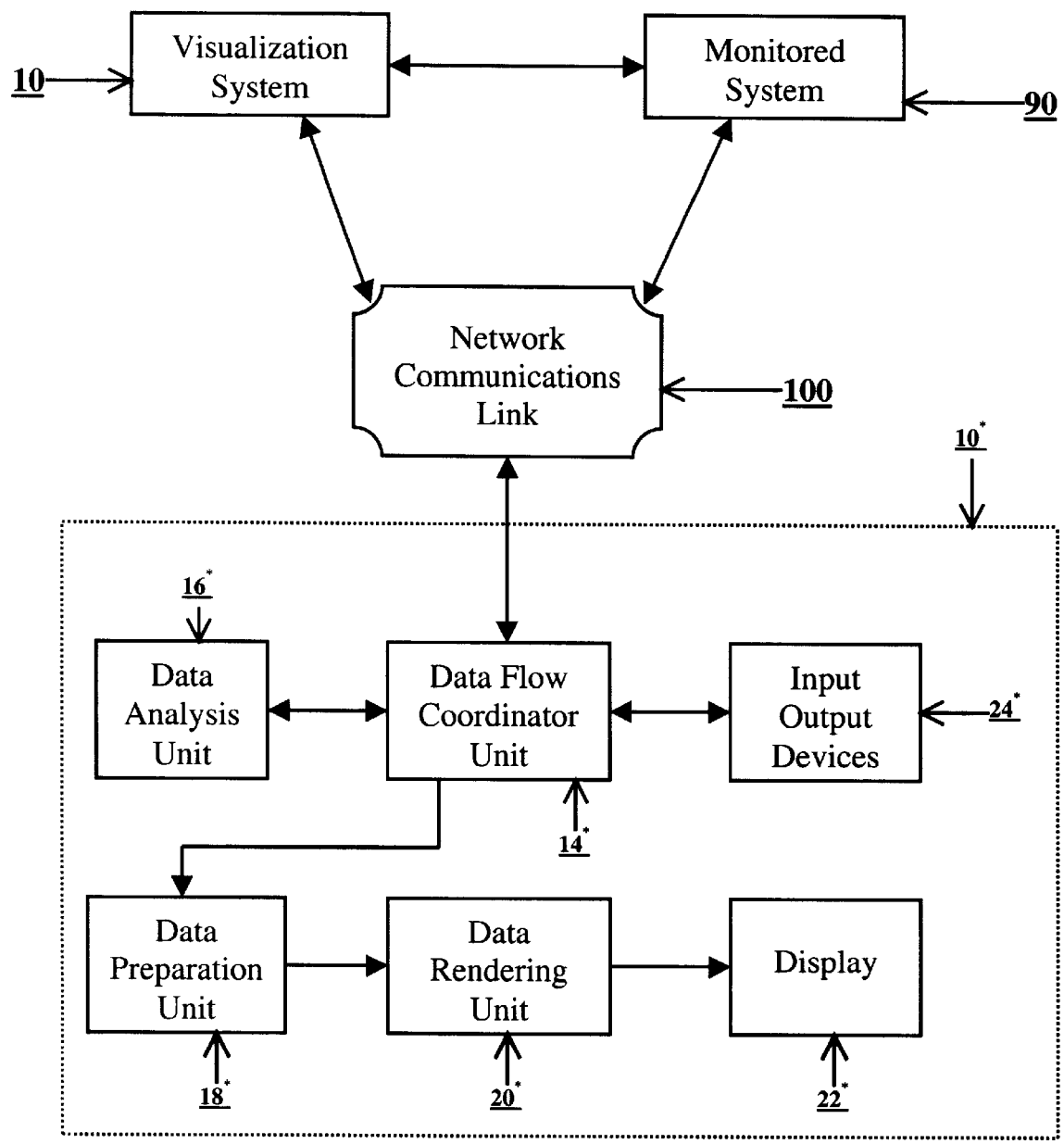
Figure 45. Block Diagram of Remote Link

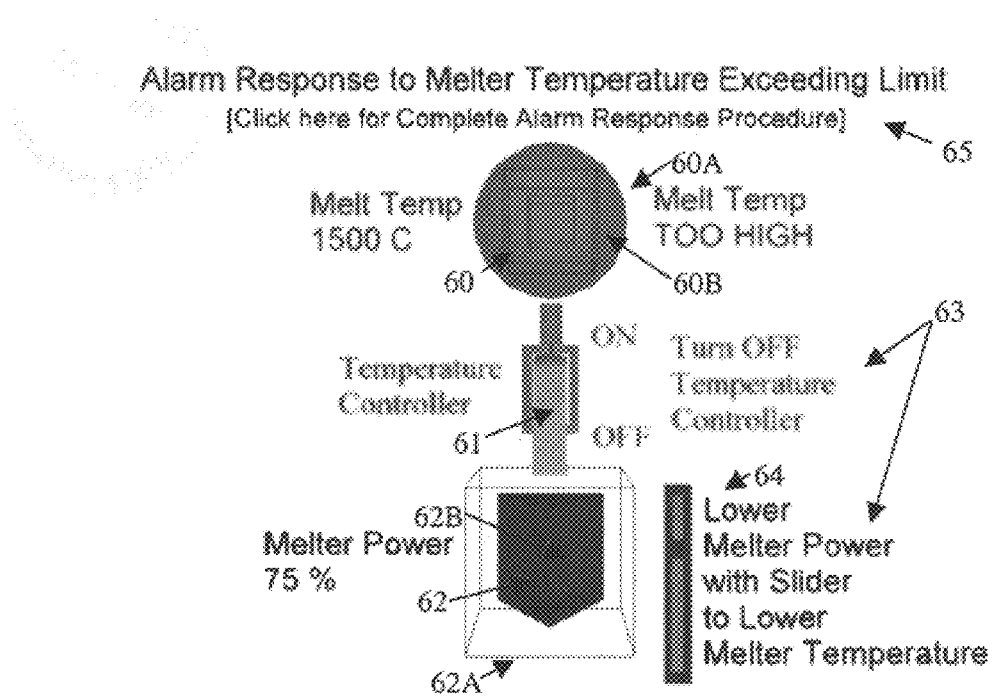
Figure 46. IVRPCS Alarm Response World for Melter Temperature Exceeding Limit

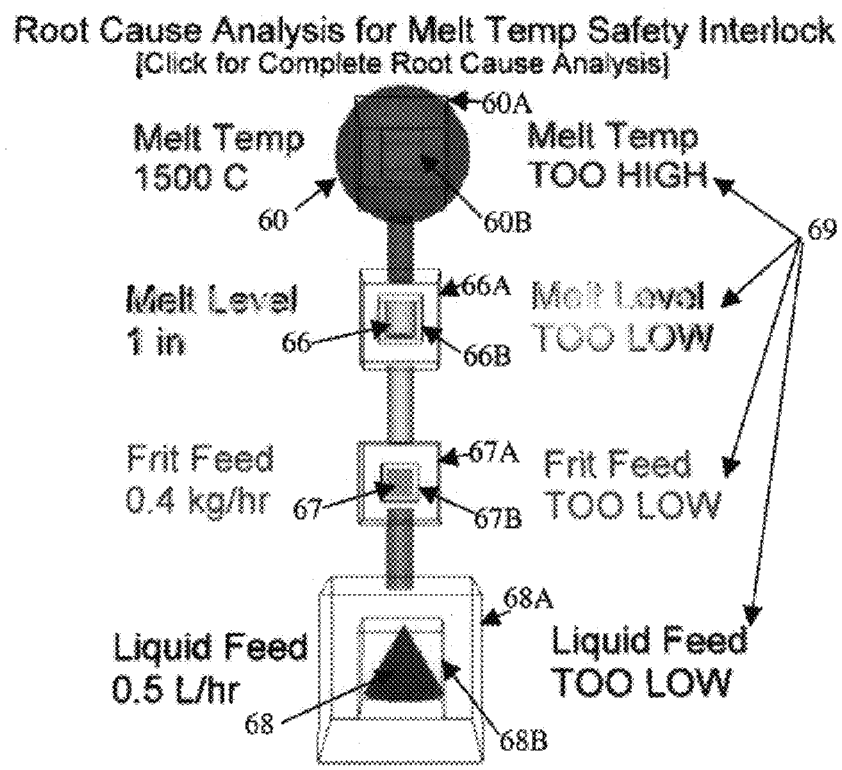
Figure 47. IVRPCS Root Cause Analysis World for Melter Temperature Safety Interlock

SYSTEMS AND METHODS FOR INTERACTIVE VIRTUAL REALITY PROCESS CONTROL AND SIMULATION

RELATED U.S. APPLICATION DATA

| U.S. Pat. No. | Patentee | Issued Date |
| --- | --- | --- |
| U.S. Pat. No. 5,021,976 | Wexelblat et al. | June 4, 1991 |
| U.S. Pat. No. 5,168,441 | Onarheim et al. | December 1, 1992 |
| U.S. Pat. No. 5,347,466 | Nichols et al. | September 13, 1994 |
| U.S. Pat. No. 5,428,740 | Wood et al. | June 27, 1995 |
| U.S. Pat. No. 5,432,894 | Funaki | July 11, 1995 |
| U.S. Pat. No. 5,524,187 | Feiner et al. | June 4, 1996 |
| U.S. Pat. No. 5,559,995 | Browning et al. | September 24, 1996 |
| U.S. Pat. No. 5,561,745 | Jackson et al. | October 1, 1996 |
| U.S. Pat. No. 5,675,746 | Marshall | October 7, 1997 |

The U.S. government has rights in this invention pursuant to contract number DE-AC09-96SR18500 between the U.S. Department of Energy and Westinghouse Savannah River Company.

FEDERALLY SPONSORED CLAIM

No federally sponsored research and development for this invention.

FIELD OF THE INVENTION

This invention relates generally to systems and methods for visualizing, managing, and controlling information and, more particularly, to systems and methods for providing Interactive Virtual Reality (IVR-3D) three-dimensional displays and other views for use in gaining knowledge from real-time, delayed-time, or fabricated data. The primary focus of the invention is on training, operations, and prediction related to manufacturing and services industries.

BACKGROUND OF THE INVENTION

Today's technology has placed us clearly in the "Information Age" and has become quite proficient in capturing and retaining data. The data or information that is available is diverse both in the sources of the data and in what the data represents. One source of data is from real-time measurements and other observations. A multitude of different sensors, from acceleration and humidity to altitude and pressure, allows data to be captured on virtually any characteristic of our environment. In addition to data that is sensed or measured, other data that we encounter is generated by ourselves, such as with word processors or spread sheets, or it comes from data that has been processed from other sources of data, such as outputs of simulation programs.

One consequence of all of this information is that the information may be simply too great to condense into useful knowledge. One example of "data overload" may be seen in a physical plant. A physical plant may have groups of sensors for monitoring fluid flows, temperatures, pressures, and levels of certain substances. The raw data coming from these sensors are often fed to a control room where the data may be displayed on groups of dials or displays. The human mind, however, is ill equipped to process the amount of data that it is being bombarded every instant with data from many different sources. It is therefore not surprising that an operator may not detect the significance of a particular piece of data, such as a particular reading of a dial. A need therefore exists for a way to monitor the data so that a person can more easily gain knowledge from it and execute the proper controls.

The problem with "data overload" is not limited to operators at a physical plant but is experienced by people in many industries. The financial industry, for example, is also prone to data overload with all of the information it receives concerning financial markets. This information includes data on dividends, stock splits, mergers or acquisitions, strategic partnerships, awards of contracts, interest rates, as well as many other aspects of the market. The medical field is another field in which data overload is prevalent. In the medical field, this information includes information on the human body, information on surgical techniques, data on particular drugs and their side effects and interaction with other substances, and real-time data, such as that captured during a surgery pertaining to a patient or regarding the state of medical devices used in surgery. In process-based manufacturing, such as biotechnology and petrochemicals, real-time data from the production stream must be combined market data about feedstocks and demand for various final products. In telecommunications, real-time data about switching centers, transmission performance, and traffic loads must be combined with market data about provisioning orders and service mixes. Without efficient methods to monitor and control this information, a person becomes overloaded with data and the information loses its essential purpose, namely as a tool to gain knowledge. In addition to the management of raw data, and management of information selected or derived from such raw data, a second problem is the difference between training and operations management environments. Often a trainee must translate the formats and frameworks of information in the training environment into information formats and frameworks of the relevant operations management environment. The closer a training environment is to the relevant operations management environment, the faster a trainee can become productive when assuming an operations management role. For instance, a person trained on several pieces of standalone equipment (not integrated into a production stream) requires substantial additional time to master using the same equipment integrated into a production stream.

A third problem is the difference between operations management and predictive tools. Manufacturing and services businesses manage resources based on predictions of resource pricing, availability, and delivery of raw materials and finished goods and services. Often a person in an operations management role must translate the information output of a predictive tool into formats and frameworks that fit more closely with the formats and frameworks used in operations management. The closer the output of predictive tools is to the relevant operations management environment, the more accurately and quickly a manager can apply the output of the predictive tools. In fully automated cases, the manager may simply need to be notified that the predictive tools are changing one or more variables in operations; in other cases, the manager may have to intervene to implement changes recommended by the predictive tools, such as replacing a type of catalyst.

Extensive operations research has shown that information management through graphics, icons, symbols, and other visualizations on computer driven displays has many advantages for human operators over displays of raw data or information. Graphical tools exist today that take raw data, process the data, and display the data as user-friendlier graphics. The graphical tools, for instance, may generate graphs or charts from which a person can detect a trend in the data. These tools allow a person to more easily view data coming from a small number of sources. With a large number of data sources or when the data is inter-related in a complex manner, a person may still have difficulty deciphering the significance of the information and in making correct operational and management decisions. Problems in deciphering information become even more difficult and expensive during an "alarm avalanche," that is, when multiple alarms are triggered which may have a root cause or have multiple unrelated causes.

Graphical tools exist today, which take raw data, process the data, and display the data in a user-friendlier manner. The graphical tools, for instance, may generate graphs or charts from which a person can detect a trend in the data. These tools allow a person to more easily view data coming from a small number of sources. With a large number of data sources or when the data are inter-related to each other, a person may still have difficulty deciphering the significance of the information.

A simulation program is another type of tool that has been developed to assist people in understanding a complex system. Simulation programs are especially beneficial when a system is characterized by a large number of variables or when the variables are inter-dependent on each other. A person inputs values for certain variables into the simulation program and the simulation program, based on mathematical relationships between the variables and based on numerical techniques, outputs resulting values of other variables. A person may therefore use a simulation program to determine the optimal values of a set of input parameters so as to maximize the values of other parameters. Simulation programs, for instance, may be used to optimize the lift of an airfoil or to maximize the strength of a steel beam.

Although simulation programs are useful in determining values of certain parameters based on other variables, simulation programs are still at best an approximation of real-life systems and do not provide the same detail of information as a real-time system. As discussed above, simulation programs use mathematical relationships between parameters in producing their outputs and these mathematical relationships only approximate real life. Simulation programs provide limited views of real-life systems.

An article by Hollan et al., entitled "Graphic Interfaces For Simulation," Advances In Man-Machine Systems Research, Vol. 3, pps. 129 to 163 (JAI Press, Inc., 1987) describes a graphical interface that uses virtual reality to represent complex relationships between variables. As the title suggests, the interface is for use with a simulation program in displaying the information to a person. Rather than receiving printouts of numerical values, a user can view the performance of a system. Icons on the display may be used to reflect values of underlying variables and permit a user to interact with the icons to change the values of those variables.

Another example of a graphical interface for helping a person to efficiently process vast amounts of information is disclosed in U.S. Pat. No. 5,021,976 to Wexelblat et al. The Wexelblat patent cites the "Graphic Interfaces For Simulation" article in its background and shares many common characteristics with the interface disclosed in that article. The system described in the Wexelblat patent incorporates definitions of mathematical relationships that are movable within an information space. An automatic icon is defined by associating certain graphical primitives with certain mathematical relationships so that the appearance of the icon automatically changes as a result of a correlation between the mathematical relationships and contents of the information space.

As with simulation programs in general, the usefulness of the system in the Wexelblat patent or the Hollan et al. article is limited by the accuracy of the mathematical relationships. The system in the Wexelblat patent is therefore a simulation tool and does not represent real-time data or real systems. The systems in the Wexelblat patent and Hollan et al. article also do not permit a person to gain knowledge on the inter-dependence of variables. Without knowing the dependence between variables, a person cannot truly grasp the importance of a variable with regards to the other variables. As a result, significant information is not conveyed to the user.

U.S. Pat. No. 5,675,746 to Marshall describes a virtual reality generator for use with financial information. The virtual reality generator can dynamically change and continuously update the virtual reality world. Three-dimensional objects called metaphors are used to represent specific financial information to the viewer, such as the degree of capitalization, color, reported profits or losses, price change, or reports of a dividend. This virtual reality generator is useful in determining the current state of the financial market but has its limitations. The Marshall patent, for instance, does not readily allow a person to understand causal effects within the financial market. A person, for instance, cannot easily see the effect of one piece of financial data on the financial market. The user may therefore miss the significance of a particular piece of information. The Wexelblat and Marshall patents and the Hollan et al. paper do disclose a distributed network architecture in which the virtual reality system provides remote access to users.

Among other functions disclosed below, the IVRPCS invention addresses existing problems in the integration of training, operations, and/or prediction into a comprehensive framework of worlds and views. Also IVRPCS has the ability to navigate between or among worlds, especially using "drill-down" and "drill-across" techniques and event-dependent collections of views, such as views presented in an alarm condition. IVRPCS allows the distribution of the worlds and views over a local area network and/or wide area network for remote use or collaborative use. Other objects and advantages besides those discussed above shall be apparent to those of ordinary skill in the art from the description of a preferred embodiment of the invention, which follows. In the description, reference is made to the accompanying drawings, which form a part hereof, and which illustrate examples of the invention. Such examples, however, are not exhaustive of the various embodiments of the invention, and therefore reference is made to the claims, which follow the description for determining the scope of the invention.

SUMMARY OF THE INVENTION

Previous virtual reality systems have been used to simulate process control, but not to actually control a process, or to provide training and predictive functionality integrated with the interactive virtual reality system used to control process operations. "Process" means both a physical process, such as the making of glass, and a computational process, such as optimizing yields on an investment portfolio. A preferred embodiment of this invention is a system for the creation of interactive virtual reality 3-dimensional worlds for the purpose of conveying information and/or effecting control in one, or any combination of, process monitoring, process control, process prediction, and process training. These interactive virtual reality worlds have the capability of handling and presenting data and information in real time, calculated, or archived data, or a combination thereof. Multiple interactive virtual reality worlds can be created for the purpose of conveying different segments of information produced by the process. Among the useful and potential interactive virtual reality worlds are process overview, linked variables, detail derivation, and raw data. The interactive virtual reality process control and simulation invention provides methods for navigating within or between any interactive virtual reality world(s) for the purpose of understanding the source data or information derived from source data. In a preferred embodiment, the creation of the interactive virtual reality worlds is accomplished by four components: a data flow coordinator, a data analysis unit, a data preparation unit, and a data rendering unit. One preferred embodiment includes methods for presenting root cause and predictive analysis in 2-dimensional and interactive virtual reality 3-dimensional worlds. Another preferred embodiment of this invention allows the invention to be implemented in network architectures in which users are in close proximity to a subject process, or in which users are distant from a subject process.

It is an object of the present invention to provide systems and methods for creating interactive virtual reality 3-dimensional worlds for the purpose of conveying information and effecting control in one, or any combination of, process monitoring, process control, process prediction, and process training.

It is another object of the present invention to provide systems and methods that create interactive virtual reality worlds that have the capability of handling and presenting data and information in real time, by calculation, or from archived data, or a combination thereof. It is further an object of the present invention to provide systems and methods that create interactive virtual reality worlds that have the capability of conveying inter-dependency among variables within a system, including root cause analysis.

It is further an object of the present invention to provide systems and methods that create interactive virtual reality worlds by using a data flow coordinator, a data analysis unit, a data preparation unit, and a data rendering unit.

It is further an object of the present invention to provide systems and methods that create interactive virtual reality worlds by using network architectures in which users are in close proximity to a subject process, or in which users are distant from a subject process.

In accordance with the invention, there is therefore provided a method of computer generation of an interactive virtual reality world for monitoring and/or controlling a process that is physical or computational, comprising:

constructing a first group of one or more related screen displays associated with the operation of an industrial or commercial process, which screen displays, called raw data views, are analog representations or alphanumeric equivalents of outputs from at least two signal interfaces of equipment or computational module in the industrial/commercial process that is to be monitored or controlled;

constructing a second group of one or more related screen displays associated with the operation of an industrial or commercial process, which screen displays, called derived views, include visual representations, called output objects, of one or more processing variables or of one or more units of processing equipment in the industrial or commercial process that is to be monitored or controlled, which output objects are derived from outputs from analog or digital signal output, or from analog or digital sensor interfaces of equipment, or from computational modules in the industrial or commercial process that is to be monitored or controlled;

constructing in the derived views one or more visual representations, called input objects, of controllable elements in the industrial or commercial process that is to be controlled or monitored, which input objects include visual representations of adjustable parameters, called control elements, associated with an analog or digital control signal input interface of a controllable element of a unit of equipment or of a computational module in the industrial or commercial process that is to be controlled or monitored;

interfacing the input objects, including the control elements thereof, with the corresponding inputs of control signal interfaces of equipment in the industrial or commercial process that is to be controlled so that changing the control elements through manipulation by mouse, keyboard command, or by other input device associated with the computer displaying the derived view, a value or state of a control element in an input object causes a corresponding change in the analog or digital control signal presented at the corresponding control signal input interface of a unit of equipment or of a computational module in the industrial or commercial process that is to be controlled; and controlling a unit of equipment or of a computational module in the industrial or commercial process through manipulation of the control elements.

The invention further provides a system for the computer generation of an interactive virtual reality world for monitoring and controlling a process that is physical or computational, comprising:

a means for constructing a first group of one or more related screen displays associated with the operation of an industrial or commercial process, which screen displays, called raw data views, are analog representations or alphanumeric equivalents of outputs from at least two signal interfaces of equipment or computational module in the industrial or commercial process that is to be monitored or controlled;

a means for constructing a second group of one or more related screen displays associated with the operation of an industrial or commercial process, which screen displays, called derived views, include visual representations, called output objects, of one or more processing variables or of one or more units of processing equipment or computational modules in the industrial or commercial process that is to be monitored or controlled, which output objects are derived from outputs from analog or digital control signal output, or from analog or digital sensor interfaces of equipment in the industrial or commercial process that is to be monitored or controlled;

a means constructing in the derived views one or more visual representations, called input objects, of controllable elements in the industrial or commercial process that is to be controlled, which input objects include visual representations of adjustable parameters, called control elements, associated with an analog or digital control signal input interface of a controllable element of a unit of equipment or of a computational module in the industrial or commercial process that is to be controlled;

a means for interfacing the input objects, including the control elements thereof, with the corresponding inputs of control signal interfaces of equipment in the industrial or commercial process that is to be controlled so that changing the control elements through manipulation by mouse, keyboard command, or by other input device associated with the computer displaying the derived view, a value or state of a control element in an input object causes a corresponding change in the analog or digital control signal presented at the corresponding control signal input interface of a unit of equipment or of a computational module in the industrial or commercial process that is to be controlled; and a means for controlling a unit of equipment or of a computational module in the industrial or commercial process through manipulation of the control elements.

Other objects, features, and advantages of the present invention will be apparent by inspection of the remainder of this document.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The accompanying drawings, which are incorporated in and form a part of the specification, illustrate preferred embodiments of the present invention and, together with the description, serve to explain the principles of the invention. In the drawings:

FIG. 1, Block Diagram of Interactive Virtual Reality Process Control, is a block diagram of the interactive virtual reality 3-dimensional system according to a preferred embodiment of the invention;

FIG. 2, Bushing Melter Example, is representation of a bushing melter used in the figures that follow.

FIG. 3, 3-D Process Overview Interactive IVR-3D world Example showing front of bushing melter process, is a graphical representation of the Process Overview component by the invention of FIG. 1;

FIG. 4, 3-D Process Overview Interactive IVR-3D world Example showing right front of bushing melter process, is a graphical representation of the Process Overview component by the invention of FIG. 1;

FIG. 5, 3-D Process Overview Interactive IVR-3D world Example showing back left of bushing melter process, is a graphical representation of the Process Overview component by the invention of FIG. 1;

FIG. 6, 3-D Process Overview Interactive IVR-3D world Example showing back right of bushing melter process, is a graphical representation of the Process Overview component by the invention of FIG. 1;

FIG. 7, 3-D Process Overview Interactive IVR-3D world Example showing left front of bushing melter process, is a graphical representation of the Process Overview component by the invention of FIG. 1;

FIG. 8, Right Side of Bushing Melter showing front with temperature legend as floating palette, is a graphical representation of the walk through capability of the invention of FIG. 1;

FIG. 9, Right Side of Bushing Melter showing back with temperature legend as floating palette, is a graphical representation of the walk through capability of the invention of FIG. 1;

FIG. 10, Inside Right Side of Melter by 2 inches with floating temperature legend, is a graphical representation of the walk through capability of the invention of FIG. 1;

FIG. 11, Inside Right Side of Melter by 4 inches with floating temperature legend, is a graphical representation of the walk through capability of the invention of FIG. 1;

FIG. 12, Inside Right Side of Melter by 6 inches with floating temperature legend, is a graphical representation of the walk through capability of the invention of FIG. 1;

FIG. 13, Inside Right Side of Melter by 8 inches with floating temperature legend, is a graphical representation of the walk through capability of the invention of FIG. 1;

FIG. 14, Inside Right Side of Melter by 10 inches with floating temperature legend, is a graphical representation of the walk through capability of the invention of FIG. 1;

FIG. 15, Front of Bushing Melter showing Left Side with temperature legend as floating palette, is a graphical representation of the walk through capability of the invention of FIG. 1;

FIG. 16, Front of Bushing Melter showing Right Side with temperature legend as floating palette, is a graphical representation of the walk through capability of the invention of FIG. 1;

FIG. 17, Inside Front of Bushing Melter by 0.55 inches with temperature legend as floating palette, is a graphical representation of the walk through capability of the invention of FIG. 1;

FIG. 18, Inside Front of Bushing Melter by 1.10 inches with temperature legend as floating palette, is a graphical representation of the walk through capability of the invention of FIG. 1;

FIG. 19, Inside Front of Bushing Melter by 1.65 inches with temperature legend as floating palette, is a graphical representation of the walk through capability of the invention of FIG. 1;

FIG. 20, Inside Front of Bushing Melter by 2.20 inches with temperature legend as floating palette, is a graphical representation of the walk through capability of the invention of FIG. 1;

FIG. 21, Inside Front of Bushing Melter by 2.75 inches with temperature legend as floating palette, is a graphical representation of the walk through capability of the invention of FIG. 1;

FIG. 22, Front View of Variable Interaction IVR-3D world at Time Step 0, is a graphical representation of the Variable Interaction component in real time by the invention of FIG. 1;

FIG. 23, Front Left View of Variable Interaction IVR-3D world at Time Step 0, is a graphical representation of the Variable Interaction component in real time by the invention of FIG. 1;

FIG. 24, Front Right View of Variable Interaction IVR-3D world at Time Step 0, is a graphical representation of the Variable Interaction component in real time by the invention of FIG. 1;

FIG. 25, Front View of Variable Interaction IVR-3D world at Time Step 1, is a graphical representation of the Variable Interaction component in real time by the invention of FIG. 1;

FIG. 26, Front View of Variable Interaction IVR-3D world at Time Step 2, is a graphical representation of the Variable Interaction component in real time by the invention of FIG. 1;

FIG. 27, Front View of Variable Interaction IVR-3D world at Time Step 3, is a graphical representation of the Variable Interaction component in real time by the invention of FIG. 1;

FIG. 28, Front View of Detailed Derivation IVR-3D world at Time Step 0, is a graphical representation of the Detailed Derivation component in real time by the invention of FIG. 1;

FIG. 29, Front Left View of Detailed Derivation IVR-3D world at Time Step 0, is a graphical representation of the Detailed Derivation component in real time by the invention of FIG. 1;

FIG. 30, Front Right View of Detailed Derivation IVR-3D world at Time Step 0, is a graphical representation of the Detailed Derivation component in real time by the invention of FIG. 1;

FIG. 31, Front View of Detailed Derivation IVR-3D world at Time Step 1, is a graphical representation of the Detailed Derivation component in real time by the invention of FIG. 1;

FIG. 32, Front View of Detailed Derivation IVR-3D world at Time Step 2, is a graphical representation of the Detailed Derivation component in real time by the invention of FIG. 1;

FIG. 33, Front View of Detailed Derivation IVR-3D world at Time Step 3, is a graphical representation of the Detailed Derivation component in real time by the invention of FIG. 1;

FIG. 34, Understanding Vapor Space Pressure Overview, is a diagram of an example of a system being monitored by the IVRPCS system of FIG. 1;

FIG. 35, Inter-linked Variable Description for System, is a diagram of inter-dependency of variables associated with the monitored system of FIG. 1;

FIG. 36 to FIG. 40 depict a method according to the invention by which parameters or elements of a monitored system may be linked together and by which boundaries may be set;

FIG. 41 to FIG. 44 provide a second example of the method by which parameters or elements of a monitored system may be linked and further show the joining of a virtual reality world defined by FIG. 41 through FIG. 43 with a virtual reality world defined in FIG. 36 through FIG. 40;

FIG. 45 is a block diagram showing a remote IVRPCS system.

FIG. 46. IVRPCS Alarm Response World for Melter Temperature Exceeding Limit.

FIG. 47. IVRPCS Root Cause Analysis World for Melter Temperature Safety Interlock.

DETAILED DESCRIPTION OF THE INVENTION

I. Overview

With reference to FIG. 1, an Interactive Virtual Reality Process Control and Simulation (IVRPCS) system 10 according to a preferred embodiment of the invention receives data from a plurality of sources 12. These data sources 12 may be any type of data source, located either remote to the system 10 or proximate to the system 10. These data sources may be signal interfaces from physical equipment or computational facilities. A signal output interface allows IVRPCS to pull output from physical equipment or from computational facilities. A signal input interface allows IVRPCS to send input back to physical control equipment to invoke some process action. The data sources 12 preferably provide digital data to the system 10, although in other applications of the system 10 the data sources 12 may provide analog signals that are converted to digital signals at the system 10. As will become more apparent from the description below, the data source 12 can be virtually any type of data source: real-time, delayed, archived, or fabricated. A real-time data source is one that generates data continuously, such as a sensor in a physical plant or the current stock price for Microsoft. A delayed data source is just the real-time data delayed by some set time, such as data from analyses that require time to perform and thus always a step or more behind the real-time data. An archived data source is real-time data that has been stored for later retrieval, analysis, or review, such as a database that logs process real-time data. A fabricated data source is data from a computational facility or generated by means other than a real-time process. The data sources 12, moreover, may generate dynamic data or contain static data. The data source 12, as examples, may comprise a database or other storage or may comprise a stream of data that is subject to change over time or data that is generated through prediction and/or simulation. While examples of processes being monitored by the IVRPCS system 10 are provided below, the invention is not limited to the application of the system 10 to these particular processes. The use of the term process should also not be construed to require any type of machine, assembly, set of components, or other physical limitation. Instead, the term process is being used in its broadest sense to include any computational facility and the data sources that supply data to such computational facility. The monitored processes, for example, may include but are not limited to physical plants or devices, simulated processes or models, financial markets, on-line and off-line sensor data, and sources of medical information.

A data flow coordinator unit 14 collects the raw data from the data sources 12 through some signal interface and deposits the raw data into appropriate database(s). The data flow coordinator also coordinates the transfer of information between all other units, i. e. the data analysis unit 16, the data preparation unit 18, and the data rendering unit 20. Also, the data flow coordinator unit 14 can parse or sort through the data to collect only the necessary data. This coordinator could be a Java™, a custom C/C++ program, or any other appropriate programming language. Conceptually the operators of a facility, to allow for quicker response times between the system and the operators, could use a C++ Data Flow Coordinator. Java™ could be used for a 3-D Virtual reality interface across an intranet/internet for control, training, supervision and/or consultation.

The data analysis unit 16, in general, interprets and classifies the data sent from the data flow coordinator 14 so it may be presented to the user in an understandable format. This interpretation can take on many forms but one of the key goals is to find the relationships between the independent and dependent variables using appropriate analytical techniques, such as established classical algorithms, fuzzy logic, neural nets, and genetic algorithms. Online Analytical Processing (OLAP) existing art could be used as part of the data analysis unit 16. OLAP techniques exist for identifying relationships between variables, which is one of the major tasks of the data analysis unit. However, current OLAP art only presents this information in traditional 2-D or 3-D formats, such as plots or charts. IVRPCS goes one step further and maps these relationships into Interactive Virtual Reality 3-Dimensional Space, thus increasing the visual presentation capabilities.

An example of a classical method that can be used in the Data Analysis unit 16 is the correlation matrix for a set of $N_s$ system variables based on $N_p$ process values:

$$R_{i,j} = \frac{Cov_{i,j}}{\sqrt{Cov_{i,i} \cdot Cov_{j,j}}} \qquad \text{Equation 1}$$

where $R_{ij}$ refers to the $i^{th}, j^{th}$ element of the correlation matrix and $Cov_{ij}$ refers to the covariance between system variables i and j. Once these correlation coefficients have been found, the effects of $N_s-1$ variables on the variable of interest $V_k$ can be found by locating $V_k$'s row in R denoted as $\rho_k$ and defining the array:

$$V_{k,effect} = \{R(\rho_k, j)\}_{j=1,(j \neq k)}^{N_s} \qquad \text{Equation 2}$$

where the right-hand braces indicate an array or collection of all values satisfying the outside limits. Now each of these effect arrays can be used in defining SCALING factors for the system variables, since they represent a normalized effect on each variable. Once these SCALING factors are calculated, they are passed on to the Data Preparation block to be used in the Interactive Virtual Reality 3-Dimensional VARIABLE INTERACTION world.

Another technique to get these scaling factors is to use a fuzzy logic model. One can take the response to membership functions of a fuzzy logic model and convert them into scaling factors.

Another method is to use a linear model where a normalized variable of interest $\overline{V}_k$ is written as a function of the other normalized independent variables ($N_s-1$) in a form like:

$$\overline{V}_k = \sum_{j=1,(j \neq k)}^{N_s} \overline{a}_j \cdot \overline{V}_j \qquad \text{Equation 3}$$

Note that the normalized variables range from 0 to 1 and are defined as $$\overline{V}_j = \frac{V_j - V_{j,\min}}{|V_{j,\max} - V_{j,\min}|} \qquad \text{Equation 4}$$

For example, consider a Bushing Melter process as shown in FIG. 2 that is used to vitrify liquid waste material. Important to the operation of this melter is vapor pressure over the melt pool as it affects feed flow rate into the melter and the amount of off-gas that is being generated. For this example assume there are four system variables ($N_s=4$): the percent water in the feed, the melt temperature, the melt level, and the vapor pressure for the melter, which can be represented as $V_1$, $V_2$, $V_3$, and $V_4$, respectively. Since the melter vapor pressure or $V_4$ is the variable of interest, $V_k=V_4$. In order to express the variables in their normalized forms as shown in Error! Reference source not found. use the ranges defined in Error! Reference source not found.

TABLE 1

Bushing Melter System Variable Ranges

| Variable | Min | Max |
|---|---|---|
| $V_1$ | 0 | 6 |
| $V_2$ | 2 | 5 |
| $V_3$ | 1200 | 1500 |
| $V_4$ | −5 | −1 |

At the beginning of the feeding period, the Bushing melter vapor pressure can be expressed as the normalized linear model:

$$\overline{V}_4 = 0.23 * \overline{V}_1 - 2.44 * \overline{V}_2 + 2.25 * \overline{V}_3 \qquad \text{Equation 5}$$

Now linear fit coefficients $a_j$ can be defined as the effect factors for variable $\overline{V}_k$:

$$V_{k,effect} = \{a_j\}_{j=1,(j \neq k)}^{N_s} \qquad \text{Equation 6}$$

where the right-hand braces indicate an array or collection of all values satisfying the outside limits. For the bushing melter example discussed above the effect factors are:

$$V_{4,effect} = \{a_1 a_2 a_3\} = \{0.23 - 2.44 \ 2.25\} \qquad \text{Equation 7}$$

Now for these effects to be used as SCALING factors they need to have a common basis or they need to be normalized. In order to do this define a new SCALING term as:

$$s_i = \frac{a_i}{\sum_{j=1,(j \neq k)}^{N_s} |a_j|} \qquad \text{Equation 8}$$

where i=1 to $N_s$ skipping i=k and $s_i$ are the normalized SCALING factors that show the effects of $N_s-1$ system variables on the variable of interest $V_k$. For the bushing melter example, the scaling factors are defined as follows:

$$s = \{s_1 s_2 s_3\} = \{0.05 - 0.50 \ 0.46\} \qquad \text{Equation 9}$$

Grouping these SCALING terms together gives the SCALING array for variable $V_k$:

$$V_{k,scale} = \{s_i\}_{i=1,(i \neq k)}^{N_s} \qquad \text{Equation 10}$$

This SCALING vector would then be used to specify the impact or effect of each independent variable on the dependent variable $V_k$ on a 0 to 1 normalized scale.

These are only a couple of examples of how to weight the relative effect or impact of one variable on another. One of the objectives is to define a normalized SCALING array for each dependent variable or variable of interest such that the relative weighting or impact of the independent or other process variables can be represented pictorially and their impact upon the dependent variable or variable of interest.

The Data Analysis unit can also be used to update any empirical models of the process based on the difference between current and predicted process values. There is existing art or techniques such as Auto-regressive, Moving Average models, etc. that can be used on-line to capture process behavior. There are also techniques to update models on-line. One example of model updating is to read in current data and generate a modeling error that is then fed into an algorithm to update model coefficients by reducing the magnitude of the modeling error.

Once the data analysis unit 16 has finished, it supplies the results, through the data flow coordinator to the data preparation unit 18.

The data preparation unit 18 transforms the analyzed data into a suitable graphical format for the data rendering unit 20. This format may include but is not limited to scaled, multi-colored, textured graphical objects, whose properties reflect the information from the data analysis unit 16. The data preparation unit will put the analyzed data into the format specified by the user. For example, the data could be converted into a 2-Dimensional or 3-Dimensional format where process values P will be generated for a 2-D or 3-D mesh M that consists of Cartesian coordinates (x,y) or (x,y,z)

that define the location of each process value P in the appropriate space. Depending on the type of process value, P will contain numerical values of information that have to be converted into a "displayable" value. One example of this displayable value would be a Red, Green, Blue (RGB) or Cyan, Magenta, Yellow, Black (CMYK) color code that reflects the relative magnitude of the process value. One method to convert a Process Value to a RGB or CMYK code is to assign some RGB code or color to the low end or minimum process value ($P_{min}$) and some RGB code or color to the high end or maximum process value ($P_{max}$). With the RGB code range defined, each process value can then be converted into its RGB equivalent code using a pre-defined Colormap that goes through a certain continuous color spectrum, for example, dark blue to dark red. A Colormap representing $N_c$ distinct colors can consist of Nc rows by three columns, where each column contains the Red, Green, and Blue intensities, respectively, that forms each distinctive color. For example, a row of 1 0 0 represents dark blue, a row of 0 1 0 represents dark red, and a row of 0 0 1 represents dark green. Although a Colormap usually represents a continuous color range, it must consist of m distinct rows representing m distinct colors in the specified range. Due to this discrete definition of the Colormap, each process value $P_i$ must be assigned to a unique row in the Colormap. This definition of a Colormap is only one example and there could be several variations but a similar methodology should be applied. Let $\beta_i$ represent the RGB row in the example Colormap that represents a process value $P_i$. One possible form of $\beta_i$ is:

$$\beta_i = fix\left[\frac{(P_i - P_{\min})}{(P_{\max} - P_{\min})} \cdot N_C\right] + 1 \qquad \text{Equation 11}$$

where fix drops the fraction portion of the number in brackets[ ] and gives a row in the Colormap relative to the magnitude of the process value with respect to its minimum and maximum values. Note that this example assumes the first color or row in the Colormap corresponds to the minimum process value and the last color or row in the Colormap corresponds to the maximum process value. Following through with this example, the RGB color code assigned to a process value $P_i$ is defined as:

$$RGB_i = \text{Colormap}(\beta_i, 1:3) \qquad \text{Equation 12}$$

where the 1:3 symbolizes columns 1 through 3 of the Colormap matrix. Matlab, Canvas, and other existing programs use a similar technique in converting data values to RGB values. Once the process values have been converted to their RGB equivalents, the values can be shown as their representative colors in 2-dimensional or 3-dimensional space.

There are existing programs and other art that will draw 2-dimensional and 3-dimensional objects and images with or without color, provided the data is put in the proper format. The data preparation block will put the data in a displayable format or format suitable for these existing programs.

The data rendering unit 20 presents the data to the user as output objects through a display 22 that may be a traditional device (CRT or LCD monitor) or a Virtual Reality device (Head Mounted Display, CAVE, or Helmet). Preferably, the data is presented to the user so that the user can observe, interact with, and interpret the data. The system 10 also includes input/output devices 24, such as a keyboard, mouse, touch screen, Virtual Reality glove, microphone, speakers, or other suitable devices.

The data rendering unit 20 will use existing art that can display static as well as dynamic 3-dimenisonal objects with colors, textures, etc. in Interactive Virtual Reality worlds. These Interactive Virtual Reality 3-Dimensional (IVR-3D) worlds may include any of the basic types: PROCESS OVERVIEW, VARIABLE INTERACTION, DETAILED DERIVATION, RAW DATA, or any derivation thereof to convey capacity, efficiency, root cause analysis, safety, alarm, predictive, and other types of information about the process. One type, PROCESS OVERVIEW, could present a 3-Dimensional rendering of the process, albeit the physical layout of a plant, such as input and output vessels, or the layout of a theoretical process, such as cost flow or project management. This Interactive Virtual Reality 3-Dimensional (IVR-3D) world could show the flow of materials into and out of the process. An example of such an Interactive Virtual Reality 3D world is shown in FIG. 3. This IVR-3D world could also reflect the current process values along with the capacity of the process in a pictorial format. The term capacity is used to define the ability of the process to do more or less work without violating some prescribed physical or operating limits. In this example IVR-3D world, a glass melter 32 and its temperature contours 33 are shown along with its feed and off-gas system using output IVR-3D objects. The user has the ability to navigate around in the interactive virtual reality world to inspect the process. Different views of the IVR-3D melter world are shown in FIG. 3 through FIG. 7 and illustrate the user navigating around the process. The user can judge immediately what input and output capacity the process is at by examining the levels in the feed vessels and the melter level. For example, the liquid feed and frit feed tanks are at about half capacity while the melter is at full capacity. In other words, the melter is at full capacity while the feed vessels can take on more materials. In addition to being able to inspect the process externally as shown in FIG. 3 through FIG. 7, the user may walk into a vessel to examine it from the inside like having "X-ray vision". For example, FIG. 8 and FIG. 9 are IVR-3D worlds that show just the exterior of the melter 32 looking at its right side along with a temperature legend 34. The user is not limited to looking at the exterior of the melter; he or she may walk into the melter 32 to examine the temperature profiles 33 from inside. FIG. 10 shows what a user would see if he or she walked into the right side of the melter 32: the temperature contours 33 at a vertical cross-section two inches from the right side. Also, floating palettes like the temperature legend 34 would be available to help the user understand the information being presented. Some indication of the user's location in the IVR-3D world would also be provided as indicated by the scale 35 on the right side of the melter 32 or by another floating palette similar to the temperature legend 34. As the user continues to navigate into the right side of the melter 32, he or she would see temperature contour 33 cross-sections at 4, 6, 8, and 10 inches from the right side of the melter as depicted in FIG. 11, FIG. 12, FIG. 13, and FIG. 14, respectively. These cross-sectional temperature contours allow the user to identify hot and cold spots in the melter without changing displays. The user simply walks into the vessel of interest, the melter in this case, and examines the inside as if he or she was navigating into the real vessel. The particular cross sectioning chosen for this example is totally arbitrary and would be customized according to the user's needs. Note that these images are snapshots from Interactive Virtual Reality 3-Dimensional worlds where the user is free to navigate in any direction and into and out of the front, back, top, or bottom of the melter 32. This freedom of navigation gives the user the maximum flexibility in examining the process. FIG. 15 and FIG. 16 show exterior views of the bushing melter from the front. If the user walks into the front of the melter, he or she will see a temperature contour 33 cross-section from side to side at 0.55 inches from the melter's front in FIG. 17. The temperature legend 34 appears again as a floating palette and the user's location is indicated by the scale 35 on the lower right side of the melter 32. Another floating palette could be used to indicate the user's location in the IVR-3D world or the current status of some process variable(s). As the user continues to navigate through the front side of the melter 32, he or she will see side-to-side temperature contours 33 at 1.1, 1.65, 2.20, and 2.75 inches from the front side of the melter 32 as depicted in FIG. 18, FIG. 19, FIG. 20, and FIG. 21, respectively. The user may inspect any part of the melter, either inside or outside. Other traditional 2-D and 3-D presentation techniques do not allow the user to walk into and examine the process. IVRPCS gives the user X-ray vision to look inside the process being displayed. The interval chosen for the temperature contour 33 cross sectioning is totally arbitrary and is customized based on each user's needs. Note that these images are snapshots captured from an Interactive Virtual Reality 3-Dimensional world where the user is free to navigate in any direction as well as into and out of the front, back, top, or bottom of the melter. This enhanced freedom of movement gives the user maximum flexibility in examining his or her process.

In addition to this ability to inspect the process both externally and internally, the user is able to interact with the PROCESS OVERVIEW IVR-3D world. One form of interaction is allowing the user to change the type of variable being displayed. For example, the user could click on a thermometer/thermocouple to display the 3-D temperature profiles in a process vessel. Examples of this type of display are shown in FIG. 3 through FIG. 7 where the surface temperature contours 33 of the melter 32 are illustrated. Another form of interaction is to allow the user to turn dials, slide levers, push buttons, and use other GUI input objects that correspond to some process control element. For example, if while exploring the melter temperature contours shown in FIGS. 18 through 21 the operator noticed a hot spot, he or she could slide a lever for power output down, which would then send a signal to a control device, such as a PID controller, which would cause the power output to drop. IVRPCS could act as a GUI for existing control processes, whether they are Distributed Control Systems, PC based controllers, or Stand Alone control equipment. A separate GUI world could be constructed to simulate an "operator's" control room, complete with dials, gauges, buttons that allow the operator to monitor and control the process. Another example of interaction would be to show the flow of material into and out of a process. For example, a user clicks on a cash register to follow the cost of operations in a process. The user is basically limited by what is known about the process when it comes to visualizing different aspects of the process. The information could reflect real-time sensor data or off-line data such as previous run information from a database or a model. The concept is to provide the user with enough information to understand the current state of the process at any given point in time. This IVR-3D PROCESS OVERVIEW world would also allow the user to DRILL-DOWN for more data or information by clicking on a particular process variable, object, or stream. This action could take the user to a second Interactive Virtual Reality 3D world, VARIABLE INTERACTION.

A second Interactive Virtual Reality 3-Dimensional (IVR-3D) world, VARIABLE INTERACTION, displays information about a variable the user has requested in another IVR-3D world. For example, in the IVR-3D world shown in FIG. 3, if the user clicks on the Vapor Space area above the melter, he or she is taken to a Variable Interaction IVR-3D world for the Vapor Space Pressure shown in FIG. 22. Referring to FIG. 22, the outer limit constraints for $H_2O$ Feed Content 26A, Melt Level 27A, Melt Temp 28A, and Melt VP 29A are represented as frame boxes. These "frames" could be any shape or mimic the shape of their parent variable icon. Lower limit constraints for Melt Level 27B, Melt Temp 28B, and Melt VP 29B are shown but no lower limit for $H_2O$ Feed Content is shown because it does not have one. This type of display not only shows the interactions between the variable of interest and variables related to it in the process, but the current capacity of these variables as related to their upper and lower limits (process or control related). Note that this is an interactive virtual reality 3-dimensional world that the user can explore. For example, FIG. 23 and FIG. 24 show the user moving in the Vapor Pressure Interaction IVR-3D world of FIG. 22.

Based on how the process data is being collected, the process interaction can be for on-line or real-time data (i.e. as the process is running) or for off-line or delayed-time data (i.e. after the process has run). The data analysis unit has processed the data to determine the relationships between the dependent (variable of interest) and independent variables. These relationships are expected to change over time and will be updated as needed. The dependent and independent variables will be represented by unique 3-dimensional shapes with different colors and textures to make them easily identifiable. The independent variables, 26, 27, 28, will surround the dependent variable, 29, in interactive virtual reality 3-dimensional space with physical links going from the independent variables to the dependent variable illustrating their interdependence. These concepts are illustrated in FIG. 22 through FIG. 24. The relative sizes of the independent variables indicate their relative influence or effect over the dependent variable. One method of showing these interrelationships is by using the correlation coefficients between the dependent and independent variables as discussed earlier in the Data Analysis section. These correlation coefficients can be treated as SCALING factors for the 3-dimensional shapes presented in the 3-dimensional world where an arbitrary or default size is picked and then each variable's 3-dimensional object is sized based on these scaling factors. The dependent variable's size reflects its current operating value, growing as the process value increases and shrinking as the process value decreases. As each independent variable's effect increases or decreases over time, its size will change accordingly. An example of these changing interactions is demonstrated in FIG. 24, FIG. 25, FIG. 26, and FIG. 27. These snapshots show, respectively, the process variable interaction at 4 different time steps: 1) feeding, FIG. 24, 2) feed has just been shut off and water is beginning to boil off FIG. 25, 3) feed has been off for some time and water is boiling away quicker, FIG. 26, and 4) all the feed water has been boiled away, FIG. 27. These snapshots came from one interactive VR 3-D world that changed as the process changed. This interactive VR 3-D world conveys information about the process to the user very quickly. The user can see what variables are affecting the variable of interest and take any appropriate action.

To reflect processing constraints on the dependent and independent variables, a 3-D box or FRAME outline can be placed around or inside each variable. The frame outline could be any shape, such as a cube, sphere, or cylinder. An outer 3-D frame can represent an acceptable outer limit for the variable whereas an inner 3-D frame can represent an acceptable lower limit. Both types of limit frames can be used and the final choice is left up to the user. Examples of some "box" frames 26A&B, 27A&B, 28A&B, 29A&B, are shown in FIG. 22 through FIG. 27. Using this approach, the user can judge instantly whether a variable is within its proper operating range and what capacity the variable is at, i.e. can the variable be increased or decreased without affecting the process. As an example, if the Vapor Space Volume increased substantially it may allow the upper limit on the Vapor Space Temperature to increase. In addition the different process evolution stages may dictate different levels of allowable upper or lower limits. As an example, during the initial feeding stage of the bushing melter the maximum allowable Moles of Vapor in the Vapor Space maybe high because of off gassing from liquid to vapor. However after a period of time this continual evolution of gas into the Vapor Space may signal an unacceptable condition, therefore the upper limit of Moles of Vapor should be reduced. In addition to using color and size, the various objects representing the process variables can blink or flash to get the user's attention for alarm conditions or indications of violation of processing limits. Audible alarms or instructions can also be added to warn the user of an alarm state or impending processing violation. In addition to the 3-D shapes, text can be used to identify each process variable (dependent and independent) and its current operating value as shown in FIG. 22 through FIG. 27. To see how the process interactions are derived for a particular dependent variable, the user can click on the dependent variable block which will take him or her to a third type of Interactive Virtual Reality 3-D world or a DETAILED DERIVATION world.

A third basic 3D Interactive Virtual Reality world for this patent is the DETAILED DERIVATION world. In this IVR-3D world, the derivation of the process interaction information presented in the previous VARIABLE INTERACTION IVR-3D world is presented or explained. For example, if the user clicks on the Vapor Space Pressure variable block in the IVR-3D world of FIG. 22, he or she is taken to a IVR-3D world like that shown in FIG. 28. Note that the user may explore this IVR-3D world, like shown earlier, as illustrated by the different views shown in FIG. 29 and FIG. 30. The process interaction calculations can be presented in a text format along with any supporting 2-D or 3-D graphs or spreadsheets. In the example shown in FIG. 28, the back panels 30 indicate Fuzzy Logic Membership functions used to derive the water ($H_2O$), temperature, and level effects on the melter vapor pressure. Note that the water, temperature, and level effects are represented by the colors blue, red, and green, respectively. Also in this example, each variable's effect on the melter vapor pressure is shown by a color-coded cube 31 in the center showing the relative import of each independent variable.

In addition to the DETAILED DERIVATION information that is displayed, a 3-D representation of the dependent variable from the VARIABLE INTERACTION IVR-3D world is again shown to inform the user of current process values and limits. The user can observe how the different independent variable effects are being derived for a particular change in the dependent variable based on the current state of the process. An example of this monitoring ability is shown in FIG. 30, FIG. 31, FIG. 32, and FIG. 33. These figures represent, respectively, snapshots of the process at the four states mentioned earlier: 1) feeding, FIG. 30, 2) feed has just been shut off and water is beginning to boil off, FIG. 31, 3) feed has been off for some time and water is boiling away quicker, FIG. 32, and 4) all the feed water has been boiled away, FIG. 33.

If the user wished to examine the RAW DATA he/she can drill down on any of the variables of interest. This particular "drill down" can occur in any of the proceeding IVR-3D worlds by implementing "hot links" from the other worlds but conceptually it would take place in the DETAILED DERIVATION world. The RAW DATA world could present the information in a 2-D or 3-D graph, spreadsheet, reports, strip charts, or database formats depending on the wishes of the user.

The above descriptions only begin to scratch the surface of what is possible in a 3-D Virtual Reality world setting. Due to the novel nature of this invention using Virtual Reality in Process Control, Monitoring, Simulation, and Training, a specification for the use of VR icon features needs to be established. Currently, a VR's icon has shape, texture, size, aspect ratio, color, animation, and sound. With regards to shape, a VR icon can be virtually any shape, such as a cone, sphere, cube, or custom shape. These shapes could be used to identify different process variables, i.e. make it easy for the user to immediately identify or distinguish one process variable from another. Since VR icons have width, depth, and height, these three perspectives can be used to convey current process values as well as relative weighting of effects, all in the same IVR-3D world. For example, the height of each VR icon could represent the current process value with respect to its current operating range. The taller the icon is, the closer it is to its upper operating range or limit, and the shorter the icon is, the closer it is to its lower operating range or limit. To mark these lower and upper limits, frame outlines could be used around and inside each VR icon. All the VR icon widths could be normalized so the widest VR icon has the biggest effect on the variable of interest. The VR icon with the smallest width has the smallest effect on the variable of interest. At the same time one could use the depth of the VR icons for another characteristic. To get a quick idea of the current operating points in reference to their relative ranges and limits or to find the variable with the biggest impact on another variable, the user could just look at an Interactive IVR-3D world where all the variables' heights and widths are shown simultaneously. However, not all traits of the 3D icons have to be used at the same time as too much information may confuse rather than enlighten the user. The color of the VR icons could be used as a visual cue to identify each variable. Animation of the VR icon, could also be used to convey information to the user. For example, a blinking or flashing VR icon could indicate that a variable is in an alarm condition. A VR icon's texture can also be used to draw attention to a particular variable. For example, as a VR icon nears its upper limit, a "CrossHatched" pattern could appear on the icon and as it nears it lower limit a "Pokka-Dotted" pattern could appear. Another use of texture patterns is to inform the user of the current stage or operating mode of the process. For example, as a vessel is heating up, a fire texture could be applied to the VR icon, and as the vessel is being cooled down, a water texture could be applied. The surface of the VR icon could also be used to inform the user of changing conditions. For example, a bumpy surface could indicate a drift from a control setpoint and a smooth surface indicates that the process variable is staying within control limits. Another element that can be used for the VR icons is sound. For example, to help locate a control variable that is in alarm, a 3-D sound source could be associated with the VR icon of the control variable that would help the user locate the alarmed variable in the IVR-3D world. The novelty of the VR icon is that one can combine these different attributes to convey multiple pieces of information simultaneously. For example, if a control variable is drifting out of control and approaching its upper limit, the VR icon could have a crosshatched texture pattern with a bumpy or rough surface.

A single icon, such as a cylinder, can represent multiple variables. A single icon has multiple parameters associated with it. For a cylinder those parameters maybe height dimension, diameter dimension, color of cylinder wall, color of cylinder top, color of cylinder bottom, reflectivity of cylinder wall, reflectivity of cylinder top, reflectivity of cylinder bottom, transparence of cylinder wall, transparence of cylinder top, transparence of cylinder bottom, texture of cylinder wall, texture of cylinder top, texture of cylinder bottom, and a specific sound associated with the cylinder. The first principle pressure equation of Pressure * Volume (V)=Number Moles of Gas (N) * Gas Constant (R) * Temperature (T) will be used to illustrate this concept of a single icon showing multiple variable interaction. Assume that Pressure (P) is the dependent variable and the equation becomes $P=(N*R*T)/V$. The overall volume (height and diameter) of the cylinder can represents the dependent variable pressure. Maximum and minimum limits for the pressure can be established and shown as bounding boxes as discussed earlier. The color of the walls of the cylinder can represent the changing volume in the vapor space. The allowable limits can be expressed as extremes in color or bumps in the surface of the cylinder wall. For instance the wall (volume) may vary between white and black in color with white being the lower limit and black being the upper limit and the transition between the two a shade of gray. A legend depicting the gradient between the limits can be imbedded in the wall (volume) at various locations in the cylinder so the user/operator will constantly know the volume's position in the allowable range. The cylinder's top color can be used to represent the change in vapor space temperature with its color changing between blue and green to represent the respective maximum and minimum limits as discussed with the wall/volume. For the cylinder top/ temperature approaching the maximum upper and lower limits can also be represented by bumps that come out for approaching maximum limit and receding for representing approaching minimum limit. The cylinder's bottom color can represent the change in the number of moles in the vapor space with the color ranging from red to yellow to represent the transition from a maximum to a minimum allowable condition. For the cylinder bottom/number of moles approaching the maximum upper and lower limits can also be represented by the dullness or reflectivity of the surface/ color. As the surface/color becomes duller the number of moles can be approaching a lower limit while the brighter (neon) the color the closer the upper limit is being approached.

Another use of the interaction effects derived above or built-in modeling could be for the prediction of various process changes when the relative process variables are manipulated or for the optimization of a process to produce some desired effect, such as increasing process efficiency. For example, a new Predictive/Optimization IVR-3D world like shown in FIG. 24 could be created except it would contain sliders for each of the process variables: melt temperature, H2O feed content, and melt level. This Predictive/Optimization IVR-3D world could also be viewed as an Efficiency IVR-3D world since the goal generally behind optimization is to increase process efficiency. The user could manipulate the sliders to change the values of the process variables and observe their effects on the other variables. For example, if the slider for the H2O feed content were lowered, the other process variables would change similar to that shown in FIG. 25 through FIG. 27. This Predictive/Optimization/Efficiency IVR-3D world could depend on the variable interactions defined earlier and on any modeling built into the system. Another example of this Predictive/Optimization/Efficiency IVR-3D world could be a Boiler Optimization IVR-3D world which allow the user to manipulate the following process variables to minimize operating cost while meeting steam demand: the coal feed rate, the air inflow rate, coal grate speed, feed water rate, and steam pressure. This Boiler Optimization World could be set up similar to the Melter Vapor Pressure Interactive IVR-3D world shown in FIG. 25. VR icons with sliders to manipulate their values would exist for the coal feed rate, the air inflow rate, coal grate speed, feed water rate, and steam pressure. These process variable VR icons would surround a VR icon that represented both the operating cost and steam demand (cost/demand VR icon). The size of the cost/demand VR icon would represent the cost while a Pokka-dotted texture pattern could represent dropping below the desired steam demand and a cross-hatched texture pattern represented going above desired steam demand. The user could manipulate the process variable via the sliders in this IVR-3D world to reduce the size of the cost/demand VR icon while avoiding the Pokka-dotted and cross-hatched texture patterns on the cost/demand icon. These Predictive/Optimization/Efficiency IVR-3D worlds could be used to increase the efficiency of a process, i.e., maximize production while minimizing costs or risks to the workers.

IVRPCS's ability to link worlds, variables, data, and the human being also lends itself to incorporating Education, Training, and Operations of a process or concept with the underlying documentation that explains and clarifies an action or process. The documentation can be training manuals or Federal/State regulations. As explained above IVR-PCS can be used as an optimization tool. This optimization/ prediction tool could be incorporated as part of a training tool. The training can be linked to the documentation that explains in 2-D or Interactive Virtual Reality 3-Dimensional why the concepts that were employed either were successful or not successful. The training/education need not be limited to only a visual medium but can easily be an Immersive Interactive Virtual Reality Multimedia Environment. Assume the individual is in training for operating a process that is operational and being controlled by an IVRPCS application. Because the process is being controlled using an IVRPCS application the trainee could use delayed process data and the same IVRPCS worlds and linked variables as the operators. The trainee could be allowed to make a serious error in judgement and then shown in an Interactive Virtual Reality 3-Dimensional world why his/her decisions caused a failure by seeing the linkage between the variables and the documentation that would have prevented the failure. In other words, an IVRPCS application does not have to be limited to just process control but can incorporate prediction, optimization, and training as well.

Throughout these Interactive Virtual Reality 3-Dimensional worlds the user will have the ability, with links to-and-from each world to "navigate" to any world he or she desires. As an example, the user maybe in the DETAIL DERIVATION world and with one click of the mouse, he/she will be in the PROCESS OVERVIEW world. This concept of interconnectivity covers drilling down, up, sideways, diagonally, or in any direction in the IVR-3D worlds. For example, in the Melter process overview IVR-3D world, the user may click on the Melter which takes the user "down" into another IVR-3D world where just the melter is shown but to a much higher degree of detail than in the previous overview world. The user could then click on a piece of the melter, such as the inlet liquid feed and drill sideways to a detailed IVR-3D world on the liquid inlet feed system. The user may want to see how the inlet liquid feed fits back in the overall process so he or she drills back up to the Process Overview world. At this juncture the user may want to look at an overview of the upstream feed process so he or she drills sideways into a Feed Overview IVR-3D world. The user may now want to see a detailed view on one of the exit streams so he or she drills down diagonally to a detailed IVR-3D world on melter exit stream. This type of up, down, sideways, or diagonal drilling can go on ad infinitum giving the user the maximum navigational flexibility.

Another use of IVRPCS is in Alarm Response Visualization, Interpretation, and Tracking. In an Interactive Virtual Reality 3-Dimensional environment, the alarm response visualization technique can take on a multitude of different approaches depending on the industry and specific application. As with most alarm response methods there would be a graded approach depending on the severity of the alarm and the potential consequences of a failure. Because of the interactive virtual reality environment the individual is not limited to a two dimensional interface. As the alarm condition is approached the individual would be given a continuous update as the offending variable, or variables, approach an upper or lower limit. For example, the texture pattern on the VR object could change to indicate approaching an upper or lower limit as discussed earlier. Some sort of audible alarm could be given. Due to IVRPCS's ability to show linked variables and to drill down for a detailed explanation of the derivation of the data and linkages, the individual can instantly see the offending variable(s) and identify which variable(s) are causing the problem. For example, in FIG. 46, an example of an Alarm Response World is shown for the Melter Temperature 60 exceeding its upper limit 60A. Note that upper limits are represented by black frame boxes (60A, 62A) and inner limits are characterized by red frame boxes (60B, 62B). The operator is shown the steps 63 to take to bring the melter temperature back into normal operating range and can take action either in the Alarm Response world or through some alternative interface to the process. In this example, the operator is instructed to turn off the temperature controller 61 or place it in manual and to lower the melter power 64. There can also be a link 65 to a standard text procedure for the operator to follow. If the operator is in a different world than the offending variable(s), IVRPCS can have the capability of instantly and automatically taking the individual to the offending world(s) and variable(s) when a predetermined "limit" has been reached. In the event the application can not have the capability of automatically taking the individual to the offending variable(s), IVRPCS can give a warning either by sound or pictorially that a specific variable(s) is approaching a limit and highlight the offending component in the Process Overview. If a specific response is required by the operator, IVRPCS can bring up the procedure to be followed in a separate world or document so the operator can follow the procedure while simultaneously monitoring the process/variable(s). The required response procedure can also be an Interactive Virtual Reality 3-Dimensional "document" rather than a static piece of paper. The specific method for signaling an alarm condition is restricted by the needs of the industry and/or individual. Some of the signaling methods that could be used are dull to neon colors, morphing an objects shape, flashing lights or color, addition or deletion of sound, the dominance of a variable in the Linked Variable world, etc.

The logic of an alarm response IVRPCS world can be easily extended to a Root Cause Analysis world. This Root Cause Analysis world could show a root cause analysis tree where the failed variable is shown at the top and the contributing factors are shown like roots of a tree coming off the failed variable. Like in a Variable Interaction World, the user can identify which variables contributed to the failure and how they caused the failure. For example, the Melter process discussed earlier could experience high temperature safety interlock that shuts down the process. The operators can then exam a Root Cause Analysis world like shown in FIG. 47. The Melter Temperature 60 is represented at the top of the tree and the user can see that it exceeded its outer limit 60A, which caused the interlock. Immediately below the temperature icon is an icon representing the melter level 66, which is too low or inside its lower limit 65B as shown in FIG. 46. Looking further below the melt level 66 the user identifies that the low level was caused by a low frit feed rate 67. In turn, the low frit feed rate 67 was caused by a low liquid feed rate 68. On the right side of the screen are descriptions 69 of each of the root causes to further assist the root cause analysis. The root cause tree could continue ad infinitum and could span across different IVR-3D worlds. The example presented here is a simple example and a real root cause analysis could consist of several roots that span several worlds. Also there exists the ability to store these root cause analyses in a database for later retrieval for future diagnosis and for training new users of the system. The IVR-3D world also allows the use of animation and sound to assist the user. For example, in the Melt Temperature Interlock example discussed earlier, an audible alarm could be used to notify the user of the problem. Once in the Root Cause Analysis world, any variable below its normal operating limit could flash blue and any variable above its normal operating limit could flash red. One may also use the VR icon's texture, size, and bump map to convey other information to the user.

II. Linkage Example

Another example of the linkage and inter-relationship between elements within a process will now be described with reference to FIG. 34. In this example, the linkage is defined with classical analysis, although the invention is not restricted from using any existing methodology or a combination thereof for the purpose of defining the relationships and degree of interactions between variables. Some other possible methods for defining the relationships and degree of interactions between variables include classical algorithms, such as heat transfer equations, fluid flow equations, structural analysis equations, finite element analysis, linear regression, moving average analysis, black-shoals analysis, stochastic analysis, and linear and nonlinear analysis. The invention may also incorporate fuzzy logic as a general rule for inputting human knowledge or neural networks rule for learning, predicting, and discovering hidden relationships. The invention furthermore may rely upon genetic algorithms as a general rule for defining the most "survivable" variables or wavelets as a general rule for "breaking down" a wave or pattern.

In this example of establishing variable linkage, the monitored process shown in FIG. 34 is a tank 42 containing a liquid 44 and one of the parameters of interest will be the Vapor Space Pressure 48 within the tank. The Vapor Space Pressure 48 depends upon three independent variables, each of which changes over time. The three independent variables affecting Vapor Space Pressure 48 are Vapor Space Volume 49, Vapor Space Temperature 45, and Moles of Vapor 50. The simplistic Ideal Gas Law is used to define the Vapor Space Pressure (P) 48 as equal to the product of the number of moles (N) of vapor 50 with the temperature (T) 45 of the gas in the vapor space with a gas constant (R) divided by the volume of vapor space (V) 49:

$$P=(N*T*R)/V$$

As can be seen from FIG. 34, the Vapor Space Temperature (T) 45 is measured by a thermocouple in the Vapor Space. This variable will change over time as more liquid water is changed into vapor thereby increasing the Vapor Space Temperature 45. This potential increase in temperature will be compensated for by the loss of heat/energy by conduction through the walls of the vapor space 49. The Vapor Space Volume 49 is calculated from a level indicator 47 that measures the height of the liquid water ($H_L$). This variable will change over time as more liquid water is turned into water vapor and the level of the liquid water goes down, thereby increasing the vapor space volume. The vapor space height (H) is calculated as $H=H_T-H_L$ where $H_T$ is the total height of the vessel as shown in FIG. 34. The Vapor Space Volume 49 in this example is a right circular cylinder so the equation for the Vapor Space Volume 49 will be Vapor Space Volume (V) 49 equals Pi ($\pi$) times radius of the vapor volume squared ($R_T^2$) times the height of the vapor space (H) or $V=\pi*R_T^2*H$.

The number of Moles of Vapor 50 in the vapor space will be determined by the amount of liquid water that is evolved into the vapor space. This evolution of water could be calculated from mass and energy balances on the process and from equations of state and vapor-liquid equilibrium theory. Although the invention could incorporate specific laws of thermodynamics, for this example the evolution of water will be an assumed quantity even though in reality it is affected by a number of parameters, including the temperature of the liquid water, the temperature of the vapor space, water heater input, heat conduction into and out of the process, and convection into and out of the process. A complete interactive virtual reality representation of this process would include all of these contributing variables.

An example of the possible variable interactions for a water-vapor process is shown symbolically in FIG. 35. From the figure, it is seen that many variables interact to determine the Vapor Space Pressure 48. For this example, a heated water tank 42 process has a 4 foot height ($H_T$) and a radius of 1 foot ($R_T$) and is at an initial equilibrium steady state defined by the values shown below in Table 1. The gas is assumed to follow the perfect gas law discussed earlier where the gas constant R is 10.73 $ft^3*psia$ (lb-mole*Rankine).

TABLE I

Initial Values for Heated Water Tank Example

| Variable | Value |
| --- | --- |
| Water Temperature ($T_L$), ° F. | 65 |
| Vapor Space Temperature (T), ° F. | 65 |
| Liquid Water Level ($H_L$), ft | 3.00 |
| Volume of Vapor Space (V), $ft^3$ | 3.14 |
| Moles of Vapor (N), lb. Mole * $10^{-3}$ | 0.170 |
| Vapor Space Pressure (P), psia | 0.305 |

As discussed above, the values of the variables change over time and are not constant. The system 10 detects these changing values with the various sensors and other data sources 12 employed such as the temperature thermocouple 45 and level indicator 47. Assume the water tank process is heated over time while sample data is being recorded. Table II shows example data when water is being evolved into the vapor space 49. In this example, no water vapor is assumed to condense back into the liquid phase.

TABLE II

Example Data from Heated Water Tank

| Variable | Value | | | | | | | |
| --- | --- | --- | --- | --- | --- | --- | --- | --- |
| Water Temperature ($T_L$), ° F. | 80 | 90 | 100 | 110 | 120 | 130 | 140 | 150 |
| Vapor Space Temperature (T), ° F. | 75 | 85 | 95 | 105 | 115 | 125 | 135 | 145 |
| Liquid Water Level ($H_L$), ft | 2.75 | 2.5 | 2.25 | 2 | 1.75 | 1.5 | 1.25 | 1 |
| Volume of Vapor Space (V), $ft^3$ | 3.93 | 4.71 | 5.50 | 6.28 | 7.07 | 7.85 | 8.64 | 9.42 |
| Moles Water Vapor Evolved (—N), lb. Mole * $10^{-3}$ | 0.105 | 0.103 | 0.136 | 0.177 | 0.226 | 0.323 | 0.325 | 0.45 |
| Moles of Vapor (N), lb. Mole * $10^{-3}$ | 0.275 | 0.378 | 0.514 | 0.691 | 0.917 | 1.24 | 1.57 | 2.02 |
| Vapor Space Pressure (P), psia | 0.402 | 0.469 | 0.557 | 0.667 | 0.800 | 0.991 | 1.16 | 1.39 |

In displaying the linkage of the above-described example, the icons for the parameters must be established. With reference to FIG. 36, the Vapor Space Temperature (T) 45 is assigned an icon 51, the Vapor Space Volume (V) 49 is assigned an icon 52, Moles of Vapor (N) 50 is assigned an icon 53, and Vapor Space Pressure (P) 48 is assigned an icon 54. Each of these icons 51 to 54 has a unique interactive virtual reality three-dimensional shape and color. The use of different colors and shapes is just one example of how parameters may be represented. The system may alternatively use a unique texture or surface mapping. The icons 51 to 54 in FIG. 36 are not two-dimensional icons but are interactive virtual reality three-dimensional objects in an interactive virtual reality three-dimensional world.

With reference to FIG. 37, the dependent variable Vapor Space Pressure 48, icon 54, is placed in the middle of the interactive virtual reality three-dimensional world, with the icons 51 to 53 for the independent variables surrounding it and pipelines or other connecting art between the dependent variable icon 54 and its surrounding independent icons 51 to 53. FIG. 37 represents the initial steady state condition of the monitored process when all of the independent variables contribute equally to the dependent variable of vapor space pressure 48 and values for the variables are provided next to the icons. The sizes of the three independent icons 51 to 53 are approximately equal representing an "equality of contribution."

If the Vapor Space Volume 49 increases from 3.14 ft$^3$ to 9.42 ft$^3$ while the other two process variables remain the same, then the Vapor Space Volume 49 change results in a Vapor Space Pressure 48 decrease from 0.305 psia to 0.169 psia. FIG. 38 represents the real-time changes that take place in the interactive virtual realty three-dimensional world. As can be seen from FIG. 38, no change occurs with the Vapor Space Temperature 45, icon 51, or the Moles of Water vapor 50, icon 53, but the Vapor Space Volume 49, icon 52, increases and the Vapor Space Pressure 48, icon 54, decreases appropriately. The increase of Vapor Space Volume 49 from 3.14 ft$^3$ to 9.14 ft$^3$ is a three-fold increase. This Vapor Space Volume 49 increase may not translate to a three-fold increase in icon size. The increase in Vapor Space Volume 49 is not an action unto itself as it relates to the Vapor Space Pressure 48. The Vapor Space Volume 49 is linked with the Vapor Space Temperature 45 and Moles of Vapor 50. Therefore the change, or lack of change, in the Vapor Space Volume ICON is related to the Vapor Space Volume 49 change, or lack of change, Vapor Space Temperature 45 change, or lack of change, and Moles of Vapor 50 change, or lack of change, and how all three affect the Vapor Space Pressure 48.

Another example is if the water temperature increases to 150° F. causing the number of Moles of Vapor 50 to increase to 2.02×10$^{-3}$ while the Vapor Space Volume 48 does not change and the Vapor Space Temperature 45 only increases to 95° F. FIG. 39 shows the system's 10 response to these variable changes from its data sources 12. As can be seen in this figure, the Moles of Water vapor 50 contribute significantly to the overall Vapor Space Pressure 48 when compared to the Vapor Space Temperature 45 and the Vapor Space Volume 49. As stated previously, the individual ICON size change depends on the relationships between the three independent variables, Moles of Water Vapor 50—Vapor Space Volume 49—Vapor Space Temperature 45, and their impact on the dependent variable—Vapor Space Pressure 48.

To further assist the human in deciphering the real-time process data, upper and if desired lower limits are added to the interactive virtual reality three-dimensional world, as shown in FIG. 40. The upper limits 51A, 52A, 53A, and 54A portrayed in FIG. 40 may be static or dynamic, depending on the needs of the user. For example, static limits could be used to represent physical or processing limits whereas dynamic limits could be used for changing process states. If implemented, the dynamic limits represent the allowable upper or lower conditions the process allows for the respective dependent or independent variable. As an example, if the Vapor Space Volume 49 increased substantially it may allow the upper limit on the Vapor Space Temperature 45 to increase. In addition the different process evolution stages may dictate different levels of allowable upper or lower limits. As an example, during the initial feeding stage of the bushing melter the maximum allowable Moles of Vapor 50 in the Vapor Space 49 maybe high because of off gassing from liquid to vapor. However after a period of time this continual evolution of gas into the Vapor Space 49 may signal an unacceptable condition therefore the upper limit of Moles of Vapor 50 should be reduced. These limits are preferably user-defined according to the application of the system 10.

The linkage is not limited to one particular view but may be represented in varying levels of specificity. In other words, the system 10 may present a high-level view showing major variables of interest and the user can drill down to view the linkage, which involves additional variables. Thus, by drilling down, the user can break down a single variable in a high-level view and view the linkage involving other variables upon which that single variable depends.

An example of this joining of different linked worlds will now be described with reference to FIG. 41 through FIG. 44. The Vapor Space Temperature 45 was classified as an independent variable in the examples shown in FIG. 36 to FIG. 40. The Vapor Space Temperature 45, however, could be considered a dependent variable and the same relative interactive virtual reality three-dimensional world for Vapor Space Pressure 48 could be created for the Vapor Space Temperature (T) 45. This change of focus for the dependent variable allows the user to explore all process variable interactions. The independent variables for Vapor Space Temperature (T) 45 are defined as Heat Conduction Out of Tank Walls ($Q_W$) and the Moles of Water Vapor Evolved ($\Delta N$).

The relationship and degree of interactions between these independent variables and the dependent variable may be defined in any suitable manner or with any suitable methodology. FIG. 41 illustrates an example of a relationship of Vapor Space Temperature 45 to Heat Conduction 55 and Moles of Water 56. The independent variables of Heat Conduction Out of Tank Walls ($Q_W$) 55 and Moles of Water Vapor evolved ($\Delta N$) 56 as well as the dependent Vapor Space Temperature (T) 45 are each given an icon unique interactive virtual reality three-dimensional shape and color. The Heat Conduction Out of Tank Walls is assigned to icon 55, the Moles of Water Vapor Evolved are assigned icon 56, and the Vapor Space Temperature is assigned to icon 51. As shown in FIG. 42, the icon 51 for the dependent variable is placed in the world in the middle of the interactive virtual reality 3-dimensional world. Icons 55 and 56, for the independent variables surround icon 51 and linked to the dependent variable icon 51 with pipelines or other connecting art.

During monitoring of the process, the Vapor Space Temperature 45 interactive virtual reality 3-dimensional world responds to changes in data to alter the characteristics of the icons. When the amount of water vapor evolved ($\Delta N$) increases significantly because there is insulation around the walls of the tank, the Vapor Space Temperature 45 increases because heat input is greater than heat output. A representation of these changes is shown FIG. 43, with the icons 51 and 56 for the Vapor Space Temperature 45 and Moles of Water 56 both increasing in size to reflect the increase in magnitude of those parameters. As discussed earlier the ICON sizes change depending on the relationships between the independent variables and their impact on the dependent variable.

As discussed above, the user can drill down from one linkage view to obtain a more detailed view of the linkage between variables. An example of this drill down view will now be described with reference to FIG. 44. In this example, the interactive virtual reality 3-dimensional world of Vapor Space Pressure 48, shown in FIG. 36 to FIG. 40, can be combined with the interactive virtual reality 3-dimensional world of Vapor Space Temperature 45, shown in FIG. 41 through FIG. 43. The resultant interactive virtual reality 3-dimensional universe is shown in FIG. 44. The user can receive the view shown in FIG. 44 by selecting an expansion of icon 51 to reveal its linkage to other variables, which in this example is Heat Conduction Out of Walls 55 and Moles of Water Vapor Evolved 56. In a similar manner, the user can drill down on any one or more of the other "independent" variables so that linkage between that variable and its dependent variables is shown.

The interactive virtual reality 3-dimensional universe can be expanded or contracted to include as much level of detail that is desired by the user. Also, the worlds can be linked together in one graphic or multiple graphics. This approach allows the user to include as much information as is needed without including too much.

III Exemplary Implementation

In the preferred embodiment, the system 10 comprises at least one personal computer with multiple processors. The system 10 includes a 3-D and 2-D graphics accelerator card with ample video and system RAM and a color display 22. This hardware is only a preferred configuration based on the state of the art and may vary according to advances in technology or pricing of components.

The system 10 operates on a multitasking operating system like Windows NT and is coded with C/C++, fortran, Java™ or any appropriate program language with Virtual Reality support and/or the Virtual Reality Markup Language (VRML version 2.0 or higher). The system 10 is loaded with an appropriate VR browser either custom-built with an appropriate programming language or from existing art, such as Netscape or MS Internet Explorer. This VR browser includes a custom-built or off-the-shelf plug-in to view and interact with the IVR-3D worlds. This VR browser would contain at least the following: 1) The ability to navigate from world to world by point and clicking on hot links, 2) controls to allow the user to walk, fly, tilt, slide, or otherwise navigate around in the IVR-3D world, 3) controls to allow the user to change the view by selecting from a menu or by rotating, panning, or zooming in and out of the IVR-3D worlds. One possible combination of existing art is Netscape and Cosmo Player from Cosmo Software, Inc. of Mountain View, Calif. IVR-3D worlds may be authored through existing software such as Cosmo Worlds from Cosmo Software or other vendors such as Superscape, VRealm, Virtus Pro, and MultiGen or through custom-built software. The system 10, however, is not limited to these particular languages or authoring programs but instead may be implemented with any suitable software. For instance, the system 10 may be implemented through Java™. JavaScript can be the scripting language for a particular node in VRML. For conducting analysis existing art such as MatLab, Mathmatica, Speedup, etc. maybe implemented or custom-built software may be used. For establishing and implementing the databases existing art such as Informix, Sybase, Oracle, Access, etc. maybe utilized or custom-built databases may be used.

As one example of a potential platform for IVRPCS, VRML has been cited. VRML is a language that permits the representation of data in a IVR-3D world. The use of VRML 2.0 enables the creation of 3-D worlds with links to web content and also enables the use of sensors, scripts, and sounds. A sensor, in general, provides a mechanism for a user to interact with an object in a 3-D world. A sensor generates an event based on time or user action and may comprise a proximity sensor, sphere sensor, touch sensor, visibility sensor, cylinder sensor, time sensor, or plane sensor. As an example, when a user through an input/output device 24 navigates close to the melter shown in FIG. 3, a proximity sensor triggers an event to cause a 3-D world of just the melter to be displayed to the user, such as FIG. 2.

An interpolator is a built-in behavior mechanism that generates an output based on linear interpolation of a number of key data points. Use of these key data points to generate animated objects is called keyframe animation. A script is used to create more intricate forms of behavior and script nodes themselves contain source code or pointers to code for logic operations. Some examples of interpolators are color, coordinate, position, normal, orientation, and scalar. As an example, data concerning the temperature of the melter may be tied to the interpolator of color so that the color at any particular point within the melter represents its temperature. As another example, the magnitude of a parameter or element may be tied to the scalar interpolator. Thus, in the linkage view, the magnitude of melter vapor pressure determines the scalar size of the icon 54 shown in FIG. 38.

The system 10 may also incorporate audio in its conveying of information to the user. As discussed above, the input/output devices 24 preferably include speakers. The system 10, for instance, may include 3-D specialized audio for conveying such information to the user as alarms or warnings. With such use of sound, the system 10 preferably includes a 32 bit sound card that supports MIDI sound tracks and wave sound files.

To tie in an external application to the VR browser, an EAI (external Application Interface) could be used. The EAI interface for VRML allows an external program to access nodes in a VRML scene using the existing VRML event model. In this model an eventOut of a given node can be routed to an eventIn of another node. When the eventOut generates an event, the eventIn is notified and its node processes that event. Additionally, if a script in a Script node has a pointer to a given node it can send events directly to any eventIn of that node and it can read the last value sent from any of its eventOuts. The EAI allows four types of access into the VRML scene: accessing the functionality of the Browser Script Interface, sending events to eventIns of nodes inside the scene, reading the last value sent from eventOuts of nodes inside the scene, and getting notified when events are sent from eventOuts of nodes inside the scene.

In addition to the off-the-shelf VRML browsers, one may develop a custom VRML browser or add VRML support to existing applications using any appropriate programming language. For example, a C++ toolkit known as Open Worlds by DraW Computing Associates can be used to create a personalized VRML 2 browser. OpenWorlds can be used to read in and render VRML files directly or to act as an animation engine for pre-existing applications. OpenWorlds may be used to create a unique Graphic User Interface or may be integrated with existing GUI's. Using a product such as OpenWorlds allows maximum flexibility but requires more coding than using an off-the-shelf package.

An alternative to using Virtual Reality Markup Language (VRML) and a browser is to use a Virtual Reality authoring package and/or a VR Application Program Interface (API). A VR authoring package allows one to easily build and modify 3D IVR-3D worlds in a drag-and-drop object-oriented environment much like a VRML authoring package like Cosmo Worlds. Unlike the VRML authoring tools, the VR authoring tools use their own programming routines to generate code for an executable VR application that includes a VR browser. Another method of developing a VR application is to use an API or Application Program Interface in conjunction with existing or new programming code. These API's provide functions to handle the visual displays, input/output devices, 3D rendering engines, and more so the user does not have to develop the VR code from scratch. Using a VR API with existing code provides the maximum flexibility in designing a VR application. Some examples of the available art for these VR development tools are shown in the following paragraphs.

Superscape VR Toolkit by Superscape is an authoring package for VR applications that uses a C-like scripting language as well as a drag-and-drop browser/editor. With the Software Development Kit, users may access the Superscape API for customizing their VR application to fit with existing or legacy applications. Another VR authoring product is dVISE by Division Ltd. that is user friendly, able to read multiple model formats like AutoCAD, 3D Studio, and Wavefront, and can create multi-user IVR-3D worlds. Another VR authoring package that allows creation of multi-user IVR-3D worlds and applications is VR Creator from VREAM Inc. VR Creator can read multiple formats, such as 3D Studio and AutoCAD, as well as provides access to its API for linking in external applications. Another VR authoring tool is WorldUp by Sense8 Corporation that uses an object-oriented browser to create and modify IVR-3D worlds. WorldUp allows for quick design and also incorporates scripting to extend its functionality.

The other field of VR application building is covered by Application Program Interfaces, which allow programmers to tie into pre-existing code for 3D VR display and interaction. One example of the existing art is OpenFlight API by Multigen, which allows programmers to tie into OpenFlight or Multigen's native format, which is a popular visual database standard. OpenFlight API allows users to augment Multigen's already comprehensive set of 3D modeling tools. Another example of a 3D API is Renderware by Criterion Software that provides high-speed 3D graphics across several computer platforms and supports HMD's (Head Mounted Display) as well as hardware graphic accelerators. Another 3D API that supports HMD's and other VR input/output devices is World Toolkit by Sense 8 Corporation. World Toolkit has a large set of C libraries for 3D simulations and VR applications. Yet another API is 3DR by Intel that supports high speed, real-time 3D graphic applications. 3DR has a Software Development Kit that takes advantage of hardware graphic accelerators. One more 3D API is from Apple called Quickdraw 3D that provides high quality 3D real-time graphics. Another 3D API that has been around for some time is OpenGL by Silicon Graphics. The OpenGL C based libraries have allowed programmers to build many 3D applications ranging from games to scientific visualizations. Another 3D API that's available to programmers is Microsoft's Direct3D, which is used by 3Dfx and Rendition for many 3D VR games.

As can be seen from the preceding lists, there is a great deal of existing art to create 3D VR applications. Any of these tools may be used to build a custom VR browser with high refresh rates that takes advantage of any particular 3D hardware. Depending on the complexity of the IVR-3D worlds and the needs of the user, either a VRML or custom-built VR browser can be used. There is even existing art to build a custom VRML, browser to eliminate some of the overhead in off-the-shelf browsers.

Using the existing art, one may construct tools for the maintenance as well as modification of the IVRPCS worlds. For example, Development and Maintenance tools could be constructed to help the user build the various IVR-3D worlds by dragging and dropping from a library of VR icon objects, shapes, textures, bump maps, etc. These tools could also be used to modify existing IVR-3D worlds. These tools would also encompass maintenance issues, such as updating the universe of IVR-3D worlds after modification to a particular world or validating links among the various IVR-3D worlds. These tools would allow the user to build, modify, and maintain a universe of IVR-3D worlds with minimal effort and maximum efficiency.

IV. Remote Link

As described above, the system 10 shown in FIG. 1 receives data from data sources 12, processes the data, and conveys information to the user, such as in the views shown in previous figures. The system 10 may also output signals directly or indirectly to the controlled device 25 within the process, such as to control certain aspects of the process. A direct output signal is self-explanatory. An indirect output signal is one that passes to an intermediate control system 26, which in turn talks directly to the controller device 25. The intermediate control system 26 may be a human operator, an existing control system, or some other intermediary system that interfaces directly with the controller device 25. In this respect IVRPCS acts as a supervisory control system instructing or advising a sub-system, the Intermediate Control System 26, on what action to take. It is then up to the intermediate control system 26 to implement the control action. In certain applications of the system 10, the system 10 is preferably located close to the process being monitored. In other applications of the system 10, however, the system 10 may be located remote to the monitored process.

A second embodiment of the invention will now be described with reference to FIG. 45, Block Diagram of Remote Link. The IVRPCS system 10 receives data directly from a monitored process 90 and may be located proximate or adjacent to the monitored process 90. A remote system 10\* is connected to one of, or both of, the IVRPCS system 10 and monitored process 90 through a link 100. The link 100 may comprise a local area network (LAN), wide area network (WAN), or internet, such as the Internet. The link 100 may also be through any communication medium or network, such as the Public Switched Telephone Network (PSTN), a mobile radiotelephone network, a paging network, a satellite communications network, as well as other wire-line and wireless communication networks.

The system 10\* preferably includes a data flow coordinator unit 14\*, the data analysis unit 16\*, the data preparation unit 18\*, the data rendering unit 20\*, the display 22\*, and the input/output devices 24\*. When the data flow coordinator unit 14\* receives data from the monitored process 90, the data flow coordinator unit 14\* performs in the same manner as the data flow coordinator unit 14. The data flow coordinator unit 14\* may alternatively receive information directly from the IVRPCS system 10.

The remote system 10\* allows a user to monitor or to control the monitored process 90 from a remote site. Preferably, the system 10\* receives information from the IVRPCS system 10 so as to reduce the amount of data transferred over link 100. With the use of VRML, the IVRPCS system 10 does not need to continuously generate a stream of data to the remote system 10\* but instead can transmit only changes in the data. As a result, if the monitored process 90 is at a steady state condition, the IVRPCS system 10 may not need to transmit any information to the system 10\*. Furthermore, even if a change occurred, the system 10 need not transmit the new value but preferably transmits an indexing factor to the remote system 10*. For instance, if a parameter increased from a magnitude of 1000 to 1200, the system 10 would not transmit the value of "1200" to the remote system 10* but instead would transmit a factor of "1.2." The data flow coordinator unit 14*, upon receiving this factoring index, would then send an appropriate update to the data preparation unit 18*.

A plant manager, for example, could monitor operations of a plant from his or her home and may not need to travel to the plant in the event of an emergency. The remote system 10* may be used for regulatory purposes, whereby a regulatory agency such as the Environmental Protection Agency may monitor and track the performance of the monitored process 90. The remote system 10* can therefore alleviate some reporting requirement imposed by regulatory agencies by automatically transferring the relevant information to the overseeing agency. Other uses of the remote system 10* will become apparent to those skilled in the art.

IVRPCS allows the incorporation of process control/monitoring, prediction, and training with implementation at the process and/or over an Intranet or Internet. Assume the bushing melter used in previous examples starts trending outside of the optimal operating conditions and the operators cannot locate the cause. The expert for that particular part of the bushing melter has his/her office five miles away or is out of town on business or vacation and the operators need his/her input immediately. The expert can use the IVRPCS application and the Intranet or Internet to examine archived and real time data as well as IVRPCS's various worlds, such as detailed derivation, prediction/optimization, and linked variables, to track down the abnormal behavior. Because the IVRPCS application is the same for the operators and the expert, both can work simultaneously in IVRPCS to solve the problem whether they are five or five hundred miles from each other. The expert can do more macro and microanalyses than the operators can but the operators have the hands-on or practical experience. With IVRPCS, both types of expertise are brought together to solve a problem that might not be solved with them working independently. Assume this incident took place on Tuesday morning while a class for new bushing melter operators was in session. When the training class reconvened Tuesday afternoon, the data from the incident Tuesday morning could be incorporated into the training because the IVRPCS application that the operators and expert used is the same as the one the trainees are using. While within the IVRPCS application the trainees can re-examine the incident that took place that morning and by using the predictive capabilities of IVRPCS try to solve the problem or find alternative solutions. The trainee can also access the procedures and regulations the operators used, and observe the process response via the various IVRPCS worlds, such as process overview, linked variables, and detailed derivation. The ability of the student to drill-up, drill-down or drill-across between IVRPCS worlds, training material, procedures, and regulations will enhance the learning experience and shorten the time to enlightenment. By training on the same application that will be used for operation, the migration of the trainees from the classroom setting to the plant floor will go smoother with quicker acclamation and higher retention. One of the main difficulties in understanding a new process, either physical or abstract is comprehending how "all the pieces fit together". The Variable Interaction and Detailed Derivation Worlds solve this problem by uniquely presenting to the student the inner workings of a process. Once inside IVRPCS the student can examine and interface with limits on the interdependent and non-interdependent variables and, in the same screen view, examine the regulatory guidelines that established the limits and/or training material to reinforce the fundamental concepts. The student can mimic the actions of the operator by conducting root cause analysis, predictive interpretation of parameter behavior, and capacity utilization studies while simultaneously examining the training material, operating procedures, and regulatory requirements.

It should be clear from this detailed description that a monitored process is common to all embodiments, that the monitored process may be real or simulated, that some monitored processes also have control inputs that effect changes in the process, and these systems are called controlled processes.

VI Conclusion

The IVRPCS system allows a user to gain knowledge from a monitored process. The IVRPCS system addresses the problem of data overload and presents information to a user which a user can more easily grasp. Due to the way in which the data is processed and information is presented to the user, a user can gain a better understanding of the information contained within the data. From this information, the user derives knowledge which can be used for various purposes, such as to react to changes in the monitored process or to control aspects of the monitored process. The IVRPCS system also supports the monitoring or controlling of a monitored process from a remote site.

The IVRPCS system does not limit the user to one particular representation of the data. The IVRPCS system allows the user to select the most appropriate representation of information. For one user, this representation may be a high-level view of the monitored process while for others the view may be that of the raw data. The IVRPCS system is not limited to these representations but also displays the linkage between variables in the monitored process and displays the linkage at varying degrees of specificity. Consequently, the user can drill down a linkage view to view additional variables.

The IVRPCS system provides insight into a dynamic process. In contrast to simulation programs, the IVRPCS system receives data directly from a process being monitored and is not limited to stagnant data. The IVRPCS system provides a representation of the state of the monitored process in real-time whereby a user can react in real-time.

While the foregoing specification teaches the principles of the present invention, with examples provided for the purpose of illustration, it will be understood that the practice of the invention encompasses all of the usual variations, adaptations, or modifications, as come within the scope of the following claims and their equivalents.

We claim:

1. A method of computer generation of an interactive virtual reality world for monitoring, controlling, and simulating a process, comprising:

constructing a first group of one or more related screen displays associated with the operation of a process, which screen displays, called raw data views, are analog representations or alphanumeric equivalents of outputs from at least two signal interfaces of equipment or of variables in the process that is to be monitored, controlled, and simulated;

constructing a second group of one or more related screen displays associated with the operation of a process, which screen displays, called derived views, include graphical representations, called output objects, of one or more processing variables or of one or more units of processing equipment in the process that is to be monitored, controlled, and simulated, which output objects are derived from outputs from analog or digital signal output, or from analog or digital sensor interfaces of equipment or of variables in the process that is to be monitored, controlled, and simulated;

constructing in the derived views one or more graphical representations, called input objects, of controllable elements in the process that is to be monitored, controlled, and simulated, which input objects include graphical representations of adjustable parameters, called control elements, associated with an analog or digital signal input interface of a controllable element of a unit of equipment or of a computational module in the process that is to be monitored, controlled, and simulated;

interfacing the input objects, including the control elements thereof, with the corresponding inputs of signal interfaces of equipment or of variables in the process that is to be monitored, controlled, and simulated so that changing the control elements through manipulation by mouse, keyboard command, or by other input device associated with the computer displaying a derived view, a value or state of a control element in an input object causes a corresponding change in the analog or digital signal presented at the corresponding signal input interface of a unit of equipment or of a computational module in the process that is to be monitored, controlled, and simulated;

controlling a unit of equipment or a computational module in the process through manipulation of the control elements; and interfacing through communications circuits or network one or more interactive virtual worlds with a user of the one or more interactive virtual worlds.

2. The method of claim 1, wherein the interactive virtual reality world further comprises enabling the user of one or more interactive virtual reality worlds to select a raw data view or a derived view from among two or more such views and from among two or more virtual reality worlds.

3. The method of claim 1, wherein each output object in a series of derived views corresponds to at least one piece of equipment, computational module, or variable of interest in the process that is to be monitored, controlled, and simulated, and wherein the collection of such derived views, called herein a process overview world, further comprises displaying output objects related to each other according to a chronologically based sequence, such as the sequence in which a workpiece is handled, a feedstream is processed, a computational process is executed, or a customer is serviced.

4. The method of claims 1, 2, or 3, wherein each control element of an input object corresponds to a single processing variable in the process that is to be monitored, controlled, and simulated.

5. The method of claims 1, 2, or 3, wherein each control element of an input object corresponds to at least two processing variables in the process that is to be monitored, controlled, and simulated.

6. The method of claims 1, 2, or 3, wherein the computer displaying an interactive virtual reality world, or a computer interfaced over a communications network with the computer displaying an interactive virtual reality world, renders the derived views in two dimensions.

7. The method of claims 1, 2, or 3, wherein the computer displaying an interactive virtual reality world, or a computer interfaced over a communications network with the computer displaying an interactive virtual reality world, renders the derived views in three dimensions.

8. The method of claims 1, 2, or 3, wherein the computer displaying an interactive virtual reality world, or a computer interfaced over a communications network with the computer displaying a process overview world, renders the derived views in three dimensions, and wherein the user can navigate the user's point of observation to any point within the coordinate space of the interactive virtual reality world and obtain a display of a three-dimensional perspective view from such point of observation.

9. The method of claims 1, 2, or 3, wherein the computer displaying an interactive virtual reality world, or a computer interfaced over a communications network with the computer displaying an interactive virtual reality world, renders the derived views in the interactive virtual reality world in three dimensions, and wherein the perspectives in the derived views can be moved by the user through a unit of equipment, a workpiece being handled, a feedstream being processed, or a computational process being executed, i.e., navigated through a rendering of the unit of equipment, workpiece, feedstream, or computational process to display an "x-ray vision" view of the internal aspects of a unit of equipment, of a workpiece being handled, of a feedstream being processed, or of a computational process being executed.

10. The method of claim 3, wherein the computer displaying a process overview world, or a computer interfaced over a communications network with the computer displaying a process overview world, stores limit values of parameters of a signal output interface, monitors one or more parameters of a signal output interface associated with an output object, detects whenever a parameter has exceeded one or more limit values, and during periods a parameter of a signal output interface associated with an output object has exceeded one or more limit values, displays a notice, called an alarm window, that describes each parameter and parameter value that has exceeded one or more limit values, wherein such display is adjacent to the relevant output object in a user's display screen or in another part of the user's display screen and is a graphical representation or alphanumeric data.

11. The method of claim 10, wherein the computer displaying a process overview world, or a computer interfaced over a communications network with the computer displaying a process overview world, computes, stores, and displays one or more root cause analysis maps and reports of one or more parameters exceeding limit values, and during periods a parameter of a signal output interface associated with an output object has exceeded one or more limit values, such root cause analysis maps and reports pertaining to a parameter of a signal output interface associated with an output object that has exceeded one or more limit values are displayed as graphical representations or as alphanumeric data in the alarm window, adjacent to the associated output object, or in another area of the user's display screen.

12. The method of claim 10, wherein the computer displaying a process overview world, or a computer interfaced over a communications network with the computer displaying a process overview world, includes a database containing information about each root cause analysis that is performed and upon request from the user to display additional information about the result of a root cause analysis, displays more detailed root cause analysis maps or reports corresponding to the request.

13. The method of claim 3, wherein the computer displaying a process overview world, or a computer interfaced over a communications network with the computer displaying a process overview world, calculates a prediction that parameters of one or more units of equipment or of computational modules associated with an output object have reached a threshold probability of exceeding limit values, wherein such computer stores and displays the identity of the parameters and the results of the prediction as a graphical representation or as alphanumeric data in an area, called a prediction window, adjacent to the associated output object displayed in a user's display screen, or in another area of the user's display screen.

14. The method of claim 3, wherein the computer displaying a process overview world, or a computer interfaced over a communications network with the computer displaying a process overview world, determines unused capacity (the ability of a process to do more processing without violating some prescribed physical or operating limits) of one or more units of equipment or of computational modules associated with an output object, and stores the results of the determination, wherein such computer stores and displays the identity of the parameters involved and the results of the determination as a graphical representation or as alphanumeric data in an area, called a capacity window, adjacent to the associated output object displayed in a user's display screen, or in another area of the user's display screen.

15. The method of claim 3, wherein the computer displaying a process overview world, or a computer interfaced over a communications network with the computer displaying a process overview world, determines how existing capacity (the ability of a process to do processing without violating some prescribed physical or operating limits) of one or more units of equipment might be used more efficiently, wherein such computer stores and displays the results of the determination as a graphical representation or as alphanumeric data in an area, called an efficiency window, adjacent to the associated output object displayed in a user's display screen, or in another area of the user's display screen.

16. The method of claim 1, wherein a series of derived views, called herein a variable interaction world, further comprises output objects, input objects, and views in which the output objects and input objects are included and graphically linked in a given view based on relationships between the dependent and the independent variables associated with the output objects and input objects in the given view.

17. The method of claim 16, wherein the variable interaction world further comprises:
rendering the derived views in three dimensions, and wherein the user can navigate the user's point of observation to any point within the coordinate space of the variable interaction world and obtain a display of a three-dimensional perspective view from such point of observation;
computing and displaying relationships between the dependent and the independent variables associated with the output objects and input objects in a given view;
displaying graphical representations or alphanumeric data that show the relationships between the dependent and the independent variables;
storing limit values of parameters of a signal output interface, and detecting and displaying that a parameter of a signal output interface associated with an output object has exceeded one or more limit values, and during periods a parameter of a signal output interface associated with an output object has exceeded one or more limit values, displaying a notice, called an alarm window, that describes each parameter and parameter value that has exceeded one or more limit values, wherein such display is adjacent to the relevant output object in user's display screen or in another part of the user's display screen and is a graphical representation or alphanumeric data; and may include
predicting that parameters of one or more variables in the variable interaction world have reached a threshold probability of exceeding limit values, and displaying the identity of the variables and the results of the prediction as a graphical representation or as alphanumeric data in an area, called a prediction window, adjacent to the associated output object displayed in a user's display screen, or in another area of the user's display screen.

18. The method of claim 16, wherein the output objects and input objects in a view within the variable interaction world are included in a given view based on the criticality of the variables represented by the output objects and input objects in the process that is to be monitored, controlled, and simulated.

19. The method of claim 1, wherein one series of derived views, called herein a detailed derivation world, includes output objects and input objects and further comprises:
rendering the derived views in three dimensions, and wherein the user can navigate the user's point of observation to any point within the coordinate space of the detailed derivation world and obtain a display of a three-dimensional perspective view from such point of observation;
displaying views in which the output objects and input objects are included in a given view based on the relationships between the dependent and the independent variables that the output objects and input objects represent;
computing and displaying a calculation or other derivation of the variables associated with the output objects and input objects;
displaying graphical representations or alphanumeric data that show the calculation or other derivation of the variables associated with the output objects and input objects;
storing limit values of parameters of a signal output interface, detecting and displaying that a parameter of a signal output interface associated with an output object has exceeded one or more limit values, and during periods a parameter of a signal output interface associated with an output object has exceeded one or more limit values, displaying a notice, called an alarm window, that describes each parameter and parameter value that has exceeded one or more limit values, wherein such display is adjacent to the relevant output object in user's display screen or in another part of the user's display screen and is a graphical representation or alphanumeric data; and may include
predicting that parameters of one or more variables in the detailed derivation world have reached a threshold probability of exceeding limit values, and displaying the identity of the variables and the results of the prediction as a graphical representation or as alphanumeric data in an area, called a prediction window, adjacent to the associated output object displayed in a user's display screen, or in another area of the user's display screen.

20. A method of computer generation of related interactive virtual reality worlds for monitoring controlling, and simulating a process, comprising:
constructing a raw data world displaying at least one view of raw data sourced from sensors monitoring a process;

constructing a process overview world displaying at least one view of a process involving a feedstream, workpiece, or unit of equipment, wherein outputs of each feedstream, workpiece, or unit of equipment are each represented and displayed as an output object, inputs to each feedstream, workpiece, or unit of equipment are each represented and displayed as an input object, and adjustable parameters associated with an analog or digital signal input interface of a controllable element of a feedstream, workpiece, or unit of equipment are each represented and displayed as a control element;

constructing a variable interaction world displaying at least one view of the interaction of variables related to an output object or to an input object;

constructing a detailed derivation world displaying at least one view of the derivation of at least one variable related to an output object or to an input object;

providing a user with a means of navigating the above-described collection of virtual reality worlds by selecting an output object and following the output object's links to other worlds, or by selecting an input object and following the input object's links to other worlds;

displaying the views in the above-described virtual reality worlds that result from the navigation performed by the user;

enabling the user to drill through the views of the above-described virtual reality worlds, that is, as the user navigates the links between objects in the virtual reality worlds, displays of graphical representations or of alphanumeric data of raw data, process overview, variable interaction, or derivation of variables associated with an output object or input object selected by the user are presented to the user in each view;

interfacing the input objects, including the control elements thereof, with the corresponding inputs of signal interfaces of equipment or of variables in the process that is to be monitored, controlled, and simulated so that changing the control elements through manipulation by mouse, keyboard command, or by other input device associated with the computer displaying a view, a value or state of a control element in an input object causes a corresponding change in the analog or digital signal presented at the corresponding signal input interface of a unit of equipment process that is to be monitored, controlled, and simulated;

controlling a feedstream, workpiece, or unit of equipment in the process through manipulation of the control elements; and interfacing through communications circuits or network one or more interactive virtual worlds with a user of the one or more interactive virtual worlds.

21. A method for conveying information to a user through a computer-generated display of a plurality of interactive, three-dimensional, virtual reality world for monitoring, controlling, and simulating a process, comprising:

constructing a raw data world displaying at least one view of raw data sourced from sensors monitoring a process;

constructing a process overview world displaying at least one view of a process involving a feedstream, workpiece, or unit of equipment, wherein outputs of each feedstream, workpiece, or unit of equipment are each represented and displayed as an output object, inputs to each feedstream, workpiece, or unit of equipment are each represented and displayed as an input object, and adjustable parameters associated with an analog or digital signal input interface of a controllable element of a feedstream, workpiece, or unit of equipment are each represented and displayed as a control element;

constructing a variable interaction world displaying at least one view of the interaction of variables related to an output object or to an input object;

constructing a detailed derivation world displaying at least one view of the derivation of at least one variable related to an output object or to an input object;

providing a user with a means of navigating the virtual reality worlds by selecting an output object and following the output object's links to other worlds, or by selecting an input object and following the input object's links to other worlds;

displaying the views in the virtual reality worlds that result from the navigation performed by the user;

enabling the user to drill through the views of the virtual reality worlds, that is, as the user navigates the links between objects in the virtual reality worlds, that is, displays of graphical representations or of alphanumeric data, of raw data process overview, variable interaction, or derivation of variables associated with an output object or input object selected by the user are presented to the user in each view;

enabling the user to navigate through the feedstream, workpiece, unit of equipment, or computational process to display an "x-ray vision" view of the internal aspects of a feedstream being processed, of a workpiece being handled, of a unit of equipment, or of a computational process being executed based on data from the feedstream, workpiece, unit of equipment, or computational process;

interfacing the input objects, including the control elements thereof, with the corresponding inputs of signal interfaces of equipment or of variables in the process that is to be monitored, controlled, and simulated so that changing the control elements through manipulation by mouse, keyboard command, or by other input device associated with the computer displaying a view, a value or state of a control element in an input object causes a corresponding change in the analog or digital signal presented at the corresponding signal input interface of the process that is to be monitored, controlled, and simulated;

controlling a feedstream, workpiece, unit of equipment, or computational process through manipulation of the control elements; and interfacing through communications circuits or network one or more interactive virtual worlds with a user of the one or more interactive virtual worlds.

22. A system for the computer generation of an interactive virtual reality world for process control comprising:

a means for constructing a first group of one or more related screen displays associated with the operation of a process, which screen displays, called raw data views, are analog representations or alphanumeric equivalents of outputs from at least two signal interfaces of equipment or of variables in the process that is to be monitored, controlled, and simulated;

a means for constructing a second group of one or more related screen displays associated with the operation of a process, which screen displays, called derived views, include graphical representations, called output objects, of one or more processing variables or of one or more units of processing equipment in the process that is to be monitored, controlled, and simulated, which output objects are derived from outputs from analog or digital signal output, or from analog or digital sensor interfaces of equipment or of variables in the process that is to be monitored, controlled, and simulated;

a means for constructing in the derived views one or more graphical representations, called input objects, of controllable elements in the process that is to be monitored, controlled and simulated, which input objects include graphical representations of adjustable parameters, called control elements, associated with an analog or digital signal input interface of a controllable element of a unit of equipment or of a computational module in the process that is to be monitored, controlled, and simulated;

a means for interfacing the input objects, including the control elements thereof, with the corresponding inputs of signal interfaces of equipment or of variables in the process that is to be monitored, controlled, and simulated so that changing the control elements through manipulation by mouse, keyboard command, or by other input device associated with the computer displaying a derived view, a value or state of a control element in an input object causes a corresponding change in the analog or digital signal presented at the corresponding signal input interface of a unit of equipment or of a computational module in the process that is to be monitored, controlled, and simulated;

a means for controlling a unit of equipment or a computational module in the process through manipulation of the control elements; and one or more communications circuits or networks that interface one or more interactive virtual worlds with a user of the one or more interactive virtual worlds.

23. The system of claim 22 that includes a means for the user's selecting what output objects or input objects to display in a view.

24. The system of claim 22, wherein each output object in a series of derived views corresponds to a specific piece of equipment, a specific computational module, or a variable of interest in the process that is to be monitored, controlled, and simulated, and wherein the collection of such derived views, called herein a process overview world, shows output objects related to each other according to a chronologically based sequence, such as the sequence in which a workpiece is handled, a feedstream is processed, a computational process is executed, or a customer is serviced.

25. The system of claims 22, 23, or 24, wherein the computer displaying an interactive virtual reality world, or a computer interfaced over a communications network with the computer displaying a interactive virtual reality world, includes a means for rendering the derived views in two dimensions.

26. The system of claims 22, 23, or 24, wherein the computer displaying an interactive virtual reality world, or a computer interfaced over a communications network with the computer displaying a interactive virtual reality world, includes a means for rendering the derived views in three dimensions.

27. The system of claims 22, 23, or 24, wherein the computer displaying an interactive virtual reality world, or a computer interfaced over a communications network with the computer displaying an interactive virtual reality world, includes a means for rendering the derived views in three dimensions, and wherein the user can navigate the user's point of observation to any point within the coordinate space of the interactive virtual reality world and obtain a display of a three-dimensional perspective view from such point of observation.

28. The system of claims 22, 23, or 24, wherein the computer displaying an interactive virtual reality world, or a computer interfaced over a communications network with the computer displaying an interactive virtual reality world, includes a means for rendering the derived views in the interactive virtual reality world in three dimensions, and wherein the perspectives in the derived views can be moved by the user through a unit of equipment, a workpiece being handled, a feedstream being processed, or a computational process being executed, i.e., navigated through a rendering of the unit of equipment, workpiece, feedstream, or computational process to display an "x-ray vision" view of the internal aspects of a unit of equipment, of a workpiece being handled, of a feedstream being processed, or of a computational process being executed.

29. The system of claim 24, wherein the computer displaying a process overview world, or a computer interfaced over a communications network with the computer displaying a process overview world, includes a means for storing limit values of parameters of a signal output interface, of monitoring one or more parameter of a signal output interface associated with an output object, of detecting whenever a parameter has exceeded one or more limit values, and during periods a parameter of a signal output interface associated with an output object has exceeded one or more limit values, of displaying a notice, called an alarm window, that describes each parameter and parameter value that has exceeded one or more limit values, wherein such display is adjacent to the relevant output object in a user's display screen or in another part of the user's display screen and is a graphical representation, or alphanumeric data.

30. The system of claim 24, wherein the computer displaying a process overview world, or a computer interfaced over a communications network with the computer displaying a process overview world, includes a means for computing, and for storing and displaying, the results of one or more root cause analysis maps and reports of one or more parameters exceeding limit values, and during periods a parameter of a signal output interface associated with an output object has exceeded one or more limit values, such root cause analysis maps and reports pertaining to a parameter of a signal output interface associated with an output object that has exceeded one or more limit values are displayed as graphical representations or as alphanumeric data in the alarm window, adjacent to the associated output object, or in another area of the user's display screen.

31. The system of claim 24, wherein the computer displaying a process overview world, or a computer interfaced over a communications network with the computer displaying a process overview world, includes a database containing information about each root cause analysis that is performed and includes a means for displaying a graphical representation or alphanumeric data to a user of the computer displaying a process overview world, and upon request from the user to display additional information about the result of a root cause analysis, displays more detailed root cause analysis maps or reports corresponding to the request.

32. The system of claim 24, wherein the computer displaying a process overview world, or a computer interfaced over a communications network with the computer displaying a process overview world, includes a means for predicting that parameters of one or more units of equipment or of computational modules associated with an output object have reached a threshold probability of exceeding limit values, wherein such computer stores and displays the identity of the parameters and the results of the prediction as a graphical representation or as alphanumeric data in an area, called a prediction window, adjacent to the associated output object displayed in a user's display screen, or in another area of the user's display screen.

33. The system of claim 24, wherein the computer displaying a process overview world, or a computer interfaced over a communications network with the computer displaying a process overview world, includes a means for determining unused capacity (the ability of a process to do more processing without violating some prescribed physical or operating limits) of one or more units of equipment or of computational modules associated with an output object, and of storing the results of the determination, wherein such computer stores and displays the identity of the parameters involved and the results of the determination as a graphical representation or as alphanumeric data in an area, called a capacity window, adjacent to the associated output object displayed in a user's display screen, or in another area of the user's display screen.

34. The system of claim 24, wherein the computer displaying a process overview world, or a computer interfaced over a communications network with the computer displaying a process overview world, includes a means for determining how existing capacity (the ability of a process to do processing without violating some prescribed physical or operating limits) of one or more units of equipment or of computational modules might be used more efficiently, wherein such computer stores and displays the results of the determination as a graphical representation or as alphanumeric data in an area, called an efficiency window, adjacent to the associated output object displayed in a user's display screen, or in another area of the user's display screen.

35. The system of claim 22, wherein a series of derived views, called herein a variable interaction world, further comprises output objects and views in which the output objects are included and graphically linked in a given view based on relationships between the dependent and the independent variables associated with the output objects and input objects in the given view.

36. The system of claim 35, wherein the variable interaction world further comprises:
  a means for rendering the derived views in three dimensions, and wherein the user can navigate the user's point of observation to any point within the coordinate space of the variable interaction world and obtain a display of a three-dimensional perspective view from such point of observation;
  a means for of computing and displaying relationships between the dependent and the independent variables associated with the output objects and input objects in a given view;
  graphical representations in schematic form, in symbolic form, or as alphanumeric data that show the relationships between the dependent and the independent variables;
  a means for storing limit values of parameters of a signal output interface, and of detecting and displaying that a parameter of a signal output interface associated with an output object has exceeded one or more limit values, and during periods a parameter of a signal output interface associated with an output object has exceeded one or more limit values, displaying a notice, called an alarm window, that describes each parameter and parameter value that has exceeded one or more limit values, wherein such display is adjacent to the relevant output object in user's display screen or in another part of the user's display screen and is a graphical representation or alphanumeric data; and may include
  a means for predicting that parameters of one or more variables in the variable interaction world have reached a threshold probability of exceeding limit values, and for display of the identity of the variables and the results of the prediction as a graphical representation or as alphanumeric data in an area, called a prediction window, adjacent to the associated output object displayed in a user's display screen, or in another area of the user's display screen.

37. The system of claim 35, wherein the output objects in a view within the variable interaction world are included in a given view based on the criticality of the variables represented by the output objects in the process that is to be monitored, controlled, and simulated.

38. The system of claim 22, wherein one series of derived views, called herein a detailed derivation world, includes output objects and input objects and further comprises:
  a means for rendering the derived views in three dimensions, and wherein the user can navigate the user's point of observation to any point within the coordinate space of the detailed derivation world and obtain a display of a three-dimensional perspective view from such point of observation;
  views in which the output objects are included in a given view based on the relationships between the dependent and the independent variables that the output objects and input objects represent;
  a means of computing and displaying a calculation or other derivation of the variables associated with the output objects;
  graphical representations or alphanumeric data that show the calculation or other derivation of the variables associated with the output objects and input objects;
  a means for storing limit values of parameters of a signal output interface, and of detecting and displaying that a parameter of a signal output interface associated with an output object has exceeded one or more limit values, and during periods a parameter of a signal output interface associated with an output object has exceeded one or more limit values, displaying a notice, called an alarm window, that describes each parameter and parameter value that has exceeded one or more limit values, wherein such display is adjacent to the relevant output object in user's display screen or in another part of the user's display screen and is a graphical representation, or alphanumeric data; and may include
  a means for predicting that parameters of one or more variables in the detailed derivation world have reached a threshold probability of exceeding limit values, and for display of the identity of the variables and the results of the prediction as a graphical representation or as alphanumeric data in an area, called a prediction window, adjacent to the associated output object displayed in a user's display screen, or in another area of the user's display screen.

39. The system of claim 22, wherein the system includes:
a data flow coordinator unit for receiving data from at least two data sources;
  a data preparation unit for transforming the data into output objects, input objects, and views;
  a data rendering unit for presenting each output object, input object, and view in two or three dimensions, as selected by a user, to the user;

a data analysis unit for receiving data from at least one of the data sources and for generating graphical representations and summarized alphanumeric data based on received data; and wherein the data preparation unit varies a characteristic of each output object in response to changes in the corresponding data sourced from signal output interfaces of equipment or of variables in the process that is to be monitored, controlled, and simulated.

40. The system of claim 39, wherein the data flow coordinator unit receives data from a source selected from the group consisting of real time data, temporarily stored data, archived data, or fabricated data.

41. The system of claim 39, wherein the data analysis unit scales the data from a data source and transmits the scaled data to the data flow coordinator for distribution to the data preparation unit.

42. The system of claim 39, wherein the data preparation unit alters a scalar size of at least one output object in proportion to a magnitude of the data from its data source.

43. The system of claim 39, wherein the data preparation unit alters a color of at least one output object in proportion to with a magnitude of the data from its data source.

44. The system of claim 39, wherein the data flow coordinator unit receives data from a plurality of sources, and the data is ultimately received by the data preparation unit, which transforms data from the plurality of sources into a plurality of output objects, and the data rendering unit presents the plurality of output objects in views of at least one virtual reality world.

45. The system of claim 39, wherein the data analysis unit calculates the values of dependent variables based on the values of one or more independent variables from which a given dependent variable depends the relationships and provides such values for presentation in the variable interaction world.

46. The system of claim 39, wherein the data analysis unit calculates limits, and the data and limit information are relayed through the data flow coordinator to the data preparation unit, which places one or more limits upon at least one output object, and the data rendering unit displays one or more limits with one or more relevant output objects.

47. The system of claim 39, wherein in response to a selection of one output object by the user, the data preparation unit obtains data from the data flow coordinator for the selected output object and the data rendering unit displays the data.

48. The system of claim 47, wherein the data rendering unit displays, in addition to a graphic representation of the data, values of the data received from the data preparation unit.

49. The system of claim 47, wherein the data analysis unit receives from the data flow coordinator the data associated with the output object and returns analyzed data to the data flow coordinator, which forwards the data to the data preparation unit for display by the data rendering unit.

50. The system of claim 39, wherein in response to a selection by the user of one of the output objects, the data rendering unit displays at least one linkage between the selected output object and at least one other output object.

51. The system of claim 39, wherein the data flow coordinator unit receives the data from at least one of the data sources over a communications link.

52. The system of claim 39, wherein the data flow coordinator unit receives the data from at least one of the data sources over a network.

53. The system of claim 39, wherein the system is for use with a monitored process that is to be controlled and wherein the system further comprises a device for sending a signal to the process to be controlled in response to a user input.

54. The system of claim 39, wherein the system is for use with a monitored process and wherein the data rendering unit provides a three-dimensional representative view of the monitored process.

55. The system of claim 39, wherein the data analysis unit alters a scalar size of at least one output object in proportion to a magnitude of the data from its data source.

56. The system of claim 39, wherein the data analysis unit alters a color of at least one output object in proportion to a magnitude of the data from its data source.

57. The system of claim 39, wherein the data analysis unit links a given output object associated with a dependent variable to output objects associated with other variables upon which such given output object depends.

58. The system of claim 39, wherein the data analysis unit determines the relationships between dependent and independent variables associated with a given output object and also associated with one or more input objects and other output objects, and returns the data and relationship, or "linkage," information to the data flow coordinator for forwarding to the data preparation unit and then to the data rendering unit for display of the output object and of the associated linkage information.

59. The system of claim 39, wherein the data analysis unit receives from the data flow coordinator the data associated with a given output object and returns variable limit information to the data flow coordinator, which forwards the data and limit information to the data preparation unit for display by the data rendering unit of at least one output object and the limits associated with each such output object.

60. The system of claim 39, wherein the system is for use with a monitored process and wherein the data rendering unit provides a three-dimensional representative view of the monitored process.

61. The system of claim 39, wherein in response to a selection of a given output object by the user, the data preparation unit obtains data received from the data flow coordinator for such given output object and the data rendering unit displays the data.

62. The system of claim 39, wherein the data rendering unit displays values of the data from the data source associated with the output object.

63. A method of computer generation of an interactive virtual reality world for monitoring a process comprising:

constructing a first group of one or more related screen displays associated with the operation of a process, which screen displays, called raw data views, are analog representations or alphanumeric equivalents of outputs from at least two signal interfaces of equipment or of variables in the process that is to be monitored;

constructing a second group of one or more related screen displays associated with the operation of a process, which screen displays, called derived views, include graphical representations, called output objects, of one or more processing variables or of one or more units of processing equipment in the process that is to be monitored, which output objects are derived from outputs from analog or digital signal output, or from analog or digital sensor interfaces of equipment or of variables in the process that is to be monitored;

constructing in the derived views one or more graphical representations associated with at least one piece of equipment, computational module, or variable of interest in the process that is to be monitored, wherein the collection of such derived views, called herein a process overview world, further comprises displaying output objects related to each other according to a chronologically based sequence, such as the sequence in which a workpiece is handled, a feedstream is processed, a computational process is executed, or a customer is serviced; interfacing through communications circuits or network one or more interactive virtual worlds with a user of the one or more interactive virtual worlds;

enabling the user of one or more interactive virtual reality worlds to select a raw data view or a derived view from among two or more such views and from among two or more virtual reality worlds; and rendering the derived views in the interactive virtual reality world in three dimensions, and wherein the perspectives in the derived views can be moved by the user through a unit of equipment, a workpiece being handled, a feedstream being processed, or a computational process being executed, i.e., navigated through a rendering of the unit of equipment, workpiece, feedstream, or computational process to display an "x-ray vision" view of the internal aspects of a unit of equipment, of a workpiece being handled, of a feedstream being processed, or of a computational process being executed.

64. A method of computer generation of an interactive virtual reality world for controlling a process comprising:

constructing a first group of one or more related screen displays associated with the operation of a process, which screen displays, called raw data views, are analog representations or alphanumeric equivalents of outputs from at least two signal interfaces of equipment or of variables in the process that is to be controlled;

constructing a second group of one or more related screen displays associated with the operation of a process, which screen displays, called derived views, include graphical representations, called output objects, of one or more processing variables or of one or more units of processing equipment in the process that is to be controlled, which output objects are derived from outputs from analog or digital signal output, or from analog or digital sensor interfaces of equipment or of variables in the process that is to be controlled;

constructing in the derived views one or more graphical representations associated with at least one piece of equipment, computational module, or variable of interest in the process that is to be controlled, wherein the collection of such derived views, called herein a process overview world, further comprises displaying output objects related to each other according to a chronologically based sequence, such as the sequence in which a workpiece is handled, a feedstream is processed, a computational process is executed, or a customer is serviced;

interfacing through communications circuits or network one or more interactive virtual worlds with a user of one or more interactive virtual worlds;

enabling the user of one or more interactive virtual reality worlds to select a raw data view or a derived view from among two or more such views and from among two or more virtual reality worlds; and rendering the derived views in the interactive virtual reality world in three dimensions, and wherein the perspectives in the derived views can be moved by the user through a unit of equipment, a workpiece being handled, a feedstream being processed, or a computational process being executed, i.e., navigated through a rendering of the unit of equipment, workpiece, feedstream, or computational process to display an "x-ray vision" view of the internal aspects of a unit of equipment, a workpiece being handled, o a feedstream being processed, or of a computational process being executed.

65. A method of computer generation of an interactive virtual reality world for controlling a process comprising:

constructing a first group of one or more related screen displays assocated with the operation of a process, which screen displays, called raw data views, are analog representations or alphanumeric equivalents of outputs from at least two signal interfaces of equipment or of variables in the process that is to be controlled;

constructing a second group of one or more related screen displays associated with the operation of a process, which screen displays, called derived views, include graphical representations, called output objects, of one or more processing variables or of one or more units of processing equipment in the process that is to be controlled, which output objects are derived from outputs from analog or digital signal output, or from analog or digital sensor interfaces of equipment or of variables in the process that is to be controlled;

constructing in the derived views one or more graphical representations associated with at least one piece of equipment, computational module, or variable of interest in the process that is to be controlled, wherein the collection of such derived views, called herein a process overview world, further comprises displaying output objects related to each other according to a chronologically based sequence, such as the sequence in which a workpiece is handled, a feedstream is processed, a computational process is executed, or a customer is serviced;

constructing in the derived views one or more graphical representations, called input objects, of controllable elements in the process that is to be controlled, which input objects include graphical representations of adjustable parameters, called control elements, associated with an analog or digital signal input interface of a controllable element of a unit of equipment or of a computational module in the process that is to be controlled;

interfacing the input objects, including the control elements thereof, with the corresponding inputs of signal interfaces of equipment or of variables in the process that is to be controlled, so that changing the control elements through manipulation by mouse, keyboard command, or by other input device associated with the computer displaying a derived view, a value or state of a control element in an input object causes a corresponding change in the analog or digital signal presented at the corresponding signal input interface of a unit of equipment or of a computational module in the process that is to be controlled;

controlling a unit of equipment or a computational module in the process through manipulation of the control elements, interfacing through communications circuits or network one or more interactive virtual worlds with a user of the one or more interactive virtual worlds;

enabling the user of one or more interactive virtual reality worlds to select a raw data view or a derived view from among two or more such views and from among two or more virtual reality worlds; and rendering the derived views in the interactive virtual reality world in three dimensions, and wherein the perspectives in the derived views can be moved by the user through a unit of equipment, a workpiece being handled, a feedstream being processed, or a computational process being executed, i.e., navigated through a rendering of the unit of equipment, workpiece, feedstream, or computational process to display an "x-ray vision" view of the internal aspects of a unit of equipment, of a workpiece being handled, of a feedstream being processed, or of a computational process being executed.

66. A method of computer generation of an interactive virtual reality world for simulating a process comprising:

constructing a first group of one or more related screen displays associated with the operation of a process, which screen displays, called raw data views, are analog representations or alphanumeric equivalents of outputs from at least two signal interfaces of equipment or of variables in the process that is to be simulated;

constructing a second group of one or more related screen displays associated with the operation of a process, which screen displays, called derived views, include graphical representations, called output objects, of one or more processing variables or of one or more units of processing equipment in the process that is to be simulated, which output objects are derived from outputs from analog or digital signal output, or from analog or digital sensor interfaces of equipment or of variables in the process that is to be simulated;

constructing in the derived views one or more graphical representations associated with at least one piece of equipment, computational module, or variable of interest in the process that is to be simulated, wherein the collection of such derived views, called herein a process overview world, further comprises displaying output objects related to each other according to a chronologically based sequence, such as the sequence in which a workpiece is handled, a feedstream is processed, a computational process is executed, or a customer is serviced;

constructing in the derived views one or more graphical representations, called input objects, of controllable elements in the process that is to be simulated, which input objects include graphical representations of adjustable parameters, called control elements, associated with an analog or digital signal input interface of a controllable element of a unit of equipment or of a computational module in the process that is to be simulated;

interfacing the input objects, including the control elements thereof, with the corresponding inputs of signal interfaces of equipment or of variables in the process that is to be simulated, so that changing the control elements through manipulation by mouse, keyboard command, or by other input device associated with the computer displaying a derived view, a value or state of a control element in an input object causes a corresponding change in the analog or digital signal presented at the corresponding signal input interface of a unit of equipment or of a computational module in the process that is to be simulated;

controlling a simulated unit of equipment or a computational module in the process through manipulation of the control elements, interfacing through communications circuits or network one or more interactive virtual worlds with a user of the one or more interactive virtual worlds;

enabling the user of one or more interactive virtual reality worlds to select a raw data view or a derived view from among two or more such views and from among two or more virtual reality worlds; and rendering the derived views in the interactive virtual reality world in three dimensions, and wherein the perspectives in the derived views can be moved by the user through a unit of equipment, a workpiece being handled, a feedstream being processed, or a computational process being executed, i.e., navigated through a rendering of the unit of equipment, workpiece, feedstream, or computational process to display an "x-ray vision" view of the internal aspects of a unit of equipment, of a workpiece being handled, of a feedstream being processed, or of a computational process being executed.

67. The method of claims 64, 65 or 66 further comprising displaying in a derived view movable windows, also known as floating palettes, that contain alphanumeric data associated with the user's point of perspective within the derived view being navigated by the user.

* * * * *